US012170696B2

(12) United States Patent
Curtis et al.

(10) Patent No.: US 12,170,696 B2
(45) Date of Patent: *Dec. 17, 2024

(54) VIEWING AGGREGATE POLICIES FOR AUTHORIZING AN API

(71) Applicant: Styra, Inc., Redwood City, CA (US)

(72) Inventors: Andrew Curtis, San Mateo, CA (US); Mikol Graves, San Francisco, CA (US); Bryan J. Fulton, San Francisco, CA (US); Timothy L. Hinrichs, Los Altos, CA (US); Marco Sanvido, Belmont, CA (US); Teemu Koponen, San Francisco, CA (US)

(73) Assignee: STYRA, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,686

(22) Filed: Oct. 17, 2022

(65) Prior Publication Data
US 2023/0032313 A1 Feb. 2, 2023

Related U.S. Application Data

(63) Continuation of application No. 16/446,509, filed on Jun. 19, 2019, now Pat. No. 11,477,238.
(Continued)

(51) Int. Cl.
*H04L 9/40* (2022.01)
*H04L 67/133* (2022.01)

(52) U.S. Cl.
CPC .......... *H04L 63/20* (2013.01); *H04L 63/0263* (2013.01); *H04L 63/08* (2013.01);
(Continued)

(58) Field of Classification Search
CPC ....... H04L 63/20; H04L 63/08; H04L 63/104; H04L 63/101; H04L 63/102; H04L 63/0263; H04L 67/133
(Continued)

(56) References Cited

U.S. PATENT DOCUMENTS

| 5,974,549 A | 10/1999 | Golan |
| 6,460,141 B1 | 10/2002 | Olden |

(Continued)

OTHER PUBLICATIONS

Aissaoui-Mehrez, Hassane, et al., "Implementation Software to Secure Virtual Machines with Remote Grid of Secure Elements," 2014 IEEE Military Communications Conference, Oct. 6-8, 2014, 6 pages, IEEE, Baltimore, MD, USA.
(Continued)

*Primary Examiner* — Benjamin A Kaplan
(74) *Attorney, Agent, or Firm* — ADELI LLP

(57) ABSTRACT

Some embodiments provide a method gaining insight into applicability of policies that authorize access to at least one service through application programming interface (API) calls by a plurality of users. The method receives an authentication policy that defines multiple users of a system providing the service, and also receives an authorization policy that defines access to the service by the users. The method generates an authorization policy for defining access to the service by authenticated users by combining the first and second policies. The method receives a query regarding access to the service from a particular set of one or more users, and uses the third policy to provide a response to the query that describes access to the service for the particular user set.

19 Claims, 35 Drawing Sheets

Related U.S. Application Data

(60) Provisional application No. 62/839,487, filed on Apr. 26, 2019, provisional application No. 62/785,656, filed on Dec. 27, 2018, provisional application No. 62/746,500, filed on Oct. 16, 2018.

(52) U.S. Cl.
CPC .......... *H04L 63/101* (2013.01); *H04L 63/102* (2013.01); *H04L 63/104* (2013.01); *H04L 67/133* (2022.05)

(58) Field of Classification Search
USPC .......................................................... 726/1
See application file for complete search history.

(56) References Cited

U.S. PATENT DOCUMENTS

| | | |
|---|---|---|
| 6,985,953 B1 | 1/2006 | Sandhu et al. |
| 7,096,367 B2 | 8/2006 | Garg et al. |
| 7,124,192 B2 | 10/2006 | High, Jr. et al. |
| 7,752,661 B2 | 7/2010 | Hemsath et al. |
| 7,865,931 B1 | 1/2011 | Stone et al. |
| 7,913,300 B1 | 3/2011 | Flank et al. |
| 8,266,694 B1 | 9/2012 | Roy |
| 8,613,070 B1 | 12/2013 | Borzycki et al. |
| 8,683,560 B1 | 3/2014 | Brooker et al. |
| 8,782,744 B1 | 7/2014 | Fuller et al. |
| 8,789,138 B2 | 7/2014 | Reierson et al. |
| 9,218,616 B2 | 12/2015 | Biljon et al. |
| 9,397,990 B1 | 7/2016 | Taly et al. |
| 9,530,020 B2 | 12/2016 | Brandwine et al. |
| 9,578,004 B2 | 2/2017 | Greenspan et al. |
| 9,645,847 B1 | 5/2017 | Roth |
| 9,648,040 B1 | 5/2017 | Morkel et al. |
| 10,122,757 B1 | 11/2018 | Kruse et al. |
| 10,127,393 B2 | 11/2018 | Ferraiolo et al. |
| 10,182,129 B1 | 1/2019 | Peterson et al. |
| 10,257,184 B1 | 4/2019 | Mehta et al. |
| 10,353,726 B2 | 7/2019 | Duan |
| 10,454,975 B1 | 10/2019 | Mehr |
| 10,469,314 B2 | 11/2019 | Ennis, Jr. et al. |
| 10,574,699 B1 | 2/2020 | Baer et al. |
| 10,592,302 B1 | 3/2020 | Hinrichs et al. |
| 10,592,683 B1 | 3/2020 | Lim et al. |
| 10,715,514 B1 | 7/2020 | Threlkeld |
| 10,719,373 B1 | 7/2020 | Koponen et al. |
| 10,740,470 B2 | 8/2020 | Ionescu et al. |
| 10,789,220 B2 | 9/2020 | Mayer et al. |
| 10,984,133 B1 | 4/2021 | Hinrichs et al. |
| 10,986,131 B1 | 4/2021 | Kruse et al. |
| 10,990,702 B1 | 4/2021 | Hinrichs et al. |
| 11,023,292 B1 | 6/2021 | Hinrichs et al. |
| 11,080,410 B1 | 8/2021 | Sandall et al. |
| 11,108,827 B2 | 8/2021 | Beckman et al. |
| 11,108,828 B1 | 8/2021 | Curtis et al. |
| 11,170,099 B1 | 11/2021 | Sandall et al. |
| 11,228,573 B1 | 1/2022 | Rangasamy et al. |
| 11,245,728 B1 | 2/2022 | Curtis et al. |
| 11,258,824 B1 | 2/2022 | Hinrichs et al. |
| 11,327,815 B1 | 5/2022 | Koponen et al. |
| 11,470,121 B1 | 10/2022 | Curtis et al. |
| 11,477,238 B1 | 10/2022 | Curtis et al. |
| 11,477,239 B1 | 10/2022 | Curtis et al. |
| 11,496,517 B1 | 11/2022 | Hinrichs et al. |
| 11,516,253 B1 | 11/2022 | Van Deman et al. |
| 11,604,684 B1 | 3/2023 | Hinrichs et al. |
| 2004/0083367 A1 | 4/2004 | Garg et al. |
| 2005/0114674 A1 | 5/2005 | Carley |
| 2006/0053290 A1 | 3/2006 | Randle et al. |
| 2007/0156670 A1 | 7/2007 | Lim |
| 2007/0226320 A1 | 9/2007 | Hager et al. |
| 2007/0277231 A1 | 11/2007 | Medvinsky et al. |
| 2008/0184336 A1 | 7/2008 | Sarukkai et al. |
| 2009/0055749 A1 | 2/2009 | Chatterjee et al. |
| 2009/0063665 A1 | 3/2009 | Bagepalli et al. |
| 2009/0077618 A1 | 3/2009 | Pearce et al. |
| 2009/0281996 A1 | 11/2009 | Liu et al. |
| 2010/0333079 A1 | 12/2010 | Sverdlov et al. |
| 2011/0113484 A1 | 5/2011 | Zeuthen |
| 2012/0030354 A1 | 2/2012 | Razzaq et al. |
| 2012/0066487 A1 | 3/2012 | Brown et al. |
| 2012/0110651 A1 | 5/2012 | Biljon et al. |
| 2012/0311672 A1 | 12/2012 | Connor et al. |
| 2012/0331539 A1 | 12/2012 | Matsugashita |
| 2013/0226970 A1 | 8/2013 | Weber et al. |
| 2014/0032691 A1 | 1/2014 | Barton et al. |
| 2014/0032759 A1 | 1/2014 | Barton et al. |
| 2014/0033267 A1 | 1/2014 | Aciicmez |
| 2014/0040975 A1 | 2/2014 | Raleigh et al. |
| 2014/0181186 A1 | 6/2014 | Stevens et al. |
| 2014/0237594 A1 | 8/2014 | Thakadu et al. |
| 2014/0372986 A1 | 12/2014 | Levin et al. |
| 2015/0089575 A1 | 3/2015 | Vepa et al. |
| 2015/0172321 A1 | 6/2015 | Kirti et al. |
| 2015/0213449 A1 | 7/2015 | Morrison et al. |
| 2015/0244724 A1 | 8/2015 | Xu et al. |
| 2016/0057107 A1 | 2/2016 | Call et al. |
| 2016/0188898 A1 | 6/2016 | Karinta et al. |
| 2017/0024428 A1 | 1/2017 | Patiejunas et al. |
| 2017/0070536 A1 | 3/2017 | Mortman |
| 2017/0111336 A1 | 4/2017 | Davis et al. |
| 2017/0124166 A1 | 5/2017 | Thomas et al. |
| 2017/0161120 A1 | 6/2017 | Sasaki et al. |
| 2017/0220370 A1 | 8/2017 | Klompje et al. |
| 2017/0237729 A1 | 8/2017 | Uppalapati |
| 2017/0302655 A1 | 10/2017 | Sondhi et al. |
| 2017/0346807 A1 | 11/2017 | Blasi |
| 2017/0364702 A1 | 12/2017 | Goldfarb et al. |
| 2018/0067790 A1 | 3/2018 | Chheda et al. |
| 2018/0082053 A1 | 3/2018 | Brown et al. |
| 2018/0109538 A1 | 4/2018 | Kumar et al. |
| 2018/0309746 A1 | 10/2018 | Blasi |
| 2018/0367311 A1 | 12/2018 | Stahlberg et al. |
| 2019/0007418 A1 | 1/2019 | Cook et al. |
| 2019/0007443 A1 | 1/2019 | Cook et al. |
| 2019/0080103 A1 | 3/2019 | Hadzic et al. |
| 2019/0121969 A1 | 4/2019 | Tang et al. |
| 2019/0190959 A1 | 6/2019 | Yuan |
| 2019/0230130 A1 | 7/2019 | Beckman et al. |
| 2019/0245862 A1 | 8/2019 | Kruse et al. |
| 2019/0273746 A1 | 9/2019 | Coffing |
| 2019/0386973 A1 | 12/2019 | Patwardhan et al. |
| 2020/0007580 A1 | 1/2020 | Liderman et al. |
| 2021/0029029 A1 | 1/2021 | Mehmedagic et al. |
| 2021/0240550 A1 | 8/2021 | Hinrichs et al. |
| 2021/0248017 A1 | 8/2021 | Hinrichs et al. |
| 2021/0365571 A1 | 11/2021 | Sandall et al. |
| 2022/0269549 A1 | 8/2022 | Koponen et al. |

OTHER PUBLICATIONS

Author Unknown, "API Best Practices Managing the API Lifecycle: Design, Delivery, and Everything in Between," Dec. 2016, 37 pages, Apigee, retrieved from https://pages.apigee.com/rs/351-WXY-166/images/API-Best-Practices-ebook-2016-12.pdf.

Costa, Jeff, "Improve API Performance with Caching," API Gateway, May 31, 2018, 18 pages, Akamai Developer, retrieved from https://developer.akamai.com/blog/2018/05/31/improve-api-performance-caching.

Deshpande, Raghunath, "TCP Proxies Chaining: Performance Implications," Master Thesis, PS-D-0023, Nov. 4, 2015, 83 pages, DOI: 10.13140/RG.2.1.3486.9205, Technische Universität Dermstadt.

Ion, Iulia, et al., "Extending the Java Virtual Machine to Enforce Fine-Grained Security Policies in Mobile Devices," 23rd Annual Computer Security Applications Conference (ACSAC 2007), Dec. 10-14, 2007, 10 pages, IEEE, Miami Beach, FL, USA.

Non-Published commonly Owned U.S. Appl. No. 16/050,119, filed Jul. 31, 2018, 55 pages, Styra, Inc.

Win, Thu Yein, et al., "Virtualization Security Combining Mandatory Access Control and Virtual Machine Introspection," 2014

(56) References Cited

OTHER PUBLICATIONS

IEEE/ACM 7th International Conference on Utility and Cloud Computing, Dec. 8-11, 2014, 6 pages, IEEE, London, UK.
Moffett, Jonathan D., et al., "Policy Hierarchies for Distributed Systems Management," IEEE Journal on Selected Areas in Communications, Dec. 1993, 11 pages, vol. 11, IEEE, USA.
Non-Published commonly Owned U.S. Appl. No. 18/120,810, filed Mar. 13, 2023, 63 pages, Styra, Inc.

```
package VM_modification.authz import data.ldap              902
import data.incident
import data.jira.issues

# Example input
# input = { "user": "alice" }
                                    905
# Allow if user in engineering and not blocked
allow {
    ldap.group["engineering"] [_] = input.user
    not blocked
}
                                    910
# Blocked during incident
blocked {
    incident = "True"
    not temporary_exemption
}

# Grant exception using Jira    915
temporary_exemption {
    issues[i].fields.assignee = input.user
    issues[i].labels[_] = incident.True_label
}
```

*Figure 9*

VIEWING AGGREGATE POLICIES FOR AUTHORIZING AN API

CLAIM OF BENEFIT TO PRIOR APPLICATIONS

This application is a continuation application of U.S. patent application Ser. No. 16/446,509, filed Jun. 19, 2019. U.S. patent application Ser. No. 16/446,509 claims the benefit of U.S. Provisional Patent Application No. 62/839, 487, filed Apr. 26, 2019, U.S. Provisional Patent Application No. 62/785,656, filed Dec. 27, 2018, and U.S. Provisional Patent Application No. 62/746,500, filed Oct. 16, 2018. U.S. patent application Ser. No. 16/446,509 is incorporated herein by reference.

BACKGROUND

The modern enterprise software stack is quickly evolving due to the increasing popularity of cloud, software-as-a-service (SaaS), user mobility, and end-to-end encryption. These trends have begun changing where enterprise software is executed, how it is implemented, and how it is accessed. This transformation has profound implications to the security posture of the enterprise (i.e., controlling and understanding who can access what when it comes to enterprise resources). In a traditional enterprise, much of the security is implemented through the securing of the perimeter. Prior to cloud, SaaS, and mobile users, when most of the services and their clients were confined to private datacenters, strict access controls at the borders of the data center were an effective and simple way to prevent unauthorized service access. Today, this simple setting is increasingly rare.

As a result, cloud and SaaS have effectively moved the services that enterprises rely on out of the private datacenter. In the case of SaaS, the enterprise is no longer responsible for running services, while in the case of cloud platforms, the services have migrated from the private datacenters to public datacenters. Furthermore, clients, who are now often mobile, tend to prefer to access services over encrypted channels. As such, the traditional approach of restricting service access by means of a security perimeter has been rendered challenging; such a single or plurality of choke points simply do not exist in the modern enterprise that now relies on more modern technologies.

BRIEF SUMMARY

Some embodiments of the invention provide a distributed approach to controlling service access. In some embodiments, this distributed approach includes migrating the perimeter into the cloud, SaaS platform, and applications themselves, and adapting the enterprise security posture accordingly.

Some embodiments of the invention answer several levels of questions about service access. First level questions are who can access the service and who has accessed the service, which are useful for troubleshooting and general visibility. Second level questions are questions of compliance which are mandatory for the enterprise, including identifying users with excessive permissions (e.g., enforcing least privilege), and accurate identification of users with access to critical services and associated data. In a modern enterprise, answering these questions is no longer a matter of inspecting firewall rules at the security perimeter. Instead, in some embodiments, analysis is performed across multiple providers, multiple platforms, multiple services, and multiple applications in order to establish a global security posture. In addition, as the capabilities of modern services improve, it is less likely that a single individual can be granted access to the entire service. Instead, partial access is more likely, and is also considered by the analysis in some embodiments.

Lastly, not only are the services distributed, but the execution of a single authorization decision is also now distributed. For example, it is not uncommon for one portion of the decision to be executed at the identity provider, while another portion is executed in the service itself. In some embodiments, the analysis includes a logical centralization that decouples the access controls from their distributed implementation. In other words, some embodiments provide for the ability to understand the service access permissions without the complications of the underlying distribution.

Some embodiments of the invention provide a solution architecture to provide logical centralization of permissions analysis in a distributed services and authorizations setting. In some embodiments, the solution architecture is a policy visibility system that performs a number of steps.

First, the policy visibility system imports the necessary permissions authorization policies from relevant enterprise services and transforms the policies in order to expose them for analysis and visualization purposes. Policies relevant for authorization from the underlying systems may include, in some embodiments, access control lists (ACLs) defining the users and clients authorized to access a service. For example, most mature software systems include ACLs to restrict access. However, in other embodiments, such as for cloud and SaaS platforms, the allowed authorization rules may be more sophisticated expressions which include a separate subsystem with a proprietary policy language for defining access controls to the platform services. However, these sophisticated languages may also be considered ACL systems. In some embodiments, the policy visibility system imports the ACLs or policy languages. In some such embodiments, this information may be available over Application Programming Interfaces (APIs), necessitating that access to these APIs be included for the policy visibility system.

Next, once the ACLs and policies relevant for service authorization have been imported in some embodiments, the policy visibility system transforms the ACLs and policies to a basic permissions graph in which each user is connected to an accessible service (i.e., the user and service are represented by nodes on the permissions graph, and allowed access is represented by connections visualized as lines between nodes). In some embodiments, there are two options for approaching the computation of this permissions graph from the imported ACLs and policies.

The first approach to constructing the permissions graph, in some embodiments, is to translate the ACLs and policies to permissions. In some such embodiments, the ability to enumerate through all systems, in order to identify all user-to-resource connections in the permissions graph, is included in the system. Similarly, in some such embodiments, identifying the relevant policies might be non-trivial. First, in some such embodiments, there may be several policies to consider rather than a single policy. For instance, policies may be attached to services, users, roles, or individual resources themselves. In some such embodiments, simply knowing the user and service is not sufficient. Additionally, the policies of the roles of the user would need to be considered, since rules may collide in that a policy statement may include both allow and deny for a single user. In some such embodiments, the system may define "deny" as having a higher priority.

The second approach to constructing the permissions graph in some embodiments, rather than trying to determine who can access what by analyzing the policy itself, is to simply execute the policy for all possible user-service pairs. While the user-service space is a potentially large space to cover, the execution is easy to shard and scale across computing resources and has several advantageous properties. For example, the analysis executes the same decision that the services themselves do each time a service is accessed. As such, it is bound to be fast (i.e., low in computational complexity) and deterministic, both of which are properties that lend themselves to online evaluation. However, in some such embodiments, this approach necessitates the system to possess the capability to execute all of the imported ACLs and policies from all of the systems, as well as the ability to simulate the distributed execution of the policy decision. That is, if the access control decision spans both identity provider (i.e., determining the user's role) and service (i.e., enforcing policy based on the user's role), the execution in some such embodiments has to consider "multiple hops" between the identity provider(s) and the service provider(s).

Once the basic permissions graph connecting users to the services that they are allowed to access has been determined, the next step in some embodiments is for the policy visibility system to extend the graph with additional information, so the permissions graph is more useful for visualization and analysis purposes. In some embodiments, the permissions graph may be complemented with aggregates of users and resources as well as service usage over a particular period of time (defined either by an admin or user, or various predefined periods of time including but not limited to previous week, month, fiscal period, billing period, etc.). In particular, users and clusters of services may have interesting roles. In some embodiments, the permissions graph may be complemented with service usage. While analyzing the policies themselves provides information about permitted access, the actual recorded service usage information can further help in analyzing the permission. In some embodiments, if the graph is extended with the usage information, least-privilege analysis may be executed to determine which users have excessive permissions that are never exercised, which from a security point of view should be removed.

Finally, in some embodiments, once the extended permission graph is complete, the policy visibility system exposes the extended permission graph to visualization and analysis tools. In some such embodiments, the system provides a query interface over the graph.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 9 illustrates an example of the policy opcode and operand that can be used to implement API-authorization controls similar to those of the examples illustrated in FIG. 6-8

DETAILED DESCRIPTION

Figure 1:
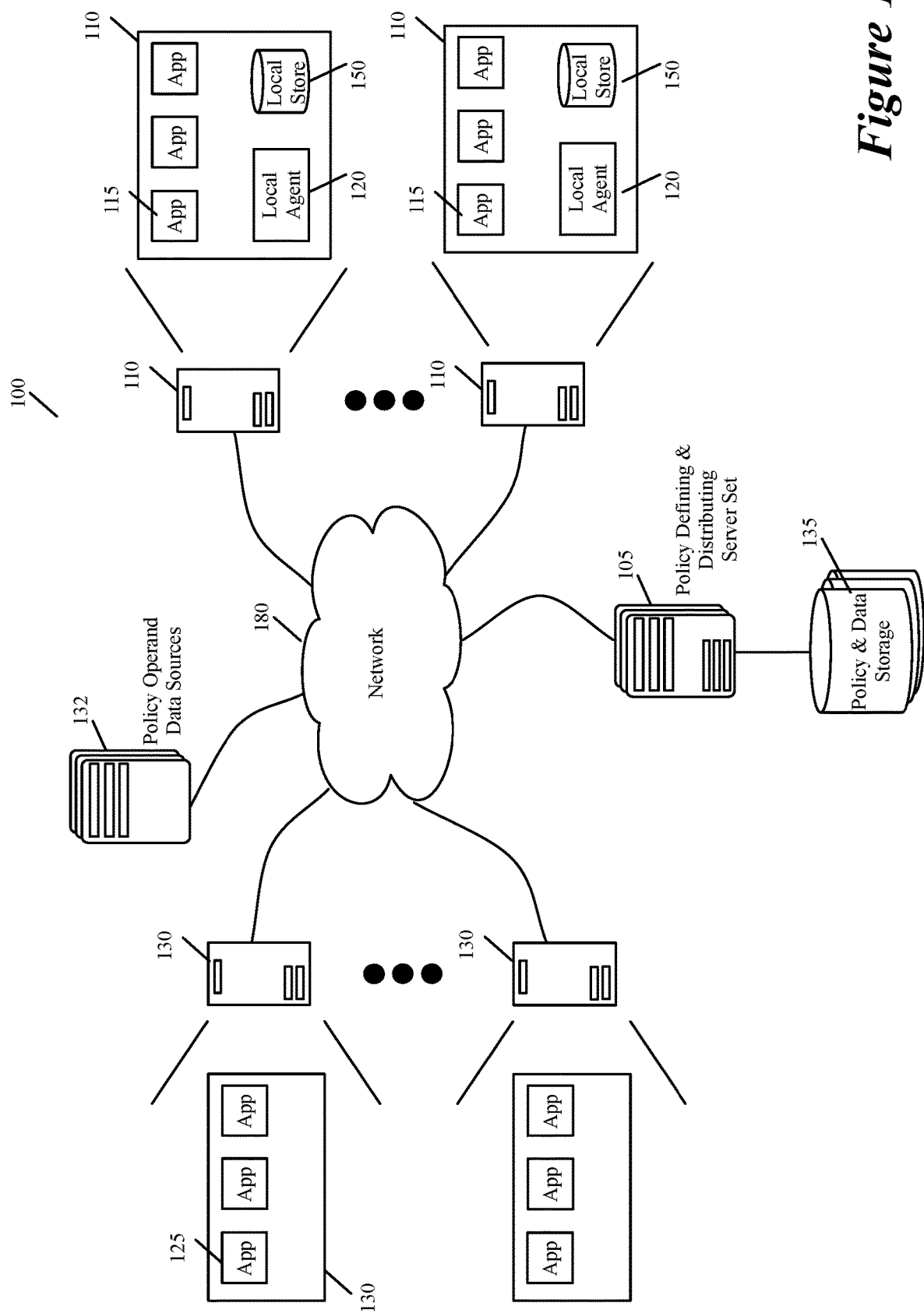
FIG. 1 conceptually illustrates the architecture of an API-authorization system.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a system for defining, distributing and enforcing policies for authorizing API (Application Programming Interface) calls to applications executing on one or more sets of associated machines (e.g., virtual machines, containers, computers, etc.) in one or more datacenters. This system has a set of one or more servers that acts as a logically centralized resource for defining, storing, and distributing policies and parameters for evaluating these policies.

The server set in some embodiments receives and stores definitions of several authorization policies for several API calls to one or more applications executing on a set of associated machines. In some embodiments, the server set can receive the policies through a web-based user interface (e.g., a web browser) or some other interface (e.g., an API interface that supports receiving policies from other applications). The server set in some embodiments allows these policies to be custom defined in terms of different sets of parameters for the different sets of applications that are used in the different deployment settings in which the server set is employed (e.g., for different tenants in a multi-tenant datacenter or different departments or divisions of a multi-department or multi-division entity).

Through one or more interfaces (e.g., web-based interfaces or other interfaces), the server set in some embodiments collects and stores parameters for evaluating the authorization policies to assess whether API calls should be authorized. For one or more sources (e.g., LDAP directories, etc.) in the datacenter(s), the server set in some embodiments has one or more data-source adapters that collect parameters from these data sources and store these parameters in order to evaluate the authorization policies to assess whether API calls should be authorized. The server set also allows such parameters to be entered through a web-based user interface.

The collected parameters in some embodiments are specific to each set of related machines (e.g., for each tenant in a multi-tenant datacenter or each department or division of a multi-department or multi-division entity) for which the server set defines and distributes policies. The server set in some embodiments updates these parameters dynamically in real time. Accordingly, in some embodiments, the server set uses, collects, and updates parameters for resolving policies dynamically and in a deployment specific manner (i.e., in a manner that can be context specific for each set of associated machines for which the server set is deployed). The dynamic and deployment-specific way that the server set collects and updates policy-resolving parameters greatly enhances the configurability of the sever set in each deployment. This is because the server set not only allows custom policies to be defined for each deployment based on the deployment-setting specific parameters, but also allows these policies to be resolved based on dynamically changeable parameters for each specific deployment.

For each set of related machines, the server set in some embodiments stores the defined API-authorization policies, and collected parameters needed to resolve these policies, in a single hierarchical storage structure (such as a namespace) that can be accessed as a single runtime storage construct. The server set in some embodiments includes several modules for maintaining the policy and parameters in this runtime storage structure up to date. For instance, as mentioned above, the server set in some embodiments has one or more data-source adapters that receive and/or collect policy-resolving parameters for storage in the runtime hierarchical storage structure.

The server set in some embodiments identifies updates to parameters for evaluating the policies and stores these updates in this storage structure along with the authorization policies. In some embodiments, the runtime storage structure (e.g., the namespace) stores the policy for authorizing each API call as one or more lines of opcode (as one or more opcode expressions/statements). Each such policy is referred to as policy opcode in the discussion below. Also, policy operands in the discussion below refer to the parameters that are needed to resolve the policy opcodes for the API calls. The single storage structure stores such policy operands along with the policy opcodes. Policy operands can also accompany the API calls, or the API-authorization requests that are generated in response to such API calls.

In some embodiments, the server set distributes the defined policies and parameters to policy-enforcing local agents that execute near the applications that process the API calls. Different embodiments place the local agents in different positions with respect to their associated applications, as further described below. In some embodiments, the server set distributes different sets of policies and parameters to different local agents based on the policies that are relevant to the API-authorization processing for the applications associated with those agents.

From an associated application, a local agent receives API-authorization requests to determine whether API calls received by the application are authorized. In response to such a request, the local agent uses one or more parameters associated with the API call to identify a policy stored in its local policy storage to evaluate whether the API call should be authorized. To evaluate this policy, the agent might also retrieve one or more parameters from the local policy storage.

The local agent then uses the received or retrieved parameters to evaluate the retrieved API-authorization policy in order to determine whether the API call should be approved or rejected. Based on this evaluation, the local agent then sends a reply to the application that sent the API-authorization request, to specify whether the API call should be approved or rejected. In some embodiments, the applications send the API-authorization requests as RPC (Remote Procedure Call) messages, and the local agents send their replies to these requests as RPC reply messages.

In other embodiments, the authorization module sends its API-authorization requests to the local agent through other mechanisms (such as IPC (inter-process communication) messages) that initiate above the network stack. Also, in some embodiments, the API-authorization request does not come to the local agent from the application to which the API call is directed. For instance, in some embodiments, a first application intercepts an API call intended for a second application, and sends a request (e.g., through RPC, IPC, etc.) to authorize this API call to the local agent. When the local agent authorizes this request, the first application then passes the API call to the second application, while discarding this call when the local agent rejects this call. In some embodiments, the first application not only intercepts API calls to obtain authorization for these calls, but also intercepts these calls to first have them authenticated by a separate authentication service.

In some embodiments, the local agents are used to authorize API calls for both application domain logic (also called core logic or business logic) and application infrastructure logic. In other embodiments, the local agents are used to authorize API calls for application infrastructure logic but not application domain logic. Applications typically include application domain logic and application infrastructure logic. Application domain logic captures the domain rules for creating, storing, and manipulating data relating to the core functions of the application. For instance, in banking, domain logic captures the logic to calculate the monthly interests for bank accounts, prepare and calculate a mortgage offer (involving complex formulas using credit scores and other information available), or simply move funds between two accounts. In banking, domain logic would also be responsible for preparing the web page contents as customers access their bank accounts over the web.

Application infrastructure logic provides support functions that allow the application domain logic to run, and to run reliably and scalably. Examples of such support functions include integration functions with other applications (various protocol implementations), configuration management (logic might have configuration options), monitor and alert functions (to detect when the domain logic is down), schedule and thread management facilities (to run several logic instances is parallel for improved scalability), etc. While these functions are critical, they are not typically a concern of the application domain logic. Hence, decoupling API authorization for infrastructure logic simplifies the application code and allows the application's code to focus on the matters relevant to the application's core functions.

FIG. 1 illustrates an API-authorization system 100 of some embodiments of the invention. As shown, this system includes a server set 105, several host computers 110, a first set of applications 115 executing on the host computers 110, several local agents 120 executing on the host computers, and a second set of applications 125 executing on the same host computers 110 or other devices or computers 130. The various computers and devices of the system 100 communicatively connect to each other through a network 180, which can include one or more local area networks, wide area networks, wireless networks, a network of networks (e.g., Internet), etc.

The host computers 110 in some embodiments operate in one or more datacenters. In some embodiments, the server set 105 includes one or more servers that operate in the same datacenter as the host computers 110, while in other embodiments the server set operates in a different datacenter than one or more of the host computers. The server set 105 acts as a logically centralized resource for defining, storing, distributing and enforcing policies for authorizing API calls to the first set of applications 115 that execute sets of associated machines (e.g., VMs, containers, etc.) that execute on the host computers 110. In some embodiments, each set of associated machines is associated with one entity (e.g., belongs to a tenant in a multi-tenant datacenter or to one division of a corporation in a corporate datacenter). Accordingly, the server set can be used to define, store, distribute and enforce different sets of policies for authorizing API-calls for the set of applications 115 that belong to different entities in one or more datacenters.

In some embodiments, some of these applications execute on virtual machines (VMs) or containers on the host computers, while other applications execute over the operating systems of the host computers. Also, in some embodiments, some of the API calls to a set of associated applications 115 come from other applications in the same set, while other API calls to the application set come from other applications (e.g., applications 125). The second set of applications 125 execute on host computers or devices inside or outside of the server set's datacenter(s) for which the server set does not enforce policies.

To define and store policies, the server set 105 in some embodiments receives and stores definitions of several authorization policies for a number of API calls to a set of associated applications. In some embodiments, the sever set can receive the policies through a web-based user interface (e.g., a web browser) or some other interface (e.g., an API interface that supports receiving policies from other applications). The server set in some embodiments allows these policies to be custom defined in terms of different sets of parameters for the different sets of applications that are used in the different deployment settings in which the server set is employed (e.g., for different tenants in a multi-tenant datacenter or different departments or divisions of a multi-department or multi-division entity).

Through one or more interfaces (e.g., web-based interfaces or other interfaces), the server set 105 in some embodiments receives parameters for evaluating the policies. For one or more policy operand data sources 132 (e.g., from tenant LDAP directories, etc.) in the datacenter(s), the server set in some embodiments has one or more adapters that collect parameters from these data sources and store these parameters in order to evaluate the authorization policies to assess whether API calls should be authorized. The server set also allows such parameters to be entered through a web-based user interface.

For each set of related applications or machines (e.g., for each tenant in a multi-tenant datacenter), the server set in some embodiments stores the defined authorization policies and collected parameters in a single hierarchical storage structure 135. In some embodiments, the hierarchical storage structure allows each particular policy and a set of collected parameters associated with the particular policy to be retrieved by providing a location identifier (e.g., a path) that identifies a location in the hierarchical storage structure that stores the particular policy. In some embodiments, this location also stores the set of collected parameters for the particular policy. In other embodiments, this location either stores the set of collected parameters for the particular policy or stores one or more location-identifiers for one or more locations in the hierarchical storage structure at which the set of collected parameters is previously stored in the structure. The hierarchical storage structure in some embodiments is a namespace that stores the policies and the parameters for resolving these policies for the set of related machines.

In some embodiments, each authorization policy is defined by policy opcode in the namespace, while the parameter set for this authorization policy is defined as policy operands that are associated with the policy's opcode and that are stored in the namespace. The policy opcodes in some embodiments are written in a declarative language. Also, in some embodiments, the policy operands are written in a language-independent, structured format, such as JSON (JavaScript Object Notation) format or YAML (initially, "Yet Another Markup Language" and later, YAML Ain't Markup Language). Typically, such formats (e.g., JSON, YAML, etc.) are human readable. Alternatively or conjunctively, in some embodiments, the policy operands are expressed in other formats, e.g., binary format, etc.

The server set in some embodiments identifies updates to one or more parameter sets (e.g., to one or more operands) for one or more one policies (e.g., policy opcodes), and stores these updates in the namespace. The server set in different embodiments employs different techniques for updating the policy operands. For instance, in some embodiments, the data source adapters of the server set identify operand updates by retrieving the updates from the data sources 132 of the operands through data pull operations and/or by receiving the updates from these data sources 132 through data push operations.

In some embodiments, the server set distributes the defined policies and parameters to local agents 120 that enforce these API-authorization policies for the applications 115, and these local agents 120 store the distributed policies and parameters in their local policy/parameter store 150. In some of the embodiments that store the policies and parameters in a namespace, the server set distributes different portions of the namespace to different host computers based on the policies that are relevant to the API-authorization processing for the first set of applications 115 executing on the different host computers. The different portions that are distributed to the different host computers can be overlapping in some embodiments.

For instance, to a first computer, the server set 105 distributes a first portion of the namespace that comprises policies and parameter sets relevant for processing API calls to a set of applications executing on the first computer, while distributing a second portion of the namespace that comprises policies and parameter sets relevant for processing API calls to a set of applications executing on the second computer, with the first and second namespace portions differing in that at least one policy and at least one parameter set of the first portion is not in the second portion. These two namespaces can either have no policies or parameters in common, or have one or more policies and parameters in common. Each local agent 120 stores its local portion of the namespace that it receives from the server set 105 in its local policy/parameter store 150.

In some embodiments, the server set 105 uses a push model to distribute the policy/parameters (e.g., the relevant namespace portions) to each local agent 120. In other embodiments, the server set uses a pull model to distribute the policy/parameters. For instance, in these embodiments, once a local agent initializes, it queries the server set for policies and parameters relevant to it. In these embodiments, the local agent also periodically polls the server set to determine whether policies or parameters that the local agent previously received have been updated on the server set, and thereby need to be copied on the local agent's portion of the namespace. When such updates exist, the local agent retrieves them from the server set or receives them as part of its querying poll.

The local agent 120 executing on a host computer 110 receives requests to determine whether API calls received by one or more applications 115 executing on the host computer are authorized. The local agent in some embodiments receives each request to authorize an API call to an application from an authorization module of that application. In some embodiments, the authorization module of an application sends its API-authorization requests to the local agent through an RPC (Remote Procedure Call) message that is forwarded to the local agent by a network communication stack (e.g., the network stack executing on the application's host computer, the application's VM, or the application's container). In other embodiments, the authorization module sends its API-authorization requests to the local agent through other mechanisms (such as IPC (inter-process communication) messages) that again, initiates above the network stack.

In response to such a request, the local agent 120 uses one or more parameters associated with the API call to identify a policy (e.g., policy opcode) stored in its local policy storage (e.g., stored in its local namespace) to evaluate in order to determine whether the API call should be authorized. The received API-authorization request contains one or more parameters associated with the API call (e.g., one or more parameters that identify the API call, its type and/or other metadata about the API call). In some embodiments, at least one parameter in the request is received by the application in the API call.

For instance, in some embodiments, the application receives the API call as part of the payload of one or more data messages (e.g., data packets) that the application receives, and at least one parameter in the first parameter set is a parameter that is part of the payload of the received data message(s). One or more modules (i.e., processes) are typically used to extract this payload for processing. For example, a layer 4 security process (e.g., a transport layer security (TLS) process) might have to decrypt one or more packet payloads in order to obtain the API call and its parameters in plaintext format (as opposed to the cipher text format in which they are received).

To evaluate the identified policy for the API call, the agent might also retrieve one or more parameters (e.g., operands) from the local policy storage (e.g., from its copy of the namespace). The local agent then uses the received or retrieved parameters to evaluate the retrieved API-authorization policy in order to determine whether the API call should be approved or rejected. For instance, in some embodiments, the retrieved policy opcode includes one or more rules that specify one or more conditions for approving or rejecting the API calls. The agent resolves these conditions based on the received or retrieved parameter(s) associated with the API call (e.g., the agent determines that one or more received or retrieved parameters match a condition specified by the policy opcode for rejecting an API call).

Based on this evaluation, the local agent then sends a reply to the application that sent the API-authorization request, to specify whether the API call should be approved or rejected. In some embodiments, the local agent sends its reply to the API-authorization request as an RPC reply message. When the API call is approved, the particular application then performs the operation associated with the API call, and if necessary, returns an output to the source of the API call (i.e., to the module that sent the API call) to the particular application. On the other hand, when the API call is rejected, the particular application sends the message to the source of the API call to reject the call, or simply discards this call without providing a response to the source of the API call.

In some embodiments, the local agents operate in the same failure domain as the machines on which the applications execute. For instance, when an application executes on a virtual machine (VM) or container, the local agent in some embodiments executes on the same VM or container as the application. In other embodiments, the local agent does not execute on the same VM or container as its associated application, but executes on the same host computer as the application's VM or container.

In some embodiments, each local agent is associated with just one application that executes on the same computer, same VM or same container as the local agent. In other embodiments, one local agent in some embodiments can be shared by multiple applications that execute on the same VM, container, or host computer as the agent. However, in a multi-tenant datacenter, some embodiments do not allow local agents to be shared by applications executing on different tenants' computers, VMs or containers. Other embodiments, on the other hand, allow one local agent to be used by different applications of different tenants.

Some embodiments have the local agents operate within the same failure domain as the applications (e.g., micro service applications) in order to ensure that the policy functionality remains highly available and responsive at all times. Having local agents authorize API calls is very useful for micro-service applications as it provides a mechanism to implement complex API-authorization policies without adding to the micro-service applications the functional complexity needed to process rich API-authorization policies. This approach is also useful as it extracts the API-authorization processing from the application's code base, and therefore makes this processing easier to change dynamically over time. It also allows API-authorization processing for a large number of applications in a datacenter to be controlled in a logically centralized way through the server set.

As mentioned above, the server set in some embodiments distributes policies and parameters to local agents so that they can evaluate API-authorization requests locally. Conjunctively or alternatively, the server set in some embodiments also processes API-authorization requests from some or all of the applications 115. For instance, in some embodiments, it might not be feasible or desirable to perform the API-authorization on the same computer or failure domain as the application, e.g., the operating system restricts the type of agents installed, or the API-processing application executes on devices with limited computational resources (e.g., IoT (Internet of Things) devices). Also, in some embodiments, the response time for the API-authorization decision is not as crucial as the requested operations can be gradually rejected, or a limited access to the application can be provided until the API calls are authorized.

Accordingly, in some embodiments, an API-authorization module of an application executing on a computer sends an API-authorization request (e.g., as an RPC message) to a local agent on the same computer, and this local agent forwards this request (e.g., as another RPC message) to the server set. In other embodiments, the API-authorization module of the application sends the API-authorization request (e.g., as an RPC message) directly to the server set.

The received API-authorization request contains a first parameter set associated with the API call. As before, the first parameter set includes at least one parameter that identifies the API call, its type and/or other metadata about the API call, and can include one parameter that was received as part of the API call. After receiving the API-authorization request, the server set then uses one or more parameters in the first parameter set to retrieve a policy (e.g., policy opcode) related to the API call from its policy/data storage 135 (e.g., from its namespace for the set of associated machines to which the application belongs). To evaluate this policy, the server set might also retrieve one or more parameters from its policy storage 135 that are relevant for assessing the retrieved policy (e.g., retrieve policy operands from its namespace for the set of associated machines to which the application belongs). This retrieved set of parameters serves as a second set of parameters associated with the API call.

The server set then uses the received or retrieved parameters to evaluate the retrieved API-authorization policy in order to determine whether the API call should be approved or rejected. For example, in some embodiments, the server set resolves one or more conditions specified in the retrieved policy opcode based on one or more received or retrieved parameters (e.g., determines that one or more received or retrieved parameters match a condition specified by the policy opcode for rejecting an API call). Based on this evaluation, the server set then sends a reply (e.g., an RPC reply message) to the local agent or the application's authorization module to specify whether the API call should be approved or rejected. When this response is sent to the local agent, this agent then relays this message (e.g., as an RPC reply message) to the application's API-authorization module.

As mentioned above, the local policy and data storage 150 and the server policy and data storage 135 of some embodiments are hierarchical namespaces that store both policy opcode and policy operands that are needed for resolving the policy opcodes (i.e., both the code and the data on which the code operates). In some embodiments, the namespace is a document database in that it has no tables and instead is laid out as a single hierarchical document. This document forms one global namespace that holds all the data and policies. For instance, the following namespace structure is a hierarchical layout of a policy-and-document database that stores three JSON data documents and two policies:

/a/b/doc_1.json
/a/b/doc_2.json
/c/d/doc_3.json
/d/policy_A
/e/f/policy_B

In this example, there are two JSON documents at namespace location '/a/b' and a third JSON document at '/c/d', while the two policies are saved at '/d' and '/e/f'.

As a namespace merges the data and policies into one global hierarchical layout, database clients can access a nested portion of the namespace simply by requesting data by its fully qualified name. Moreover, to access a portion of policy operand document 1, the client can simply request the data with name:

/a/b/doc_1/ some_portion.

The same applies to policies: the namespace evaluates the policies on-the-fly when client accesses the namespace. That is, client can simply access the results of a "policy evaluation" by referring the policy and its relevant portion. For instance, a client can request /e/f/policy_B/some_computed_result, which would make title database take the source of code of the policy B, compute the policy using any data necessary that the policy may need underneath and then pass the requested portion of the policy results back to the client.

Figure 2:
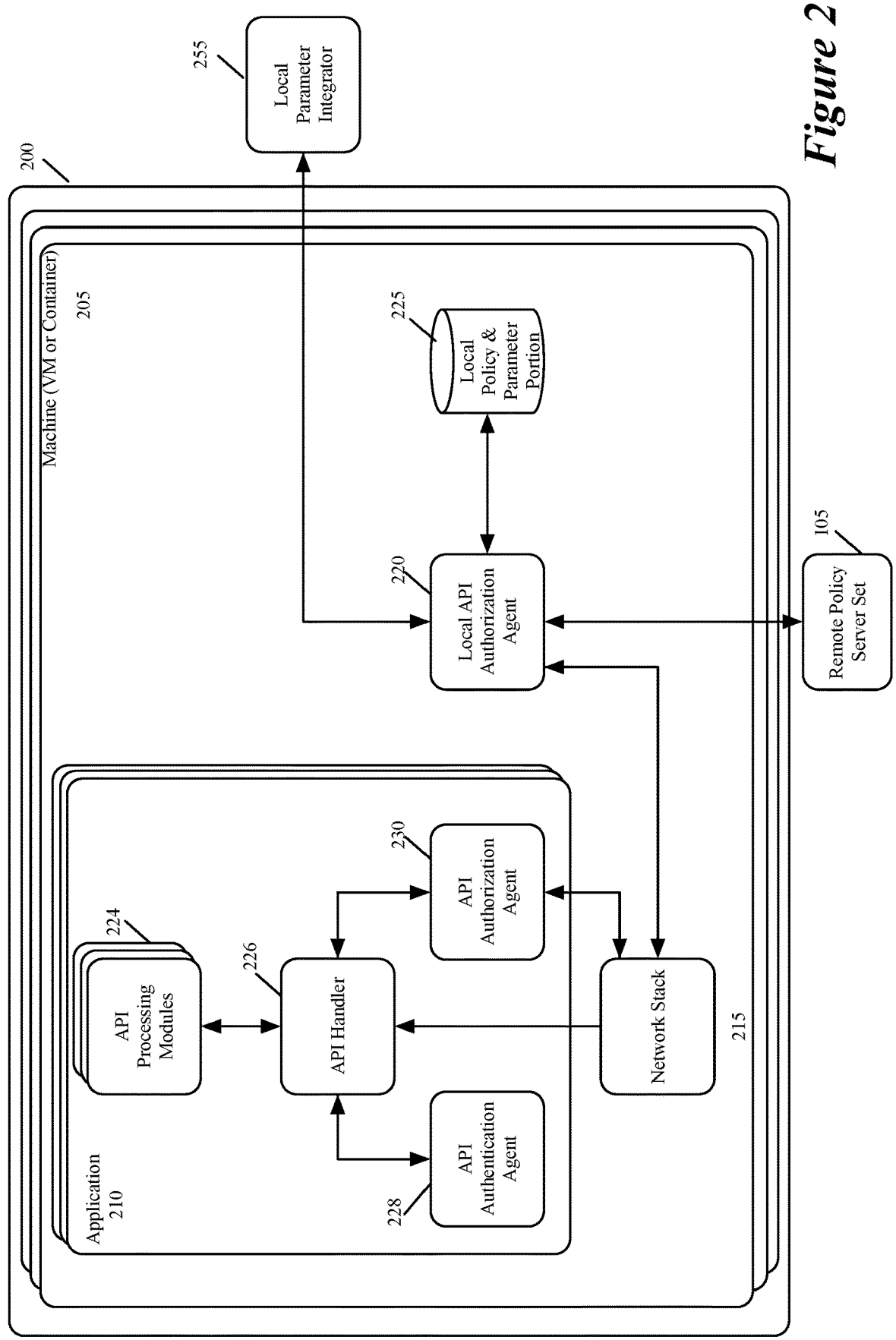
FIG. 2 conceptually illustrates the host-side software architecture of the API-authorization system.

FIG. 2 illustrates the host-side software architecture of the API-authorization system 100 of some embodiments. Specifically, it illustrates a host computer 200 on which multiple machines 205 (e.g., multiple VMs or containers) execute. On each machine 205, multiple applications 210 can execute to process API calls from other modules on the host computer 200 or on other host computers or devices in the same datacenter or outside of the datacenter.

In addition to these applications, each machine 205 also has a network stack 215 and a local API-authorizing agent 220. The network stack 215 is a software communication stack (e.g., TCP/IP stack) that implements a network communication protocol suite to allow the applications and processes of the machine 205 to communicate with each other, and with applications and processes executing outside of this machine (e.g., on the same host computer 200 or on other computers or devices). When the machine 205 is a container, its network stack is the network stack of the VM or operating system on which the container executes. Also, the network stack of a machine often connects with another module (e.g., a software switch) on the host computer, which, in turn, interfaces with a physical network interface card (NIC) of the host computer.

One set of communications that the network stack 215 facilitates is the communication between an application's API-authorizing agent 230 on an application and the local API-authorizing agent 220. As further described above and below, the network stack passes RPC data messages between the application agent 230 and the local agent 220. The local agent 220 enforces API-authorization policies for the applications that execute on the machine 205. Specifically, from the application API-authorizing agents 230 of the machine 205, the local API-authorizing agent 220 receives API-authorization requests for different APIs that the applications 210 receive.

For each such request, the local agent 220 retrieves the API-authorization policy associated with the request (i.e., associated with API call to which the request pertains) from its local policy and parameter storage 225. The local agent 220 retrieves this policy by using one or more parameters that are associated with the API call and that were received with the API call or the API-authorization request. From the policy/parameter storage, the local agent 220 can also retrieve one or more parameters for evaluating this policy.

The local storage 225 stores policies and parameters that the server set 105 has previously provided to the local agent 220. In some embodiments, this storage also stores parameters that the local agent previously receives from a local parameter integrator 255. This integrator allows an entity in the datacenter (e.g., a tenant or a department) to separately provide some or all of the parameters for evaluating the API-authorization policies. For instance, this integrator allows the entity to export highly confidential parameters into an API-authorization policy enforcement node without providing these parameters to the server set 105.

The local agent 220 then evaluates the retrieved policy based on parameter(s) received with the API-authorization request, or retrieved from the local storage 225. Based on its evaluation, the local agent then determines whether the API call should be approved or rejected. The local agent then sends the application API-authorizing agent 230 that sent the API-authorization request, a reply to specify whether the API call should be approved or rejected. In some embodiments, the API-authorizing agent 230 sends the API-authorization requests as RPC (Remote Procedure Call) messages, and the local agents send their replies to these requests as RPC reply messages.

In the example illustrated in FIG. 2, each machine 205 has its own local API-authorization agent 220. Each such local agent 220 on a machine 205 can process API-authorization requests from one or more applications 210 executing on the machine. Having the local agent 220 operate on the same machine as its associated application 210 is beneficial as in this way, both these components operate in the same failure domain, which improves agent's availability and its speed of processing API-authorization requests. However, in other embodiments, the applications on multiple machines on a host computer share the same local agent. For instance, in some embodiments, the local agent operates as a service VM or container on a host computer, and applications on multiple VMs and/or containers use this agent to have their API calls authorized. Instead of having the local agent operate as a service VM or container in the user space, other embodiments have the local agent operate as another type of process on the host computer that is accessed by multiple applications on multiple VMs and/or containers on a host computer.

As shown in FIG. 2, each application has an API handler 226, an API-authentication agent 228, and one or more API processing modules 224, in addition to the API-authorizing agent 230. An API processing module 224 is a module (e.g., an object) that performs an operation based on an API call to it. The API authentication agent 228 is the module that authenticates the identity of the API-call's source (e.g., validates the access credentials associated with the API call). When the API call is authenticated, the API authorization agent 230 determines whether the API call is authorized (i.e., whether the operation associated with the API call should be performed). The API handler 226 is the module that initiates the authentication operation and authorization operation for each API call. In some embodiments, the API handler is implemented by authentication and/or authorization code of the API processing modules (e.g., this handler is implemented in some embodiments by authentication and authorization code within each API processing object of an application).

Figure 3:
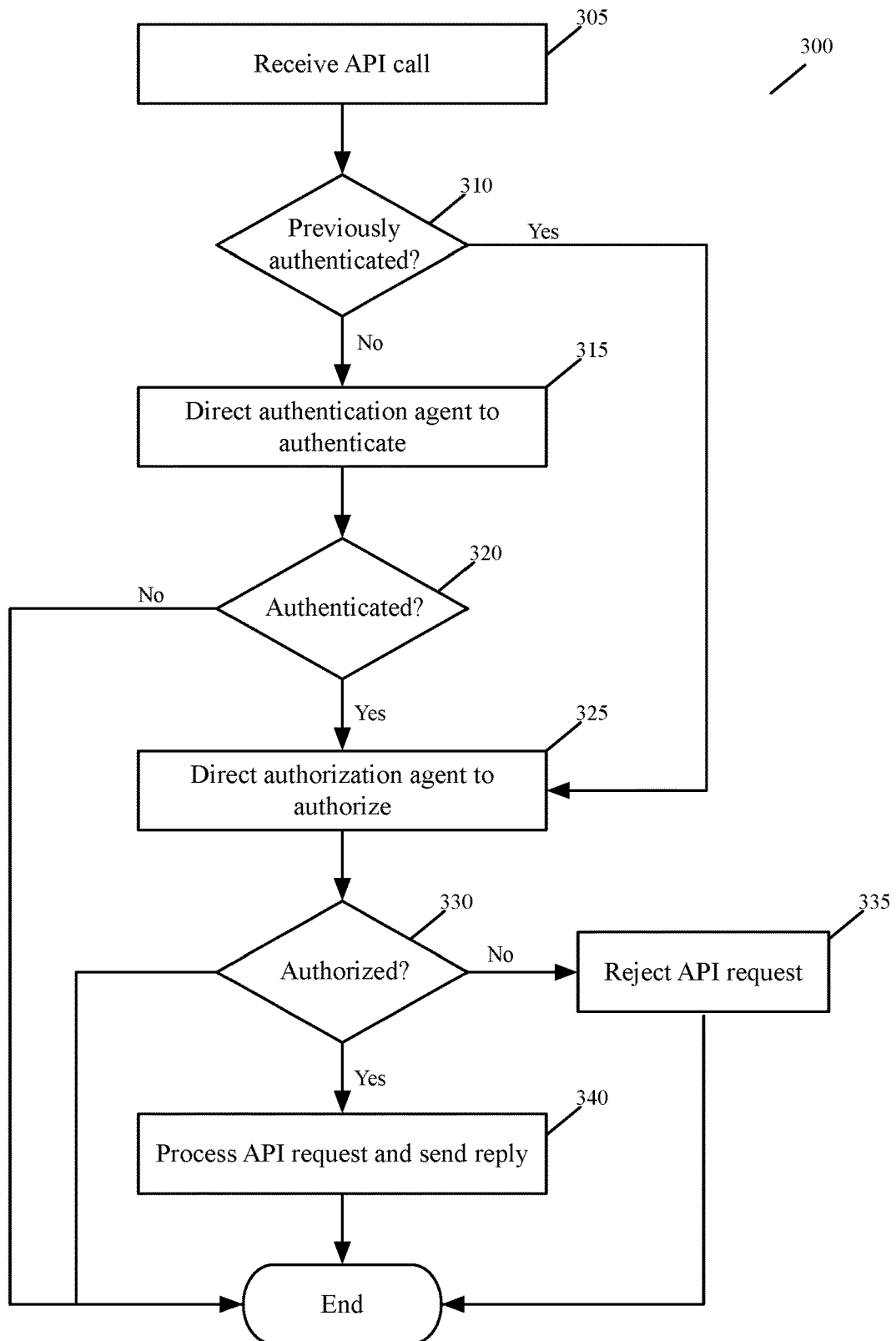
FIG. 3 illustrates a process that an application performs when it receives an API call.

To further explain the operations of the components of the application 210, FIG. 3 illustrates a process that an application 210 performs when it receives (at 305) an API call. In some embodiments, the application 210 performs this process only for an API call that relates to an application infrastructure operation. In other words, an application 210 does not call the local agent 220 in some embodiments for API calls that relate to an application's core logic operations. In other embodiments, the local agent 220 handles API-authorization requests for both core logic API calls and infrastructure logic API calls.

When an API call is received, it has to be authenticated in some embodiments to validate the identity of the source of the API call. The API handler 226 uses the API authentication agent 228 to authenticate the identity of the source of the API call, e.g., to authenticate the credential set (e.g., certificate, username and/or password) accompanying the API call. Accordingly, as shown, the API handler 226 initially determines (at 310) whether the received API call is part of a communication session that was previously authenticated by the authentication agent 228 (e.g., part of a communication session that the authentication agent 228 previously stored a cookie). If so, the process transitions to 325, which will be further described below. Otherwise, when the API call is not part of a communication session that was previously authenticated, the API handler 226 directs (at 315) the authentication agent 228 to authenticate the API call. In some embodiments, each API call has to be independently authenticated irrespective of whether any prior API call in the same communication session has been authenticated.

In some embodiments, the API authentication agent 228 authenticates (at 315) the identity of the source of the API call by authenticating the credential set that is part of the API call. The application receives an API call as part of one or more data messages, each of which has a header and a payload. The payload of each such message contains all or part of the API call and one or more associated parameters, e.g., parameters that provide the credentials (e.g., username, password, user identifier, group identifier, certificate, etc.) of the source of the API call.

In some embodiments, the API authentication agent uses modules (e.g., third-party credential authenticating programs) executing outside of the application 210 to authenticate the API call. In these embodiments, the authentication agent 228 passes a set of source-identifying parameters that identifies the source of the API call to the external module, so that this module can authenticate the source of the API call. One or more parameters in this set can be parameters that were received with the API call.

After directing (at 315) the authentication agent to authenticate the source of the API call, the API handler (at 320) determines whether the authentication agent 228 reply indicates that the API call has been authenticated. If not, the API handler discards the API call and the process 300 ends. In some embodiments, the API handler 226 not only discards the API call but also sends a reply to the source of the API call to reject the call.

On the other hand, when the authentication agent 228 authenticates the source of the API call, the API handler 226 directs (at 325) the application API-authorizing agent 230 to authorize the API call. In response, the application agent 230 sends an API-authorization request to the local API-authorizing agent 220. To do this, application agent 230 generates (at 325) an RPC message to the local agent 220 to pass along this request with information about the API call (e.g., one or more parameters that describe the API call and one or more parameters associated with this call). The network stack 215 passes this RPC message to the local agent 220.

After receiving the API-authorization request from application authorizing agent 230, the local agent 220 uses (at 325) one or more of the received parameters to retrieve a policy for authorizing the API call from the local storage 225. In the embodiments in which the local storage 225 stores the policy and associated parameters in a namespace, the local agent uses one or more of the parameters in the API-authorization request to retrieve policy opcode related to the API call from the namespace. To evaluate this policy opcode, the agent might also retrieve parameters (e.g., policy operands) from the local storage (e.g., from the namespace) that are associated with the retrieved policy.

The local agent then uses the received parameter set and/or retrieved parameter set to evaluate the retrieved API-authorization policy (e.g., the retrieved opcode) in order to determine whether the API call should be approved or rejected. In the embodiments that express each policy in terms of policy opcode that has one or more rules that specify one or more conditions for approving or rejecting the API calls, the agent resolves these conditions based on the received and/or retrieved parameters. For instance, in some embodiments, the agent determines that one or more parameters in the received parameter set and/or retrieved parameter set match a condition specified by the policy opcode for rejecting the API call. In some embodiments, the conditions can specify reasons for allowing an API call.

Some API-authorization policies are resolved only by reference to the received parameter sets (i.e., only specify conditions that just need the received parameter sets to be resolved). Other API-authorization policies are resolved only by reference to the retrieved parameter sets (i.e., only specify conditions that just need the received parameter sets to be resolved). Still other API-authorization policies are resolved by reference to both the received and retrieved parameter sets (i.e., specify conditions that need both the received and retrieved parameter sets to be resolved).

After evaluating the retrieved policy, the local agent then sends (at 325) a reply message to the application API-authorizing agent 230 to return the results of its evaluation (e.g., to specify whether the API call should be allowed or rejected). In some embodiments, this reply message is an RPC reply message that is directed back to the application agent 230 through the network stack 215. Once the application agent 230 receives the reply from the local agent 220, it passes the local agent's approval or rejection of the API call to the API handler.

After directing (at 325) the authorization agent to authorize the API call, the API handler (at 330) determines whether the application API-authorizing agent's reply indicates that the API call has been authorized. If not, the API handler discards the API call and the process 300 ends. In some embodiments, the API handler 226 not only discards the API call but also sends a reply to the source of the API call to reject the call.

On the other hand, when the authorization agent 230 returns a reply that indicates that the API call has been approved, the API handler 226 directs (at 340) the API-processing module 224 that is associated with the API call to perform the operation associated with the API call and to provide a reply message to the source of the API call to indicate the completion of this operation. In some cases, this operation requires an output to be generated and returned to the source of the API call or to some other destination. In these cases, the API processing module generates this output and provides this output to the source of the API call or to the other destination. After 340, the process 300 ends.

One of ordinary skill will realize that the process 300 is implemented differently in other embodiments. For instance, the API-processing application does not perform the authorization/authentication check operations of the process 300. Instead, a proxy authentication/authorization application performs these operations. In these embodiments, the proxy first application intercepts an API call intended for a second application, and sends a request (e.g., through RPC, IPC, etc.) to authorize this API call to the local agent. When the local agent authorizes this request, this proxy first application then passes the API call to the second application, while discarding this call when the local agent rejects this call. In some embodiments, the first application not only intercepts API calls to obtain authorization for these calls, but also intercepts these calls to first have them authenticated by a separate authentication service.

Also, the process 300 discards an API call when this call is not authenticated. In other embodiments, the process 300 does not discard such an API call. For instance, in some embodiments, the process 300 passes the authentication failure of an API call to the local agent. This agent then uses this failure like a received parameter to resolve one or more conditions associated with the policy (retrieved from its namespace portion) that it evaluates to determine whether to authorize the API call.

Figure 4:
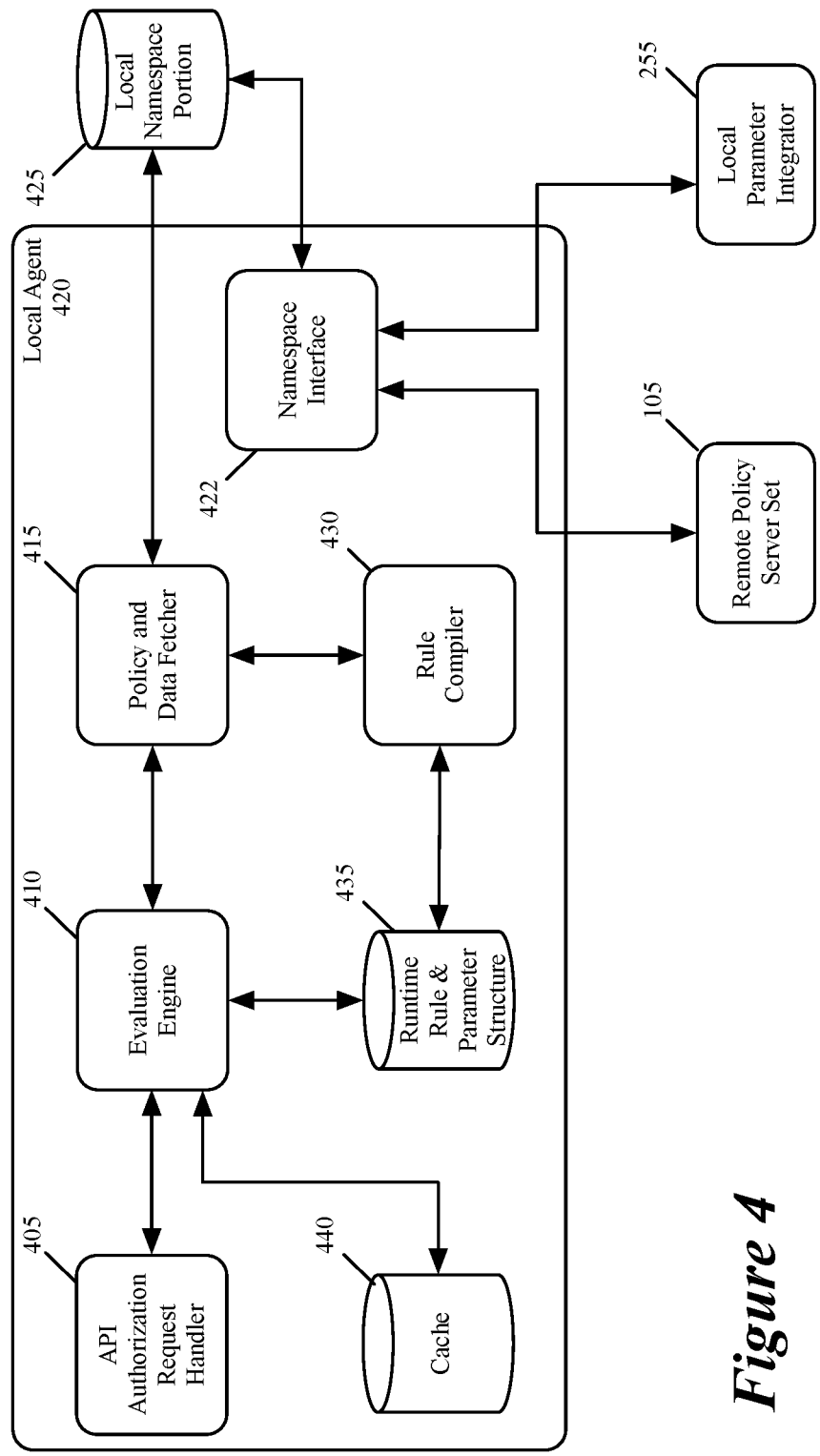
FIG. 4 conceptually illustrates the architecture of a local agent.

FIG. 4 illustrates a more-detailed view of a local agent 420 of some embodiments. In this example, the local agent 420 uses a local namespace portion 425 as the local policy and data storage 225. This namespace contains both (1) policy opcodes to evaluate API calls to determine whether they should be authorized, and (2) operands to evaluate and resolve the opcodes. In some embodiments, the namespace portion 425 contains the policy opcodes and operands needed for the API calls that are received by one or more applications on the agent's host that use the local agent. In other embodiments, the local agent has a different namespace portion for different applications.

The local agent 420 has a namespace interface 422 that receives and stores the namespace portion and updates to all or part of this portion from the remote policy server set 105. This interface also receives policy operands from local parameter integrator 255, which, as mentioned above, can be used in some deployments to store policy operands in the namespace that are not provided to the server set 105 (e.g., to maintain the confidentiality of such policy operands). Upon the initialization of the local agent 420, the namespace interface 422 in some embodiments initially queries the server set to obtain the namespace(s) for the applications that will use the local agent. Also, in some embodiments, the namespace interface 422 periodically polls the server set to determine whether any policy or operand in its namespace has been added, deleted or modified, and if so, the namespace interface updates its local namespace portion 425 to reflect this change (e.g., to download any new and/or modified policy and/or operand and store the downloaded policy and/or operand in the namespace portion).

Figure 5:
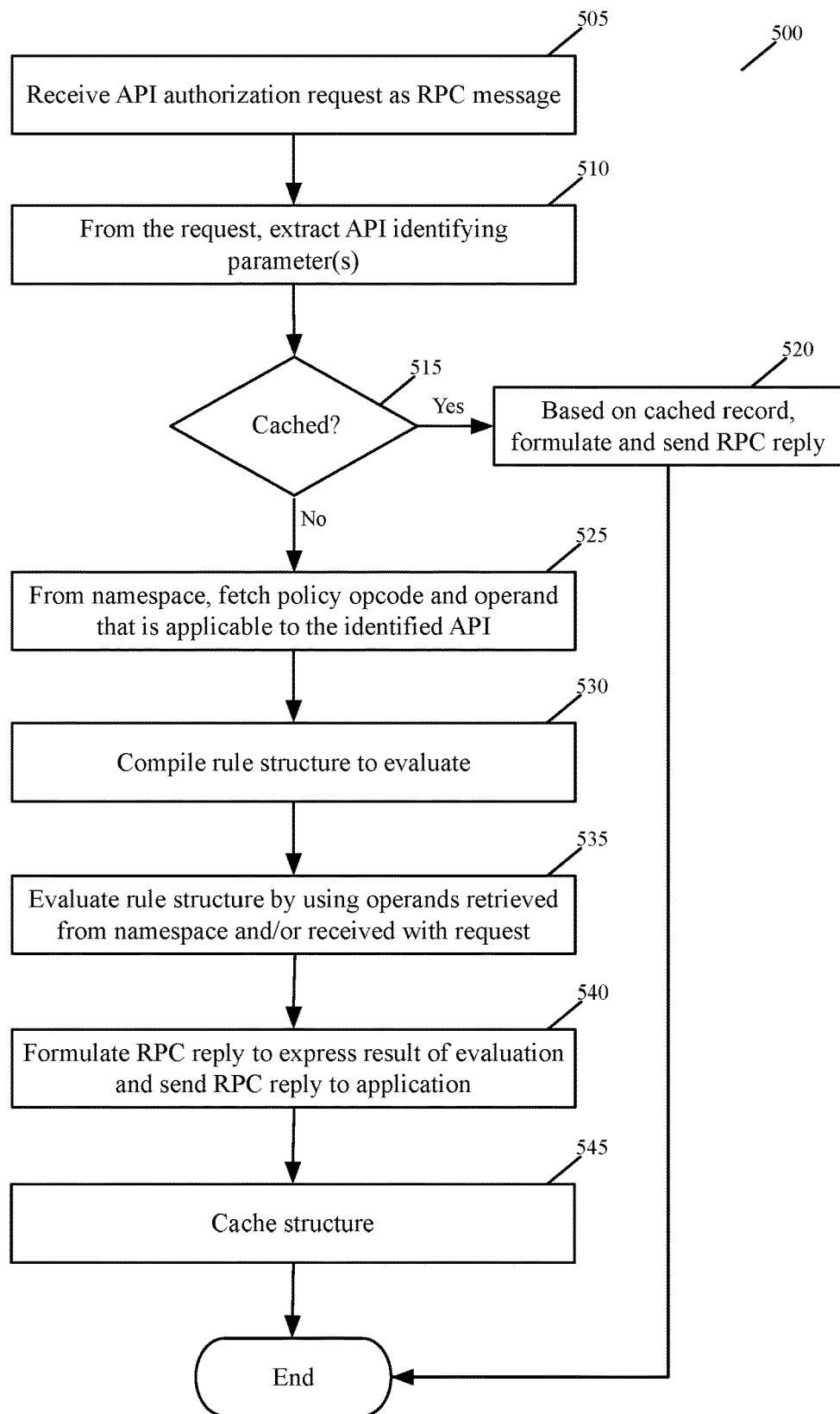
FIG. 5 illustrates a process that the local agent performs when it receives a request to authorize an API call from an API-authorizing agent of an application that executes on the same host as the local agent.

In addition to the namespace interface 422, the local agent 420 includes a request handler 405, evaluation engine 410, policy and data fetcher 415, and rule compiler 430. The operations of these modules will be described by reference to FIG. 5, which illustrates a process 500 that the local agent 420 performs when it receives a request to authorize an API call from an API-authorizing agent 230 of an application 210 that executes on the same host as the local agent 420.

As shown, the process 500 starts (at 505) when the agent's API-authorization request handler 405 receives an API-authorization request from the application's agent 230. This request is received in some embodiments as an RPC message that includes a set of parameters associated with the API call that the application has received. In some embodiments, this parameter set includes a parameter that identifies the API call and one or more metadata parameters associated with the API call. Also, in some embodiments, this parameter set includes one or more parameters that the local agent needs to resolve policy opcode that is associated with the API call and that is retrieved from the local namespace portion 425 by the local agent. Accordingly, after receiving the RPC message, the handler extracts (at 510) this parameter set from the RPC message's payload and provides this parameter set to the evaluation engine 410. This parameter set identifies the API call as mentioned above.

The evaluation engine is responsible for evaluating policy opcode related to the API call (i.e., the API call specified in the API-authorization RPC message) based on one or more parameters received with the RPC message and/or retrieved from the local namespace. Before evaluating this opcode based on one or more associated parameters, the evaluation engine needs the policy and data fetcher 415 to retrieve from the local namespace portion 425 the policy opcode and operands applicable to the identified API call, and the rule compiler 430 to create a more optimal runtime rule and parameter structure 435 for the evaluation engine to process. The evaluation engine also stores compiled rule structures for prior API-authorization requests in a cache storage 440, so that it can forego retrieving and compiling the same policy opcode/operands when it subsequently receives the same API call.

In view of this functionality, after identifying (at 510) the API call associated with the received request, the evaluation engine determines (at 515) whether the cache storage 440 stores a reference to a rule structure for this API call that was previously compiled when the local agent received the same API-authorization request previously. In some embodiments, the cache 440 identifies each stored rule structure in terms of one or more parameters that are passed along with the API-authorization request to the local agent 420 by the API-authorization agent 230. Hence, in these embodiments, the evaluation engine determines whether the parameters passed along with the current request matches the parameters stored for the rule structures identified in the cache storage 440.

If so, the evaluation engine processes (at 520) this previously specified rule structure to formulate its decision, and then provides (at 520) its decision (i.e., its "authorization" or "rejection") to the request handler 405. At 520, the API handler then formulates an RPC reply message with this decision in its payload and sends this reply message to the authorization agent 230 that sent the request. After 520, the process 500 ends.

On the other hand, when the evaluation engine determines (at 515) that the cache storage does not store a reference to a previously defined rule structure for the API call identified in the received request, the evaluation engine directs (at 525) the policy and data fetcher 415 to retrieve from the local namespace portion 425 the policy opcode and operands applicable to the identified API call. As described above and further described below, the namespace is a hierarchical structure that stores policy opcode associated with an API call in a location (e.g., a path) in the structure that can be specifically identified based on the API call's identifier (e.g., the name associated with the API call). In some embodiments, this location also stores the operands needed for processing this policy opcode and/or stores a location identifier (e.g., the path) that specifies other location(s) in the namespace that store the operands needed for processing the policy opcode. Hence, in some embodiments, the fetcher 415 can easily identify the policy opcode and operands to retrieve by just using parameters associated with the API call.

After retrieving the policy opcode and one or more associated operands, the fetcher 415 directs (at 530) the rule compiler 430 to create a more optimal runtime rule and parameter structure 435 for the evaluation engine to process. As described above, the policy opcode for an API call includes one or more rules, with each rule expressing one or more conditions for rejecting (or allowing) the API call. In some embodiments, the optimal runtime rule and parameter 435 structure includes "prepared rules" that are generated by the compiler. Prepared rules are rules that are parsed from the retrieved, compiled and optimized policy opcode that is retrieved by the fetcher for the API call.

Prepared rules are ready for execution and thus require less effort to execute. In some embodiments, the prepared rules are expressed using an abstract syntax tree (AST). Some embodiments translate the AST into a sequence of executable instructions. These instructions are virtual instructions (not CPU instructions) that are easy to run fast, and even further optimize for speed. Some embodiments use known processes to compile and process prepared rules from declarative language code. Some of the known processes are described in *Handbook of Automated Reasoning* by Alan Robinson and Andrei Voronkov.

Once the rule compiler creates (at 530) the more optimal rule structure, it notifies (at 535) the evaluation engine 410 directly or through the fetcher 415. The evaluation engine then processes (at 535) the rules in this rule structure. In some embodiments, the evaluation engine uses the parameters retrieved from the namespace and/or received with the API request to resolve these rules (e.g., conditions specified by the rules).

After processing (at 535) the rule structure, the evaluation engine 410 provides its decision with respect to the API call (i.e., the "authorization" or "rejection" of the API call) to the handler 405. At 540, the handler then formulates an RPC reply message with this decision in its payload and sends this reply message to the authorization agent 230 that sent the request. Next, at 545, the evaluation engine stores in the cache 440 a reference to the optimized rule structure that it created at 530. This cached result can be kept as long as the retrieved policy opcode does not change: that way the evaluation engine can skip the parsing/compiling/optimization part (which can be more time consuming) and quickly start executing with minimal effort. As mentioned above, the evaluation engine 410 stores the cached rule structure by using a reference that is associated with one or more parameters that were received with the API call or the API-authorization request. After 545, the process ends.

In some embodiments, the process 500 not only caches the optimized rule structure for an API call's retrieved policy, but also caches the decisions that it reaches in processing the rule structure for a particular set of parameters. However, as each decision is dependent on the set of parameters that can dynamically change or can resolve the rules differently at different times or under different conditions, the process has to ensure that the previously cached decisions are still valid at a later instance in time when the API call is received again.

As mentioned above, the local agents in some embodiments are used to authorize API calls for both application domain logic and application infrastructure logic, while in other embodiments, the local agents are used to authorize API calls for application infrastructure logic but not application domain logic. Also, as mentioned above, decoupling API authorization for infrastructure logic simplifies the application code and allows the application's code to focus on the matters relevant to the application's core functions. This is especially the case because while infrastructure functions are critical, they are not typically a concern of the application domain logic.

For instance, in banking, it is the infrastructure part of the application that is responsible for maintaining micro-services' connections to an account database holding the actual account data (there could be many of those), providing the necessary HTTP facilities to allow the customers' browsers to retrieve their account contents (customers would expect SSL, for instance), as well as providing connectivity between micro-services (modern applications include several micro-services which then together form the application).

Both core logic and infrastructure parts require authorization in their operations. However, the type of authorization implemented is different: core logic implements authorization decisions over the core data and operations, while the infrastructure parts implement authorization decisions for the functionality they provide.

This implies that core logic is likely to implement authorization decisions that are fundamentally tied to the logic being implemented. For instance, in banking, there are restrictions about the mortgage offer approvals, between which account transfers can be moved without further security inspection (bank internal transfers are less risky compared to transfers to other banks), or between which kind of accounts fund transfers are allowed to begin with (a savings account could have restrictions for the number of transfers done per month). Even the size of the transfer itself is likely to affect the authorization decision.

Similarly, in healthcare, the core logic is the one that is responsible for health care data and operations over it: creation and filling prescription is likely to involve several authorization steps that are tied to the processing of the prescription data. For instance, heavy painkillers are likely to have more strict authorization logic in place to allow the creation of the prescription to begin with.

On the contrary, authorization within the infrastructure parts of the application and micro-service revolve around the infrastructure level entities. The authorization decisions are about whether a micro-service can talk to another, which micro-service API calls can invoke, or whether a micro-service can open a connection to a particular database instance and read a particular table. For business logic, these are low-level details that are typically invisible to the end user.

Application infrastructure level authorization is also relevant and related to the managing of the application and micro-service as whole. For example, a micro-service instance might run inside a VM and the type of a micro-service is likely to affect who (and when) can access the VM. For instance, it is common to block all access by default and allow access only on an as-needed basis. In that case only the people actively resolving an incident related to application are allowed to access the VM and hence the application deployment. While this does not concern the application instance itself (a process running a micro-service instance is not responsible for managing the VM the process runs within), these authorization decisions can be considered to be part of application infrastructure authorization.

As mentioned above, the server set 105 in some embodiments collects and updates parameters for resolving policies dynamically and in a deployment specific manner (i.e., in a manner that can be context specific for each set of associated machines for which the server set is deployed). This allows policies to be resolved based on conditions and dynamically changing parameters that are specific to each deployment. As further described below, the server set allows the values for policy operands to dynamically change because it allows local agents to receive (through push operations or pull operations) such changes for the policy operands in the respective namespaces of the local agents.

Figure 6:
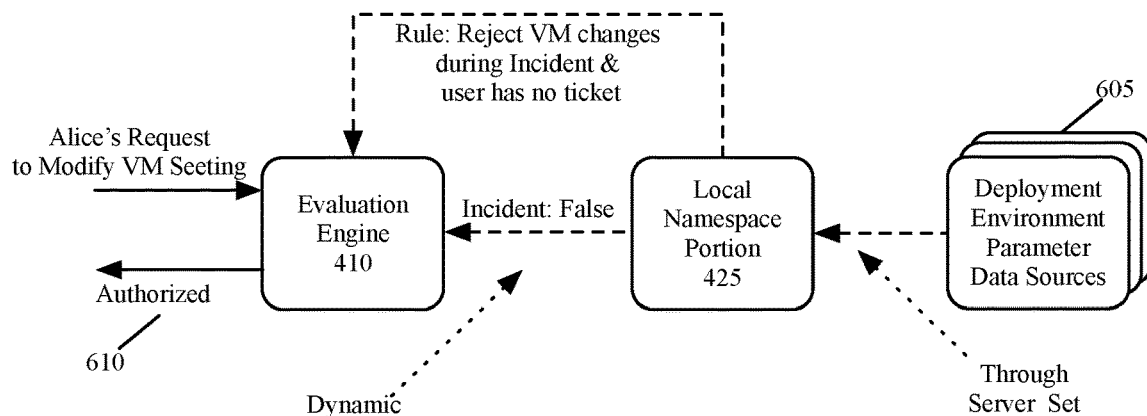
FIGS. 6-8 illustrate three examples of the evaluation engine of a local agent resolving the same API authorization request based on deployment specific policies and operands, with the values of the operands changing dynamically based on network conditions.
Figure 7:
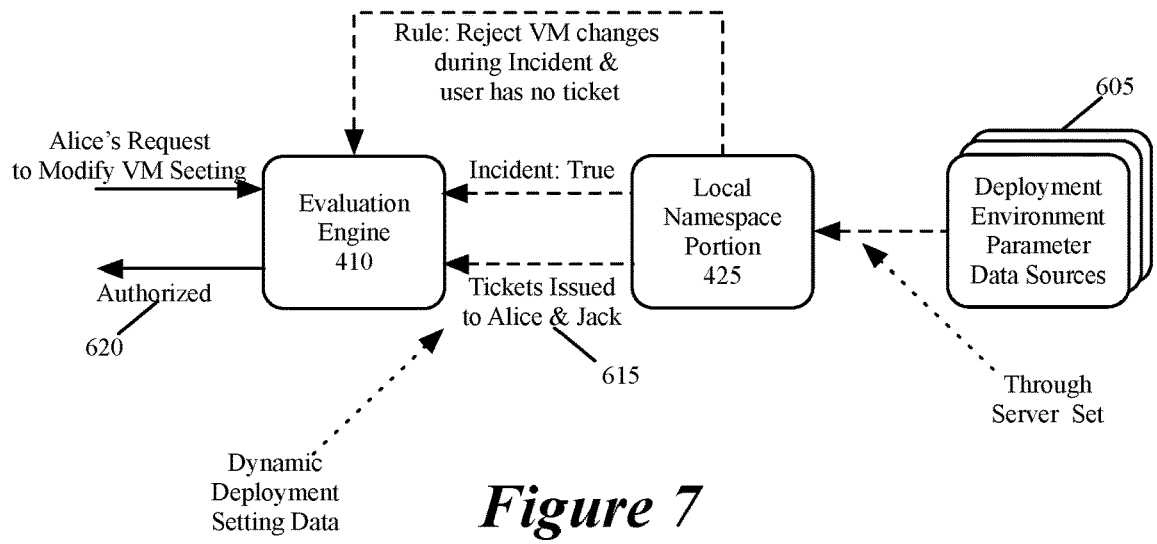
Figure 8:
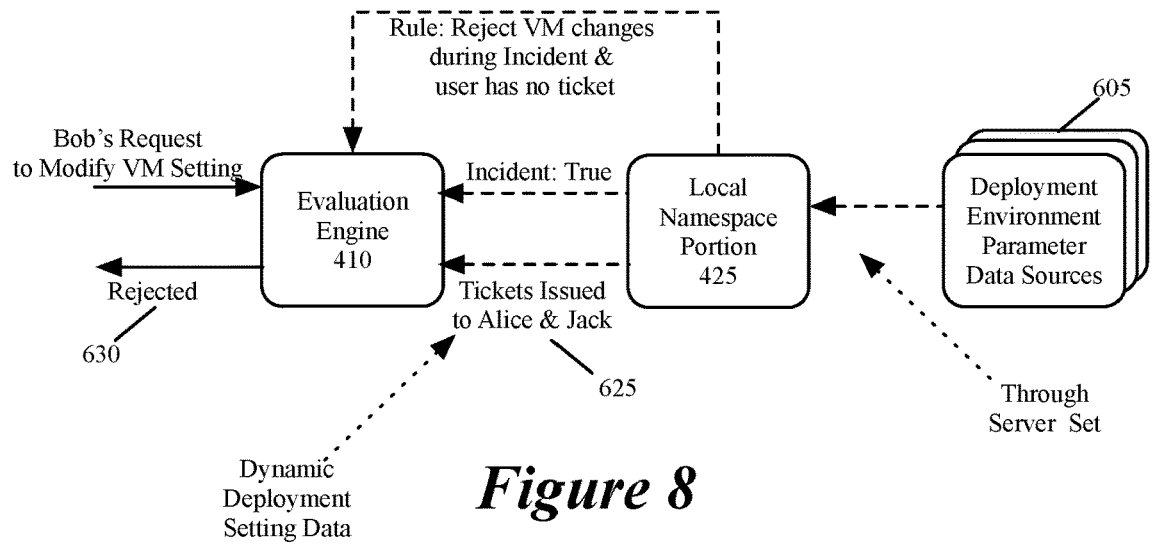

FIGS. 6-8 present three examples that illustrate the evaluation engine 410 of a local agent resolving the same API authorization request based on deployment specific policies and operands, with the values of the operands changing dynamically based on network conditions. In these examples, the same application (not shown) sends three requests to the evaluation engine to authorize an API call associated with changing a setting of a VM. Also, in each of these examples, the evaluation engine processes the same API-authorization policy, which includes one rule that specifies that modifications to the VM settings should be rejected during time periods in which an incident is being reported for the VM's host computer unless the user requesting the setting change has been issued a ticket, such as a user-authentication ticket or a project tracking ticket. In some embodiments, the ticket would be issued by a third-party ticketing application such as the Jira Issue and Project Tracking applications of Atlassian.

In these examples of FIGS. 6-8, the policy being enforced is custom-defined for a deployment of the API-authorization system 100 of some embodiments. While this deployment restricts VM modifications during incidents, another deployment of the API-authorization system might not. Other deployments might not even have any VMs; they might only have standalone computers or they might only use containers. Moreover, in these examples, the operands for resolving the specified VM-modification policy dynamically change. Specifically, these operands include (1) the Boolean Incident flag and (2) array that specifies identity of the users with tickets (if any). Both the Boolean parameter and the ticket array can be changed at any time. The Incident flag is false when there is no issue in the VM's host computer, while it is true when there is an issue in the VM's host computer. Also, each time a user obtains a ticket for performing a task, the user's identity is added to the ticket array. The user's identity is removed from the ticket array when the ticket expires. All of these parameters are deployment specific and can change dynamically in real time.

As mentioned above, the agent's local namespace portion 425 in some embodiments is updated (through push or pull operations) whenever policy opcodes and/or policy operands are modified in the copy of the namespace that is maintained by the server set 105. Similarly, the server set's copy of the namespace is updated whenever a new policy is added, modified or deleted, and/or an operand's value changes through the various policy input interfaces and operand import interfaces of the server set.

Accordingly, whenever the Incident flag changes its value or whenever a user is added or removed from the ticket array, the server set's operand import interfaces modify the values of the Incident flag and the ticket array. From this namespace, these changes are propagated to the agent's local namespace portion 425 through push operations or pull operations. The examples illustrated in FIGS. 6-8 provide an abridged view of this propagation by showing data being sent from one or more data sources 605 in the deployment environment to the local namespace portion 425. These figures also do not show the policy and data fetcher 415, the rule compiler 430 and the created runtime rule and parameter structure 435 in order to keep the illustrations in these figures simple. Instead, these figures just show the evaluation engine 410 receiving the VM-modification policy's rule that specifies that VM changes should be rejected during an incident when the requesting user does not have a ticket. These abridged representations are illustrated with dashed arrows in these figures.

FIG. 6 illustrates the case when the VM modification API call is received when there is no incident. Thus, in this example, the evaluation engine sends a reply 610 that indicates that the API call is authorized. FIG. 7 illustrates the case when the VM modification API call is received when there is an incident and the user associated with this API call is Alice. As shown, the ticket array 615 identifies Alice as someone who has been issued a ticket. Accordingly, in this example, the evaluation engine sends a reply 620 that indicates that the API call is authorized. FIG. 8 illustrates the case when the VM modification API call is received when there is an incident but the user associated with this API call is Bob. As shown, the ticket array 625 does not identify Bob as someone who has been issued a ticket. Accordingly, in this example, the evaluation engine sends a reply 630 that indicates that the API call is rejected.

FIG. 9 illustrates an example of the policy opcode and operand that can be used to implement API-authorization controls similar to those of the examples illustrated in FIG. 6-8. Unlike the examples of FIGS. 6-8 that resolve one rule, the policy opcode in the example of FIG. 9 has three rules. To resolve this policy opcode, three sets of parameters 902 are identified in-line within the policy opcode for authorizing API calls regarding VM modifications. These three sets of parameters specify an LDAP group directory, a data store specifying occurrences of incidents, and a JIRA ticketing data source.

A first rule 905 specifies that a VM-modification API call should be allowed if the call comes from a user in the engineering staff during a period in which VM-modifications are not blocked. The second rule 910 defines whether the current time period (i.e., the period during which the VM-modification API call is received) is a time period that the VM-modification call should be blocked. This rule specifies that the current time period is a blocked time period if the Boolean Incident flag is currently true and there is no temporary exemption. The third rule 915 defines whether an exemption should be granted during an incident for the user associated with the received API call. This rule specifies that a temporary exemption should be granted if the ticket array includes the user identity and the issues label for this user in the labels array identifies the ticket to be associated with the existence of an incident.

Based on these rules, the evaluation engine will authorize VM-modification API calls from anyone within the engineering staff (as identified by the LDAP directory) when there is no incident. It will also authorize such calls during an incident from anyone within the engineering staff when the user has a ticket associated with incidents. However, it will reject such calls during an incident from anyone that does not have a ticket associated with the incident.

The above-described local API-authorization request processing of FIGS. 2-9 has several advantages. First, by packing the relevant portion of the namespace with both policies and data parameters for resolving these policies, and then providing this portion to a local agent executing on the same host computer as the applications that need their API calls authorized, this API-authorization request processing is fast and highly available. No remote device has to be accessed to process these requests.

This approach can also cache the optimized rule data structure for the API-authorization policy opcode associated with an API call after this structure is created for assessing whether the API call should be allowed. This cached rule data structure can be subsequently use for processing requests associated with the same API call. In this manner, the cached structure eliminates the need for the rule compiler to recreate the optimized rule structure while the local agent processes the authorization request with the subsequent iterations of the same API call.

As mentioned above, the local API-authorization request processing of some embodiments also caches decision. Whenever decisions are cached, the system has to address cache revocation. Revoking cache decisions when policies are enforced by a central set of servers is complicated. A centralized approach might use rather long caching timeouts to maximize the efficiency of its decision caching. But this would then require some mechanism to explicitly detect which cached decisions have to be revoked when a policy or data changes. Otherwise the local cache could store stale decisions for long periods of time, before they timeout and are replaced with new ones matching the updated policy and data.

To figure out the decisions to revoke from cache, the application in the centralized approach would have to keep track of policies and data used in the decisions it receives from the centralized location—and then the centralized decision maker would have to inform the application if any of these change. This is convoluted at best: to support revocation, the interface between application and centralized decision maker has to deal with policy and data information that they would not otherwise even need. After all, the authorization decisions are executed centrally, outside of the application, yet somehow, applications would have to understand the data and policies used in those decisions so that they could cache those decisions. As a result, the interface between the application and central location would now include information about data, policies and decisions.

On the other hand, in the above-described local API-authorization request processing of FIGS. 2-9, the interface between the application and decision is just about namespace (i.e., about the policies and data). The entire namespace bundle comes with a single version that the application can use to check if the central location has any updates for this portion of the namespace. This results in much simpler and reliable interface between the application and central location.

One of ordinary skill will realize that FIGS. 6-9 only provide some examples that describe the operations of some embodiments of the invention. The API-authorization system of some embodiments can be used to resolve many other API-authorization policies dynamically. Moreover, even the operations described in the examples of FIGS. 6-9 are implemented differently in different embodiments. For instance, instead of relying on an incident flag to determine whether there is an incident associated with a host computer, VM or container on which an API-processing application executes, the evaluation engine 410 dynamically computes this parameter (i.e., dynamically determines whether there is an incident). To dynamically determine this parameter, the evaluation engine 410 in some embodiments could direct the fetcher 415 to iteratively retrieve different policies and/or operands from the namespace as the evaluation engine processes the optimized rule structure 435. The incident parameter could then be the result of one or more of these retrieval and processing operations.

Figure 10:
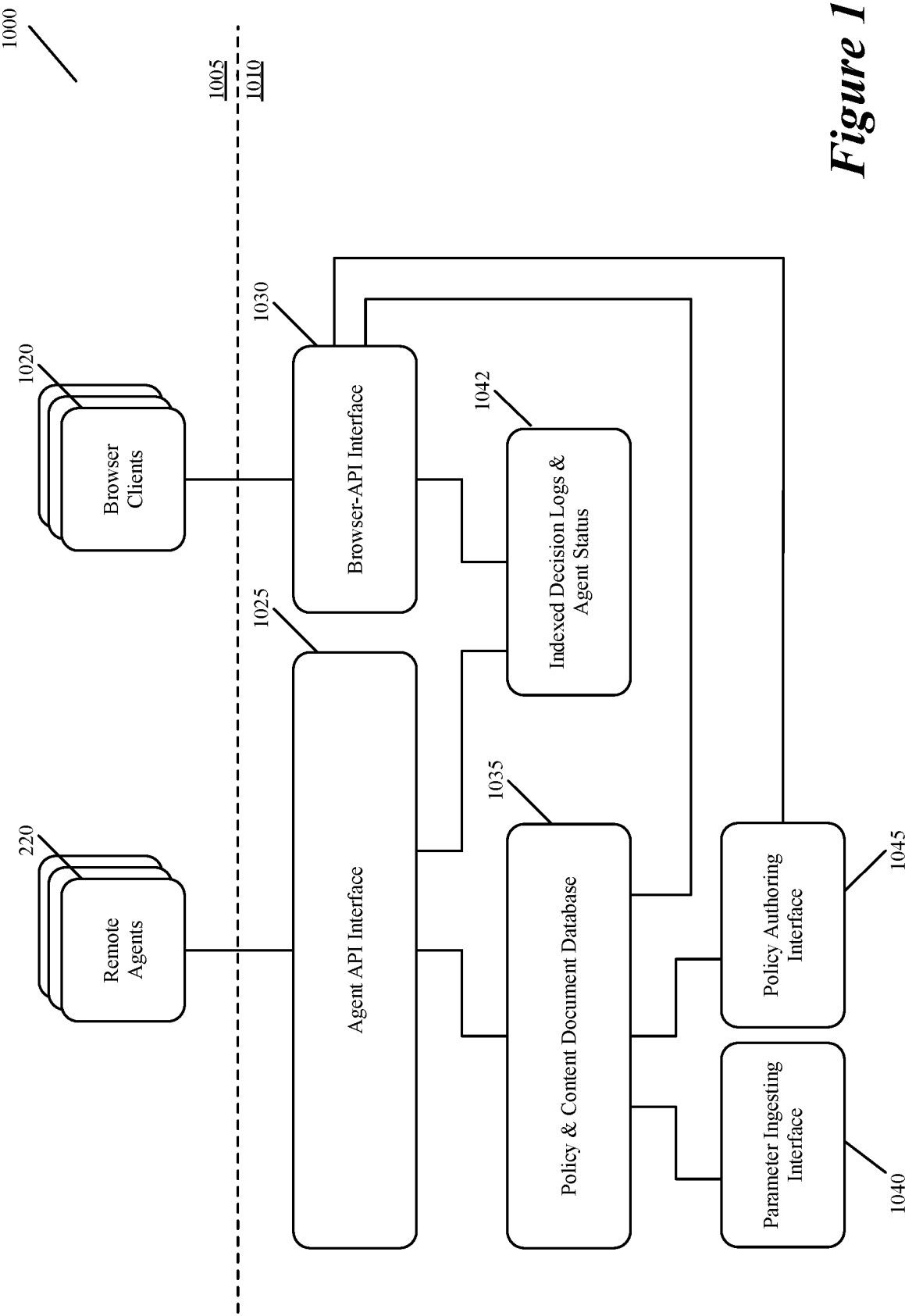
FIG. 10 illustrates the software architecture of the server set of some embodiments of the invention.

FIG. 10 illustrates the software architecture 1000 of the server set 105 of some embodiments of the invention. Two or more servers in some embodiments can implement the server-side modules 1010 in this architecture. Also, in some embodiments, multiple instances of the same modules execute on different servers in the server set 105 as this server set has two or more servers performing the same operations in these embodiments. As shown, the server set 105 includes local-agent API interface 1025, browser-API interface 1030, policy and content document database 1035, indexed decision logs and agent status data storage 1042, parameter ingesting interface 1040 and policy authoring interface 1045.

The interfaces 1025 and 1030 communicatively connect the server-side modules 1010 to client-side modules 1005. Specifically, the browser interface 1030 processes communications between the server set's modules and the browser clients, while the agent interface 1025 processes communications between the server set modules and the remote local agents 220 on the host computers.

The local agents 220 communicate with server modules 1010 by using APIs of the server's agent interface 1025. This interface includes (1) a download API that provides the functionality to download a bundle of policies and related data and then request its next version, if a new version is available, and (2) an upload API that provides the functionality for the agents to report back any policy decisions they have made. The download API accesses the document database underneath to compile the policies and any of their dependencies (whether they are data or other policies) into a bundle. In some embodiments, the agent interface 1025 provides local namespace portions and updates to these portions in response to queries for the namespaces and updates to the namespaces. The upload API uses a separate decision database to log any decisions clients have reported.

As mentioned above, the policy and content document database 1035 in some embodiments is a custom namespace database. This database can persist both policies and any data the policies need in their evaluation. In some embodiments, the database saves policies as plain source code, while storing the data as JSON documents. The policy and content database 1035 in some embodiments includes a hierarchical namespace for each entity in one or more datacenters for which the server set defines and distributes API-authorization policies. As this database 1035 merges the data and policies into one global hierarchical namespace layout, database clients can access a nested portion of the namespaces simply by requesting policy operands by their fully qualified names.

The server set copy of the policy and content database 1035 in some embodiments can save all versions of the data and policies over time for an entity. When either a data or policy is updated, its previous version is not removed but archived in some embodiments. This allows time traversal: the server set can inspect the state of policies and their related data at any point in time by simply defining the time of interest when accessing the namespace. Time traversal is useful for troubleshooting (to understand exactly what was the state of the policies at the time of an issue) and for auditing (to convince oneself the system state was correct throughout the audited period of time). Also, in some embodiments, the policy and content database 1035 implements delta-encoding to avoid saving entire copies of all data and policies after each, potentially small, change. This is very effective as most of the data is rather stable with only a steady stream of fairly local changes over time.

As mentioned above, policies refer and use deployment-specific parameters describing the current state of the managed resources and datacenter. To retrieve and properly format the parameters for consumption, the server set uses the parameter ingesting interface 1040 in some embodiments. The parameter ingesting interface 1040 includes one or more data source adapters, each capable of using a remote management API of a parameter data source to collect deployment specific parameters (e.g., through data crawl operations) and transforming the collected parameter data from its native format into a structured document (e.g., a JSON document) for storing in the database 1035. For instance, when the API authorization system validates API requests to micro service applications deployed in Amazon Web Services (AWS) cloud infrastructure, the parameter ingestion interface 1035 has one or more data source adapters to collect data needed for processing different AWS APIs.

In case a relevant data is easily accessible from a database, the parameter-ingesting interface 1040 includes a data source adapter that can implement the relevant database access protocol and directly replicate the relevant portion of the remote database. For instance, in some embodiments, a data source adapter is used to retrieve user group information from a remote user directory by using LDAP protocols.

The policy-authoring interface 1045 in some embodiments provides resources that allow the server set to generate policies for an entity. In some embodiments, this interface is accessible through bowser clients 1020 and the browser interface 1030. Policies in some embodiments can also be uploaded to the server set through an API interface.

In some embodiments, the decision and status storage 1042 is a database that stores the received decision log entries for archiving. An indexing engine (not shown) builds a text search index over the stored decision log entries. The index is useful for the UI component as it enables running queries about the decisions, e.g., during troubleshooting when a particular application is not operating as expected and the related policy decisions need to be further inspected. The browser clients 1020 in some embodiments are JavaScript applications. Through the browser API interface 1030, the browser clients 1020 can access the underlying databases/indices. This allows the browser clients 1020 to access any current or past policy/parameter state, as well as allow inspection of the policy decisions done.

The policy defining and distribution system of FIG. 10 has several advantages. It imports remote management API state (e.g., as JSON objects) in the document database, which allows the system to effectively construct a logical, centralized view of the datacenter state. This combined with versioning allows the system to provide versioned snapshots of the entire datacenter state, if needed. For example, in some embodiments, the local agents identify the namespace versions that they use to process the API-authorization requests and provide this version information to the server set to store in the decision logs 1042. Subsequently, through the browser interface 1030 and the decision logs 1042, a user can perform browser-based searches to extract the exact state of the policies and parameters at the time a decision was made. This state information includes the version data. The version data can also be used to search the decision logs. These capabilities are highly useful for debugging the API-authorization system. These search and debug operations are also supported in some embodiments through API interfaces that support API calls from automated processes that collect and process log data.

Also, the system's overall process of extracting remote management APIs disseminates relevant pieces of this data together with the relevant policy code for the agents. This near real time dissemination of management state is highly beneficial in that current techniques cannot duplicate it. Current systems integrate with the necessary remote management APIs on their own, which creates $N^2$ integrations, whereas the system 100 can do the integrations once, which results in N integrations.

The system 100 also uses a declarative policy language for document-oriented, structured data. Also, as mentioned above, the system 100 in some embodiments decouples policy (authorization) logic from the applications to an agent nearby. In a traditional authorization solution (e.g., using LDAP), the policy logic is part of the application source code, and the application directly retrieves the relevant data from LDAP, applying its logic on the retrieved data.

As noted above, some embodiments of the invention provide a system 100 for defining, distributing and enforcing policies for authorizing Application Programming Interface (API) calls to applications executing on one or more sets of associated machines (e.g., virtual machines, containers, computers, etc.) in one or more datacenters. An entity can use this system to control the behavior of the entity's software systems, e.g., cloud machines, on-premise machines, or SaaS machines. The API authorization system in some embodiments operates on a server set 105, or in other embodiments is operating in the cloud as a SaaS. The API authorization system in some embodiments also provides policy enforcing agents 120 co-located with entity machines (e.g., virtual machines, containers, standalone servers, etc.) along with policy and contextual data storages that store the entity's managed policies and contextual data. The API authorization system in some embodiments is operating in the cloud as a SaaS. Alternatively, or conjunctively, the API authorization system includes controllers that configure the entity's policy enforcing agents 120 with the appropriate API processing policies and data. In order to perform these security functions, the API authorization system must be able to analyze and understand all the authorization policies associated with the entity's software systems.

However, analysis of the security posture for authorizing APIs in a modern enterprise is complicated by a number of technical factors. For example, modern services are more numerous and distributed; the scale alone makes the analysis more difficult. Mere analysis of network firewalls at the border of an enterprise is insufficient for the modern enterprise. Instead, the security analysis must be performed across multiple providers, multiple platforms, multiple services, and multiple applications in order to establish a global security posture. In addition, modern services are richer in their capabilities. As these capabilities improve, it is less likely that a single individual will be granted access to the entire service. Instead, partial access is more likely. Lastly, not only are the services distributed, but the execution of a single authorization decision is also now distributed. For example, it is not uncommon for one portion of the decision to be executed at the identity provider, while another portion is executed in the service itself. This distribution further complicates the security posture.

Some embodiments of the invention provide a more distributed approach to controlling service access. In some embodiments, this distributed approach includes migrating the security perimeter into the cloud, SaaS platform, and applications themselves, and adapting the enterprise security posture accordingly. Some embodiments also provide for the security analysis to consider partial access. In some embodiments, the analysis includes a logical centralization that decouples the access controls from their distributed implementation. In other words, some embodiments provide for the ability to understand the service access permissions without the complications of the underlying distribution.

Some embodiments answer several levels of questions about service access (i.e., permissions). First level questions are who can access the service and who has accessed the service, which are useful for troubleshooting and general visibility. Second level questions are questions of compliance which are mandatory for the enterprise, including identifying users with excessive permissions (e.g., enforcing least privilege), and accurate identification of users with access to critical services and associated data. In a modern enterprise, answering these questions is no longer a matter of inspecting firewall rules at the security perimeter.

Figure 11:
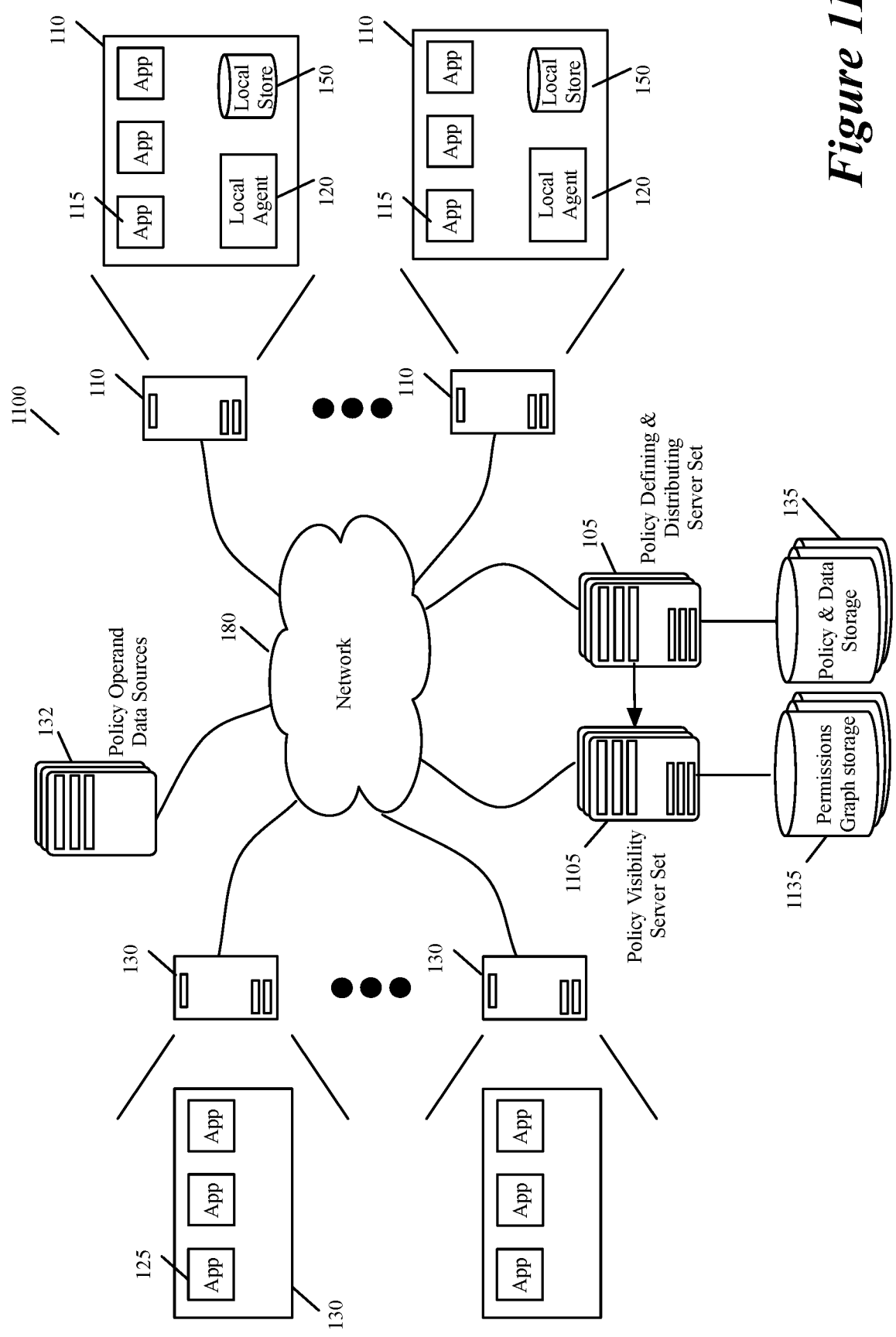
FIG. 11 conceptually illustrates the architecture of the API-authorization system including a policy visibility system.

Some embodiments of the invention provide logical centralization of permissions analysis in a distributed services and authorizations setting. In some embodiments, the API authorization system 100 includes a policy visibility system that provides a solution architecture for logical centralization of permissions analysis. FIG. 11 conceptually illustrates how the API authorization system 100 from FIG. 1 also includes the policy visibility system for permissions analysis. In addition to the policy defining and distribution server set 105, the API authorization system also includes a policy visibility server set 1105, for analyzing the policies and thereby providing visibility into the service permissions of the distributed service environment. Just as the defining/distributing server set 105 has a policy and data storage 135 for storing policy opcodes and operands (i.e., the policies and the contextual data required to evaluate them), the visibility server set 1105 has a data storage 1135 for storing the permissions and any associated data. In some embodiments, a single server set may serve both functions of server sets 105 and 1105.

Figure 12:
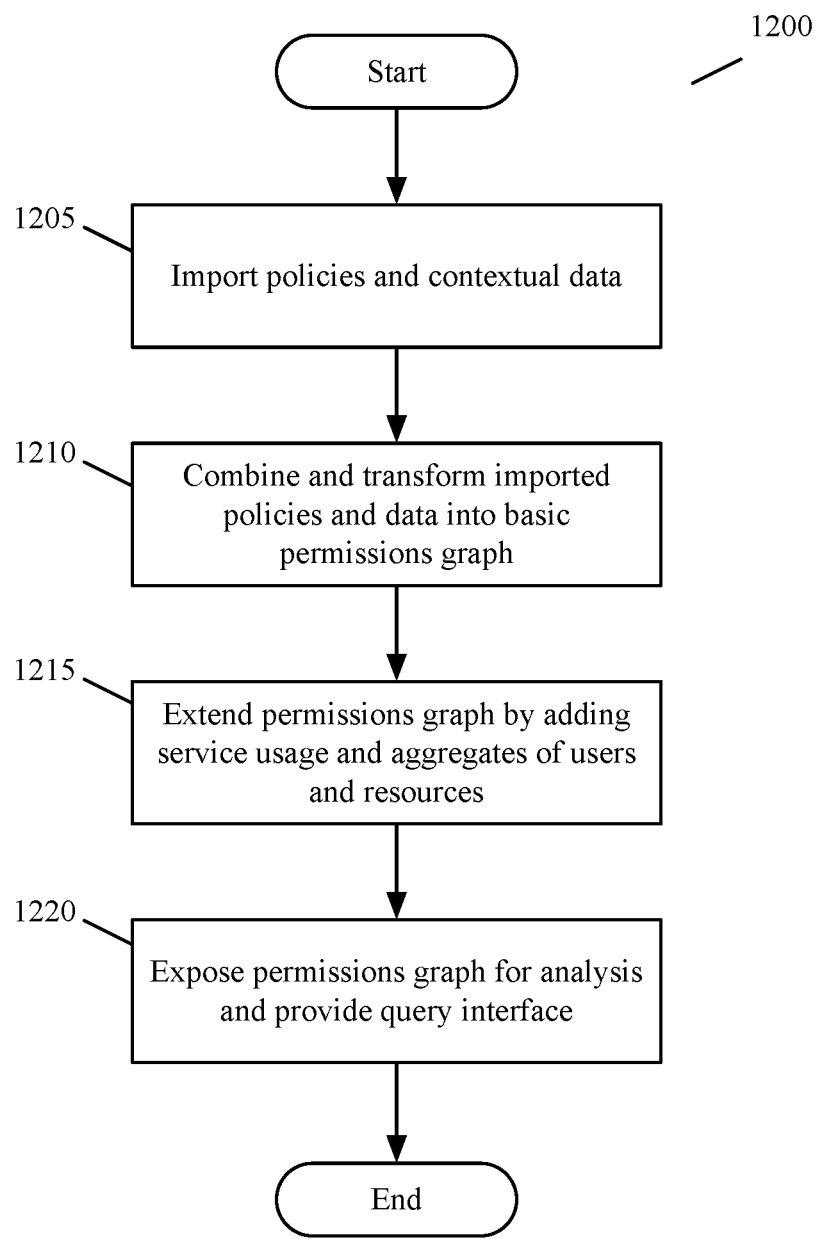
FIG. 12 illustrates a process for importing authorization policies and creating an extended permissions graph.

In some embodiments, the permissions are represented as a permissions graph, which provides insight (visibility) into the service access permissions of the distributed services. The permissions graph represents users and services as nodes (i.e., vertices), and different types of access are represented by connections visualized as lines between user-resource node pairs. In order to create the permissions graph, the visibility server set 1105 performs a process 1200 in some embodiments that is conceptually illustrated in FIG. 12.

First, the process imports (at 1205) the necessary policies and contextual data. In some embodiments, the visibility server set 1105 acquires policies from the policy defining and distributing server set 105. The server set 1105 also acquires the policies directly from the enterprise services (i.e., policy sources) in some embodiments. For example, in some embodiments the distributed services are operating on host computers 110 and 130, which may be located in on-premises datacenters, remote datacenters, and/or the cloud. In some embodiments, the visibility server set 1105 uses APIs associated with the distributed services to import the policies, and in other embodiments the server set 1105 imports the policies via local agents 120 operating locally to the policy sources. Local agents in a datacenter may be deployed on the same host machines as the policy source or may be deployed on separate host machines.

In some embodiments, the policies themselves define access to the services via API calls, where the services include numerous assets and resources that can be accessed (via API over a network or other method) by users, groups of users, or user roles. The policies define access in some embodiments using access rules, which may express relationships between specific users and specific resources and services, and which are further constrained or restricted by different criteria (such as time of day, geographic location, etc.).

Imported policies from the policy sources may include, in some embodiments, authorization policies and authentication policies. Examples of such policies include access control lists (ACLs) defining the users and clients authorized to access a service. For example, most mature software systems include ACLs to restrict access to the service. However, in other embodiments such as those for cloud and SaaS platforms, the allowed authorization rules may be more sophisticated expressions which include a separate subsystem with a proprietary policy language for defining access controls to the platform services. For instance, Amazon Web Services (AWS) Identity and Access Management (IAM) has an entire policy language and system which allows configuration of policies for protecting service access. However, these sophisticated languages (e.g., policy code) may also be considered ACL systems, albeit ones which are extremely rich and, in some embodiments, multi-staged. The visibility server set 1105 imports all the ACLs or policy languages (e.g., the policy opcodes), as well as associated data (e.g. the policy operands) needed to evaluate them, regardless of their complexity. In some such embodiments, the policies and data may be available over Application Programming Interfaces (APIs), necessitating that access to these APIs be included for the server set 1105.

In some embodiments, the visibility server set 1105 acquires contextual data from the policy and data storage 135 and the policy operand data sources 132. The visibility server set 1105 also acquires the policies directly from the enterprise services (i.e., policy sources) in some embodiments. In some embodiments, the visibility server set 1105 uses APIs associated with the distributed services to import the data, and in other embodiments the server set 1105 imports the data via local agents 120 operating locally to the policy sources. Local agents in a datacenter may be deployed on the same host machines as the policy source or may be deployed on separate host machines.

Imported data from the data sources may include, in some embodiments, service usage data generated by the systems that provide the services, in some cases for a user-specified period of time or for pre-defined periods. In some embodiments, the contextual data is data that is required by the policies during evaluation. For example, the contextual data may be directory data (e.g., LDAP) that defines user groups and roles, that is consumed by both the authorization policies as well as authentication or identity management policies. This directory data is used in some embodiments by the authorization and authentication policies to define roles and groups of users and to restrict access to the service or the resources by the defined roles and groups. In some embodiments, the contextual data is provided by systems that are associated with the services. In other embodiments, the contextual data is generated by the visibility server set 1105 (which also generates the permission graph).

Figure 13:
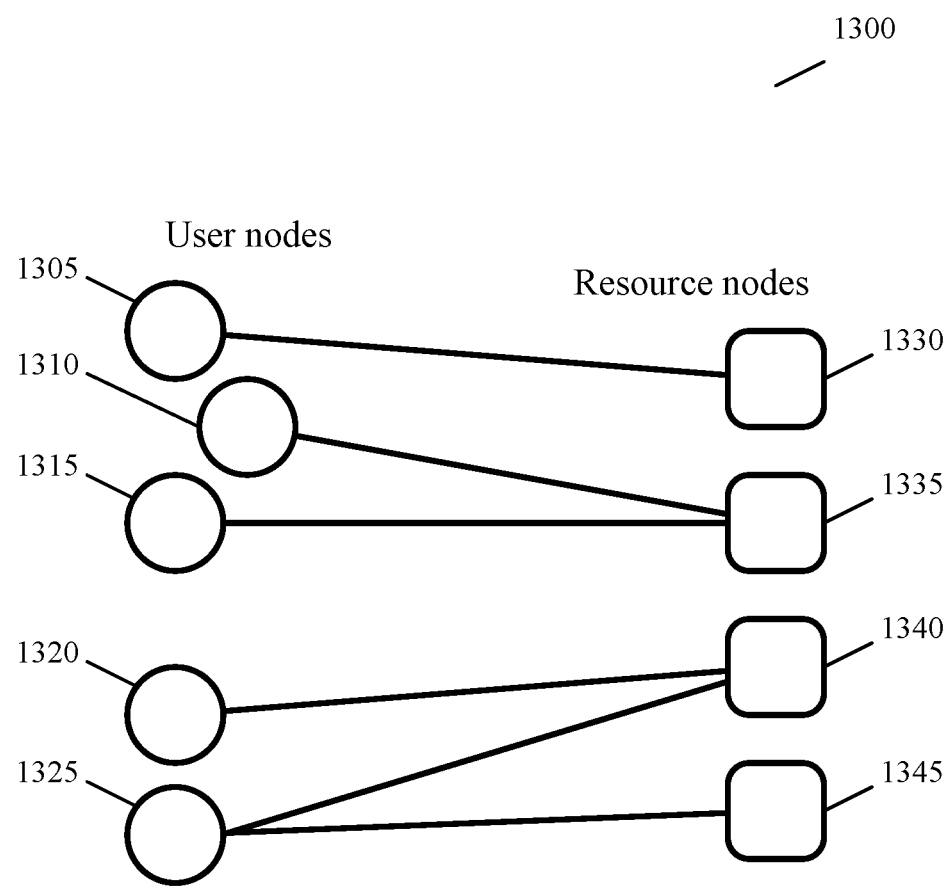
FIG. 13 conceptually illustrates a sample permissions graph, with nodes representing either users or services, and connections between them indicating permissions.

Once the policies and data relevant for service authorization have been imported in some embodiments, the process then combines and transforms (at 1210) the policies to a basic permissions graph in which each user is connected to an accessible service. FIG. 13 conceptually illustrates a sample permissions graph 1300 with connections between a group of user nodes 1305-1325 and resource nodes 1330-1345. In some embodiments, the resource nodes may be services or other types of resources available to users. Nodes are also referred to as vertices of the graph. The connections between nodes (also referred to as edges) indicate the permissions, represented in some embodiments as lines between user nodes and resource nodes.

In some embodiments, the permissions are expressed as multiple access rules in each of the source policies, where each access rule associates a particular user or group of users to a particular resource or group of resources. The permissions are also restricted in some embodiments by various criteria, (e.g., date and time, geographical location, etc.), which are specified by the policy. The permissions graph is therefore the visualization of these access rules and restricting criteria in these embodiments, that can be presented on a display or interacted with a graphical user interface.

For example, user node 1305 has permission to access resource node 1330. In some embodiments, certain resources like 1335 may be accessed by more than one user, namely 1310 and 1315. Other users like 1325 have permission in some embodiments to access more than one resource, namely 1340 and 1345.

Figure 14:
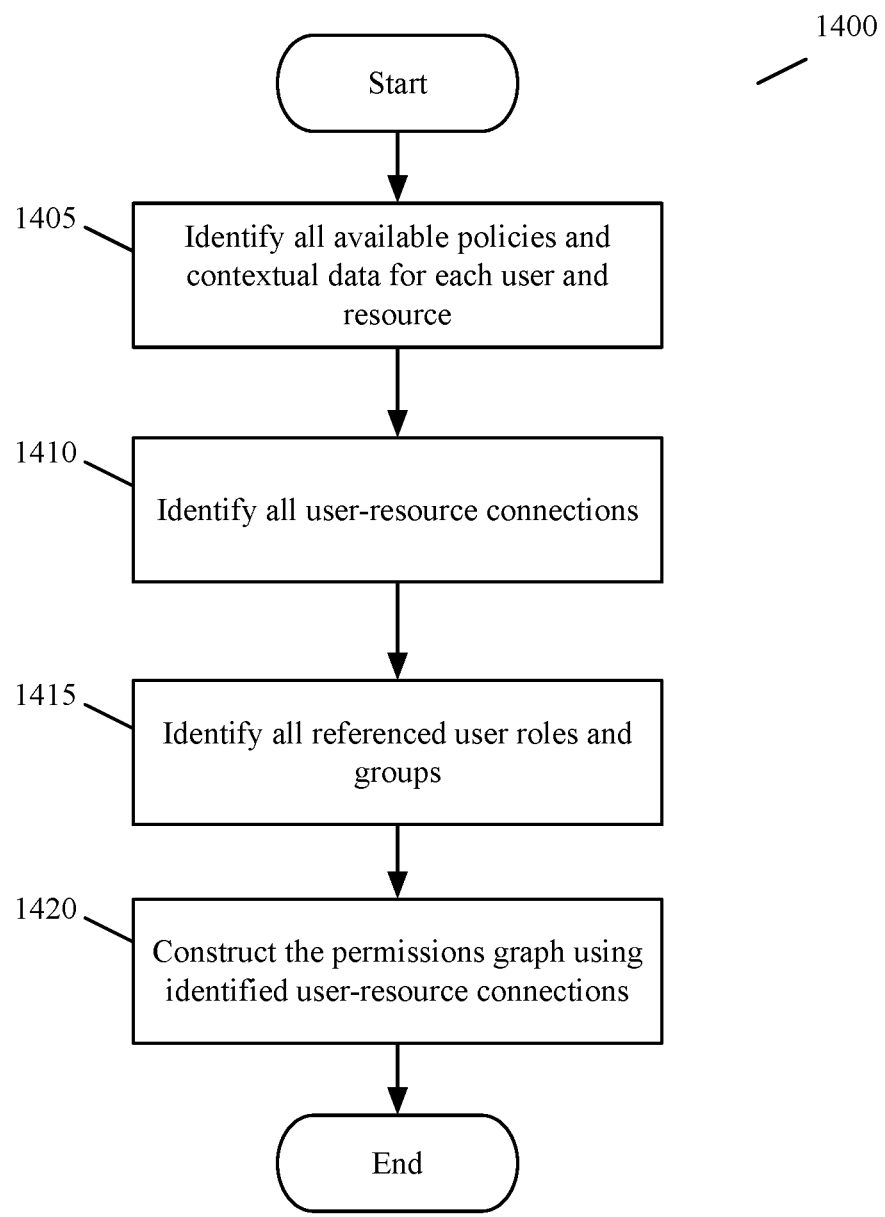
FIG. 14 illustrates a process for an embodiment for constructing the permissions graph, by analyzing the imported policies.
Figure 15:
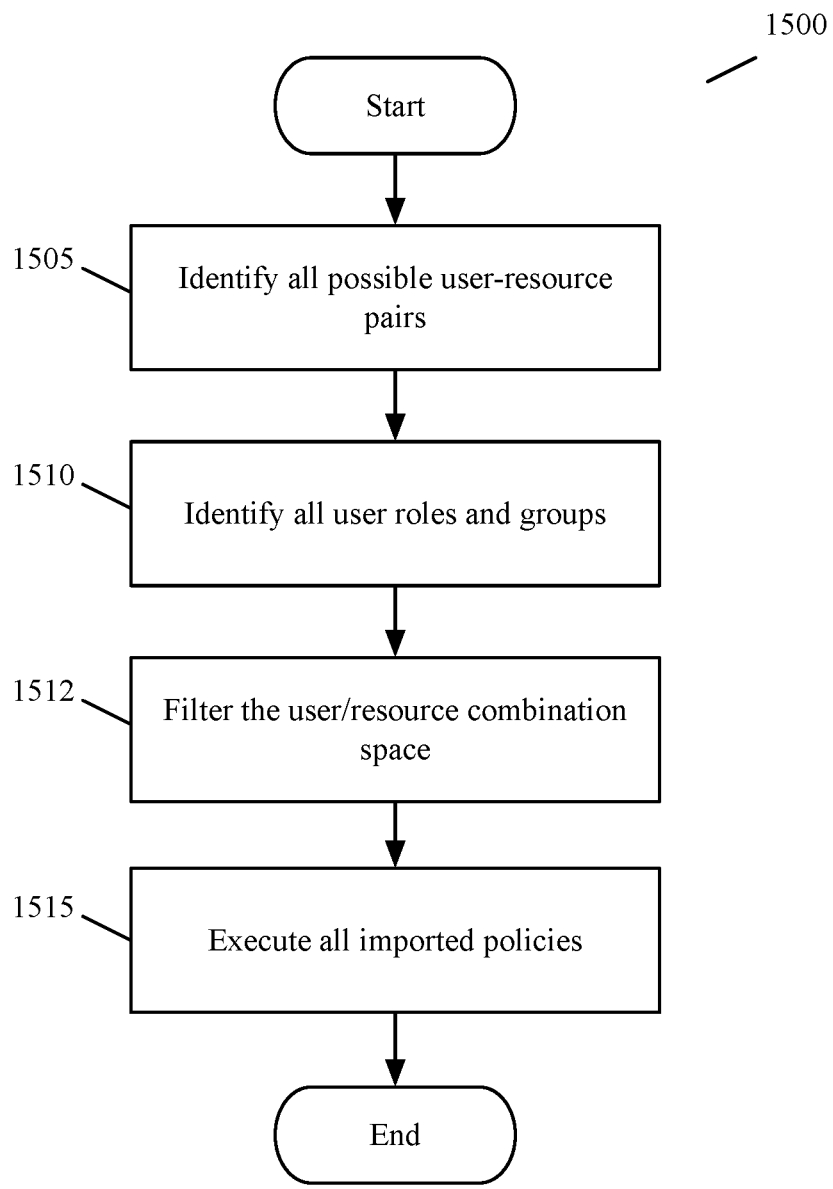
FIG. 15 illustrates a process for an embodiment for constructing the permissions graph, by executing the imported policies.

In some embodiments, there are two options for approaching the computation of the permissions graph from the imported policies and data, represented by sub-processes 1400 illustrated in FIGS. 14 and 1500 illustrated in FIG. 15, both performed in some embodiments by the visibility server set 1105.

The first approach to constructing the permissions graph in some embodiments, is to directly translate the imported policies and data to permissions. FIG. 14 conceptually illustrates the process 1400 of some embodiments for building the permissions graph by analyzing the imported policies and data to perform this translation. In some embodiments, these operations may occur in a different order than as illustrated in the figure.

First, the process identifies (at 1405) all available policies and contextual data for each user and resource. In some such embodiments, there may be several policies to consider rather than a single policy. For instance, policies may be attached to services, users, roles, or individual resources themselves. In some such embodiments, simply knowing the user and service is not sufficient.

Using the identified policies and contextual data, the process identifies (at 1410) all user-to-resource connections which need to be included in the analysis. For example, a policy entry including instructions to "allow user Alice" and "deny user Bob" indicates connection of user Alice to the resource, but not connection of user Bob to the resource. However, in some embodiments, the policy statement may include a wildcard such as "allow user Alice to all resources." In such a situation, the server has to know to enumerate all systems in order to identify all the resources potentially available to Alice.

The process also uses the identified policies and contextual data to identify (at 1415) any user groups and roles referenced by the policies. Policies applicable to users may collide with those of roles or groups that include the user, resulting in policy statements that include both allow and deny for a single user. In some such embodiments, the server set 1105 may resolve such collisions by defining "deny" as having a higher priority.

The permissions graph is then constructed at 1420 from all the identified, non-colliding user-resource connections (including group to resource connections and role to resource connections). For each identified user-resource connection, a node is instantiated for the user, a node is instantiated for the resource, and the two nodes are connected. In some embodiments the instantiated connection is visually represented by a line connecting the two nodes, as in FIG. 13. The process 1400 then ends. In some embodiments, nodes for the user roles and groups are also instantiated, as described in further detail below with reference to extending the permissions graph in FIG. 20.

The above approach to computing the permissions graph, as illustrated in FIG. 14, is suited in some embodiments for relatively simple policies. However, for more complex policies, that approach may be technically challenging, since in practice it amounts to reverse-engineering the policies at hand. Essentially, it requires figuring out all the plausible inputs and outputs from the description of function. This is feasible for some policy languages, but not for all.

The second approach to constructing the permissions graph in some embodiments, rather than trying to determine who can access what by reverse-engineering the imported policies themselves, is to simply execute the imported policies for all possible user-service pairs. While the user-service space is a potentially large space to cover, the execution is easy to shard and scale across computing resources and has several advantageous properties. For example, the analysis executes the same decision that the services themselves do each time a service is accessed. In some embodiments, the execution requires the contextual data as well. As such, some embodiments are fast (i.e., low in computational complexity) and deterministic, both of which are properties that lend themselves to online evaluation.

In some embodiments, this approach to creating the permissions graph requires executing all of the imported ACLs and policies from all of the distributed services, as well as the ability to simulate the distributed execution of the policy decision. That is, if the access control decision spans both identity provider (i.e., determining the user's role) and service (i.e., enforcing policy based on the user's role), the execution in some such embodiments has to consider "multiple hops" between the identity provider(s) and the service provider(s).

FIG. 15 conceptually illustrates a process 1500 of some embodiments for building the permissions graph by executing the imported policies. In some embodiments, these operations may occur in a different order than as illustrated in the figure.

Figure 19:
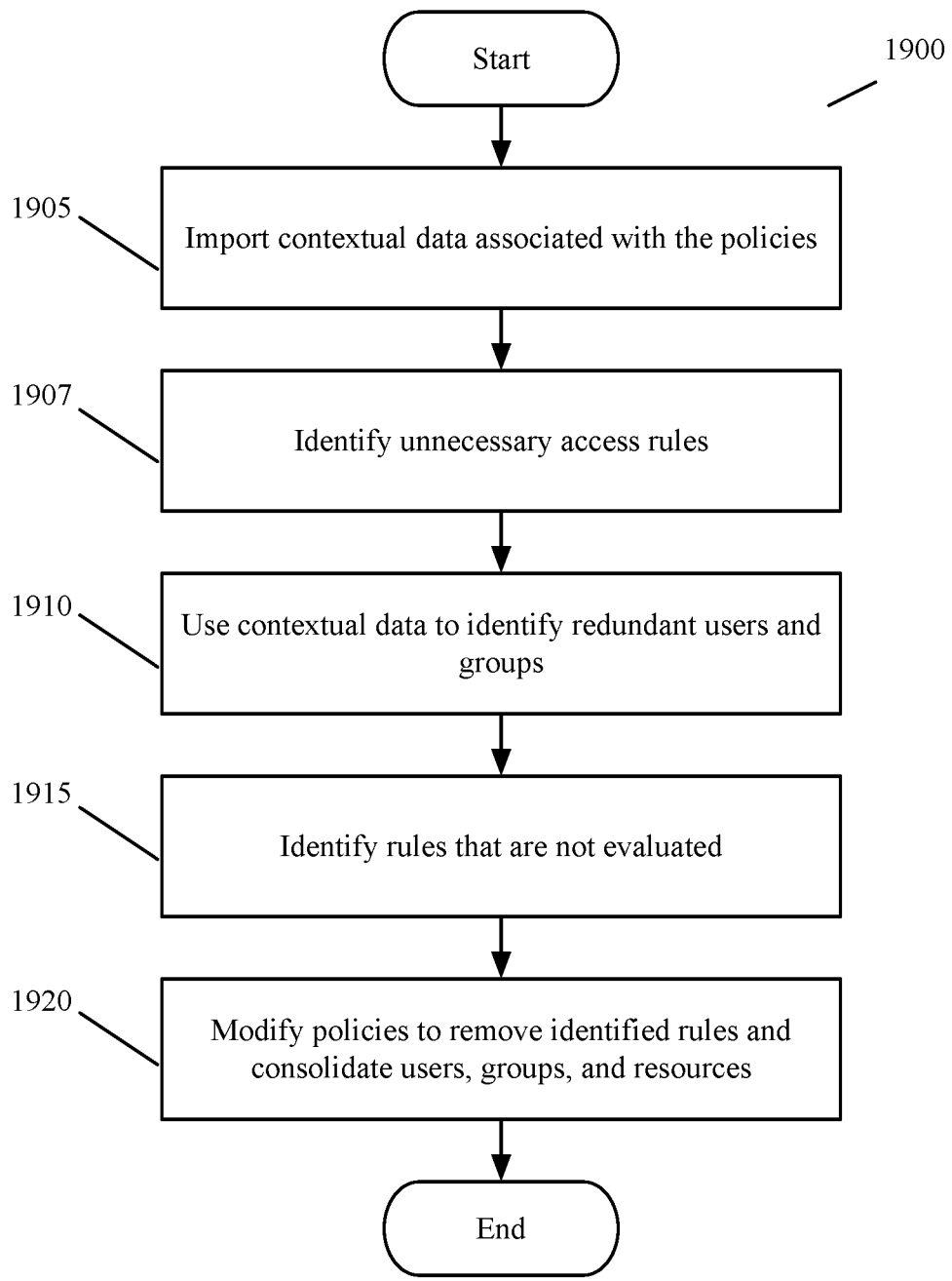
FIG. 19 illustrates a process for reducing the computation space for the permissions graph.

First, the process identifies (at 1505) all possible user-resource pairs associated with the imported policies. Since access control decisions may also be based on user roles, the process also identifies (at 1510) all user roles and groups associated with the identified users in the user-service pairs. In some embodiments, there may also be overlap between these users, resources, and groups that must be accounted for and consolidated, as discussed in further detail below with reference to FIG. 19. In some embodiments, identifying these pairs, roles, and groups also requires contextual data, for example directory data from an associated LDAP policy.

As noted above, the user-service space is a potentially large space to cover. In some embodiments, even if the evaluation of the policies is fast, the explored space in its entirety could be too expensive computationally, depending on the complexity of the policies. In such embodiments, the process filters (at 1512) the user/resource combination space to trim out portions of the user/resource combination space that are guaranteed not to evaluate into allows/denies, or are otherwise unnecessary. This is discussed in further detail below, with reference to FIG. 19.

Finally, the process executes (at 1515) all the imported policies using the identified (and consolidated, and filtered, if applicable) users, groups, and resources as inputs. In some embodiments, the policies are executed using contextual data that is required and consumed by the policies. If the number of policies is not very large, then execution of the policies natively is computationally feasible. However, as the number of policies increase, then in some embodiments native execution may not scale, engineering-wise. The policy visibility system in some embodiments can support and execute a single general policy language instead. For example, one such general-purpose policy language is Rego, which can be applied at any layer of the stack and any domain using JSON/YAML data. Each of the domain specific and system specific policy languages can then instead be translated or expressed into the general policy language, which is then compiled as a single policy. The process 1500 then ends.

With respect to both approaches presented above in FIGS. 14 and 15, in some embodiments there could be additional input fields recorded to the permissions graph in some embodiments besides just users, resources, and groups/roles. For instance, the operations users are able to execute on resources (e.g., the names of API calls) can also be represented as connections in the graph. In other words, the graph is not just a cross-product of "users" and "resources" but could represent an even larger user/resource/action combination space.

Returning to FIG. 12, once the basic permissions graph connecting users to the services that they are allowed to access has been computed, the next operation in some embodiments is to extend the graph (at 1215) with additional information, so the permissions graph is more useful for visualization and analysis purposes. In some embodiments, the permissions graph may be complemented with aggregates of users and resources as well as service usage. In particular, users and clusters of services may have interesting roles (e.g., clusters of services knowing whether a service belongs to a group of Personally Identifiable Information (PII) data handling services is likely to be highly relevant for compliance). These aggregates, in some embodiments, may be either derived from imported data (e.g., LDAP/AD group information for roles, or tag metadata information for cloud services), or computed by means of clustering.

In some embodiments, the permissions graph may be complemented with service usage, e.g. from contextual data, usage data, system logs, etc. While analyzing the policies themselves provides information about permitted access, the actual recorded service usage information can further help in analyzing the permissions. In some embodiments, if the graph is extended with the usage information, least-privilege analysis may be executed to determine which users have excessive permissions that are never exercised, which, from a security point of view, should be removed.

Finally, in some embodiments, once the extended permission graph is complete, the visibility server set 1105 exposes the extended permission graph to visualization and analysis tools. In some such embodiments, the process provides (at 1220) a query interface over the graph. The process 1200 then ends.

Further details on each of these operations performed by the visibility server set 1105 for the policy visibility system is provided in the sections below.

I. Importing the Authorization Policies and Contextual Data

In some embodiments, importing starts by determining the systems from which to import ACLs and policies. The importing process is a mix of manual configuration and automation in some embodiments.

In some embodiments, a user of the policy visibility system can configure the connected systems to import policies from. However, if the system is advanced enough, it may allow for discovering policies from the connected system on its own. For example, when importing policies from AWS, it is sufficient to give the necessary credentials to contact the organization's master account. From there, using the API calls, the system will be able to discover any and all sub-accounts as well as all of their policies. In some of these embodiments, the connected systems might be operating on-premise, behind firewalls. Consequently, reaching out to them requires operating the import process in a local agent behind the firewall, which then further communicates (e.g., using an encrypted channel such as a VPN) with the visibility server set 1105.

In other embodiments, the connected systems might not include APIs to import the policies from. In some such embodiments, an agent would have to run on that particular system and analyze local configuration files that would include the policy and/or ACL information.

When importing policies from multiple, different systems, the different authorization and authentication policies and the contextual data must be combined to create a single aggregate policy. The aggregate policy in some embodiments defines and restricts access to the service and its resources and assets to authenticated users, based on access rules and criteria associated with those rules. The way in which the policies are combined is dependent on the types of systems, the types of the policies for each system, and how the systems and policies are related and how they interact.

Figure 16:
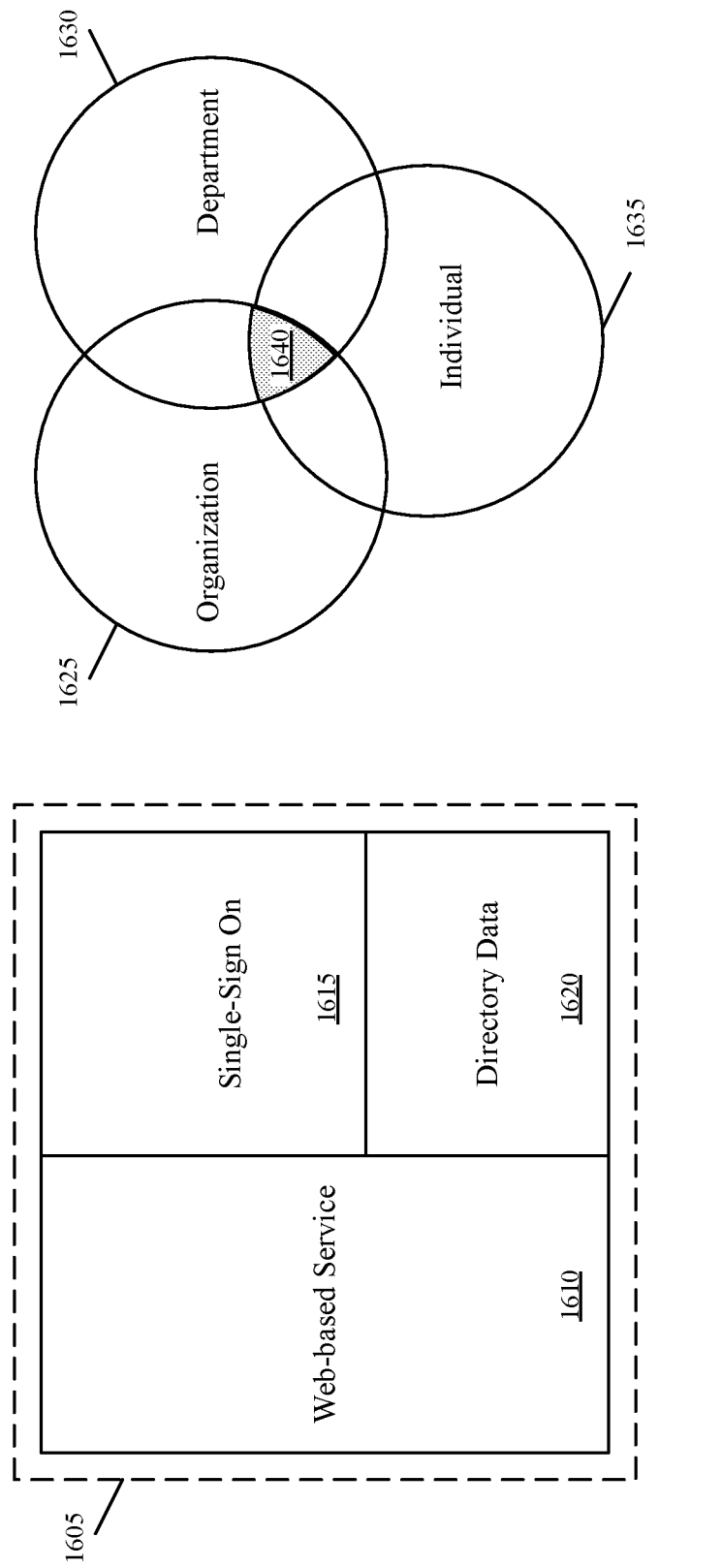
FIG. 16 conceptually illustrates two different embodiments for combining policies, by using a union of policies (left) or an intersection of policies (right).

For example, in some embodiments, policies from two different systems are combined in a union to create a single policy. The merged policy is then evaluated to obtain a single allow/deny decision. FIG. 16 illustrates an example of a merged policy on the left, where a single master policy 1605 is aggregated from the union of policies and data. In this example, the aggregate policy is generated by combining an authorization policy from a web-based service 1610 (e.g., Amazon Web Services) specifies what resources can be accessed from which roles and groups, and an authentication policy from a single sign-on (SSO) service 1615 (e.g., Okta Cloud Connect) defines and authenticates users and groups, which in turn leverages contextual data and credentials from a directory 1620 (e.g., LDAP and/or Active Directory). Policies (i.e., policy opcode) and contextual data (e.g., policy operands) consumed by the policies from all of these sources are merged into a single policy 1605 that integrates the authentication and the authorization of access to resources on AWS by the userbase. Other types of policies, including token-based or password-based authentication policies, identity and access management (IAM) policies, role-based access control (RBAC), and additional contextual data (in some embodiments, not associated with IAM, RBAC, or other policies) may also be combined.

In some embodiments, policies are combined using an intersection of different source policies, as illustrated in FIG. 16 on the right. The resulting policy is valid after all the constraints of the individual policies are considered. For example, an API call requiring authorization may be subject to different hierarchical levels of authorization policies for access at an organization level 1625, a departmental level 1630, and an individual level 1635. Additional types of levels could also include teams or roles. These levels may correspond to different accounts and sub-accounts on AWS, for example. Any request for authorization (of an API, or other action, for example) must be tested against each of these levels, and must be approved by each separate policy, such that if any single policy denies the request, then the overall request is denied. As a result, the final combined policy 1640 is the intersection (shaded area) of all of these separate policies. An alternate way to represent this embodiment (not shown) is as a decision tree, where at each level of the hierarchy, a yes/no decision is made. The final policy corresponds to only those branches where the answer was yes at each level.

II. Building the Permission Graph

In embodiments where the policies are translated to permissions directly, the translation by the visibility server set 1105 is aware of the exact evaluation semantics implemented by the target system. Using this knowledge, in some embodiments, the policy visibility system can then determine the relevant policies and execute them. Furthermore, in some embodiments the additional data that may be needed for each targeted system must be known (e.g., the role information per user and list of resources). Only then can it produce a graph connecting users to the resources they are permitted to access.

In some embodiments, translating policies that explicitly specify a user's rights into permissions is straightforward. For example, systems that express ACLs in terms of a user, action, and resource are converted to a permissions graph by creating nodes for each user and each resource and then connecting a user node and a resource node if there is an ACL granting the user access to that resource. In other words, the visibility server set 1105 takes as inputs (1) the set of policies from all enforcement points (either in Rego or the native policy language of that enforcement point, e.g., AWS IAM), (2) the set of users from all systems and identity providers, and (3) the set of resources from all systems, and outputs the permission graph.

Figure 17:
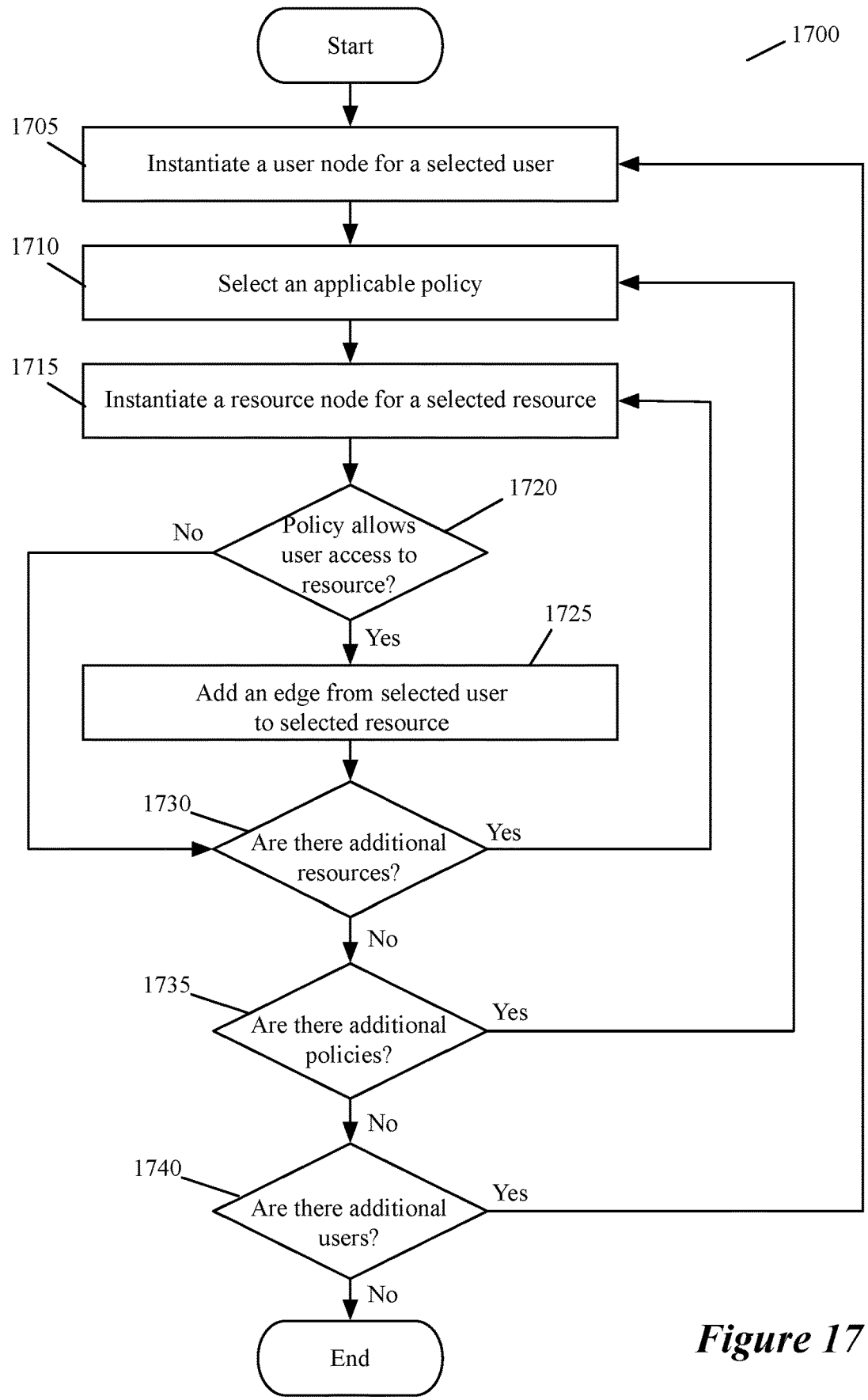
FIG. 17 illustrates a process for constructing the permissions graph.

FIG. 17 conceptually illustrates a process 1700 that describes a general algorithm for constructing the permissions graph in some embodiments. This process 1700 is complementary to and concurrent with the processes 1400 and 1500 described in FIGS. 14 and 15. In some embodiments, some of the operations of this process may occur in a different order than the order depicted.

The process 1700 begins by instantiating (at 1705) a user node for a selected user. The process 1700 then selects a policy (at 1710) from the set of policies applicable to the selected user. This includes policies directly attached to the user, policies that the user inherits from a group, and policies that the user may assume through some other mechanism. In some embodiments, the user is selected from all available users of the system, whereas in other embodiments the user is selected from a group of filtered users, based on analysis of the policies and contextual data.

The process 1700 next instantiates (at 1715) a resource node for a selected resource. For the selected resource, the process 1700 determines (at 1720) if the selected policy allows access to the selected resource by the selected user. In some embodiments, this determination is performed by reverse engineering the policy (as discussed above with reference to FIG. 14). In other embodiments, this determination is performed by executing the policy (as discussed above with reference to FIG. 15). In some embodiments, the resource is selected from all available resources of the service, whereas in other embodiments the resource is selected from a group of filtered resources, based on analysis of the policies and contextual data.

If the selected resource is available to the user per the selected policy, then the process 1700 adds (at 1725) an action edge from the user node to the resource node, where the action is the set of actions granted to the user by the policy that may be invoked on the resource. If the selected resource is not available to the user under the selected policy, then the process determines (at step 1730) if there are more resources. If so, the process returns to 1715 to select another resource.

If there are no more resources, then the process determines (at 1735) whether there are additional policies that are applicable to the selected user. If there are more policies, the process returns to 1710 to select another policy.

If there are no more policies, then the process determines (at 1740) whether there are additional users. If there are additional users, the process returns to 1705 to select another user. If there are no additional users, the process 1700 then ends.

Permission graph construction becomes more complicated in some embodiments when aggregation abstractions are present in the system (e.g., groups of users). In some such embodiments, a user can inherit rights from groups it belongs to. To enumerate a user's rights, the outgoing connections from the user node would need to be inspected, as well as the outgoing connections containing group nodes in a model of the relationship between the user and groups. Groups are one example of aggregator nodes which can be manually specified or automatically inferred by the algorithm.

When translating a native policy language to the permission graph, we optimize the above algorithm by introducing resource aggregator nodes. Generally, policies grant access to a set of resources matching some criteria rather than listing exact resources, so we introduce resource aggregator nodes to the graph to capture these sets of resources. For example, an AWS IAM policy may grant access to all resources within a specific region, during a certain period of time, all resources from a specific service, or even all resources with a certain naming convention.

Figure 18:
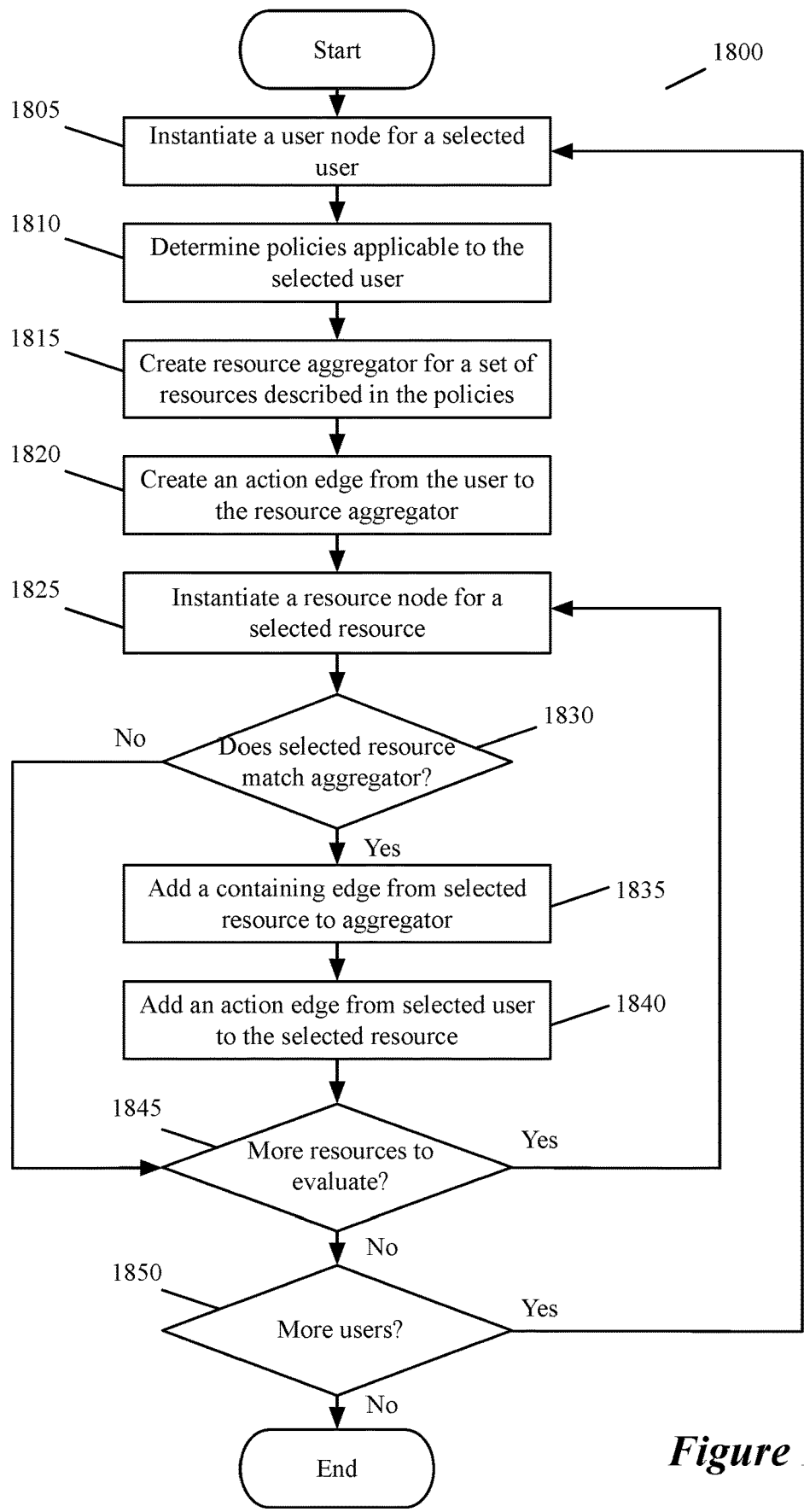
FIG. 18 illustrates a process for constructing the permissions graph using aggregators.

FIG. 18 conceptually illustrates a process 1800 that describes an optimized algorithm for constructing the permissions graph using aggregators in some embodiments. This process 1800 is also complementary to and concurrent with the processes 1400 and 1500 described in FIGS. 14 and 15. In some embodiments, some of the operations of this process may occur in a different order than the order depicted.

The process 1800 begins by instantiating (at 1805) a user node for a selected user, in the same manner as operation 1705. The process 1800 then determines (at 1810) the set of policies applicable to the selected user. This includes policies directly attached to the user, policies that the user inherits from a group, and policies that the user may assume through some other mechanism.

The applicable policies will collectively describe resources that are available to the user. The process 1800 creates (at 1815) a resource aggregator node for a set of these resources, which aggregates resources that are described in the policies using various criteria. For example, in some embodiments the resources may be aggregated by geographic location, or by the originating service that provides the resource. The process 1800 then creates (at 1820) an action edge from the user node to the resource aggregator node. This action edge indicates that the user has access to perform actions upon the aggregated resources.

The process then instantiates (at 1825) a resource node for a resource selected from all the resources described in the policies applicable to the selected user. The process determines (at 1830) whether the selected resource node matches the set of resources described by the aggregator node. If so, then the process 1800 adds (at 1835) a containing edge from the aggregator to the resource node. This containing edge indicates that the aggregator node contains the resource node.

The process also adds (at 1840) an action edge from the selected user node to the selected resource node. As before, this action edge indicates that the user has permission to perform an action upon the resources that are aggregated by the aggregator node. This is an example of a transitive permission that is inferred from the fact that the user has permission to perform the action on the aggregate node, so therefore they have permission to perform the action upon the resource nodes that are contained in the aggregator. After adding the containing edge and the action edge, the process proceeds to determine (at 1845) if there are more resources to evaluate.

If the selected resource node does not match (at 1830) the set of resources described by the aggregator node, the process also proceeds to determine (at 1845) if there are more resources to evaluate.

If there are additional resources to evaluate, the process returns to 1825 to select another resource. If there are no more resources, the process determines (at 1850) if there are additional users. If there are additional users, the process returns to 1805 to select another user. If there are no additional users, the process ends.

In some embodiments, another complication in permissions graph construction arises when users may assume rights they are not granted by a group or policies pertaining directly to the user. For example, AWS IAM allows policies to be attached directly to resources, and these policies specify conditions that allow users to assume their rights, such as a database table including a policy that can be assumed by users matching particular conditions (e.g., belonging to a specific account). Further complicating matters, in some embodiments, these policies may be assumed by systems in addition to users. In some such embodiments, a user can then invoke an API against a resource indirectly by performing an action on a different resource or system entirely. As such, the permission graph should model rights that are granted by transitivity.

The above approach means that the permissions graph construction will grow over time as it learns about all of the imported systems and their semantics. In some such embodiments, in order to introduce a new system from which to import policies, this part of the system has to be touched, which may complicate providing certain translations, such as customer-specific translations.

The alternative approach, in some embodiments, is to include a universal policy representation for translating the imported policies at least once before the graph construction. As a result, the translation would reside outside of the rest of the system as a fairly small, well-bounded module capable of being provided by the customer, if necessary, in some embodiments. Similar to data normalization when importing data, the system normalizes the policy code to one format.

The computation space for all combinations of users and resources is potentially enormous, posing a significant challenge for computing resources. One solution in some embodiments is to filter the user/resource combination space, as conceptually illustrated by operation 1512 in process 1500 in FIG. 15. This filtering can be represented as a sub-process 1900, conceptually illustrated in FIG. 19. Sub-process 1900 may be invoked in some embodiments at any point during the execution of process 1500.

As shown, the process 1900 begins at 1905 by importing contextual data associated with the imported policies. One example is using usage data (e.g., from service logs) to retrospectively evaluate which users and services are actually associated with each other. As another example, certain policies may be bound strictly and exclusively to specific users or services, so their evaluation might be unnecessary for non-matching users and services. This additional information may be either provided by the user or learned (i.e., generated) by the policy visibility system by statically analyzing policies before their execution.

The process also identifies (at 1907) unnecessary access rules in the policies. For example, one rule that specifies a user has access to a resource under certain conditions may be superseded by another rule that specifies that the user does not have access, or vice versa. Another example is that a rule may be identical to another rule, and therefore redundant. Such redundant rules can then be consolidated into a single rule.

In addition, there may be overlap between the users, resources, and groups from the imported policies. The process 1900 identifies and consolidates (at 1910) these redundancies, for example by creating a mapping to identify variations in how the same entities are represented across the different systems. For example, a user name field may be represented using different conventions in different policies, such as first name last name, first initial last name, custom username chosen by the user, user IDs, middle initials, etc. In some embodiments, these redundancies are identified using the contextual data, e.g. by comparing directory data from different sources.

At 1915, the process excludes users and resources which are not relevant to the computation. In other words, users and resources that are not utilized by the policy, or which do not result in an allow/deny decision, are trimmed from the user/resource combination space. In this manner, only relevant policies and users will be included in the computation. By prospectively excluding non-relevant users and services, the space for computation can be significantly reduced by several orders of magnitude in some cases. In some embodiments, determining the relevance requires taking the contextual data into account as well.

The permission graph is then computed (at 1920) as described above, using the condensed users/groups and the filtered user/resource combination space. In some embodiments this filtering of the space occurs prior to merging policies from different sources (as described above with reference to FIG. 16). In some embodiments, condensing the user/groups and filtering the search space also occurs after merging policies, where additional contextual information in the global space is available to exploit.

In some embodiments, the graph is computed directly from the source policies. In other embodiments, an intermediate representation is used, which unifies the policies into one general policy language (e.g., Rego). The graph is then constructed from the unified policy representation. Reducing the search space by filtering can occur in either scenario, either at the time of loading policies or after they have been combined into the unified representation using the policy language.

In some embodiments, the graph may be constructed offline, and in other embodiments, the graph is computed online. The decision between offline and online computation is a trade-off between: (i) space required to save the entire graph and its updates, (ii) computational cost required to compute the graph and maintaining it up-to-date regardless of frequency of use, and (iii) expected latency when serving the graph queries. As the underlying policies are modified, added, or removed, online computation ensures that the graph always represents the real-time state of the system.

While strict latency requirements make proactive construction a necessity in some embodiments (since the initial phase of translating policies to a user-service permission graph is potentially resource intensive), the later stages of preparing the graph may be amenable for online and on-demand execution when a query is received. This is especially relevant since, in some embodiments, the analysis over the permission graph often does not happen with high frequency; it might involve a user accessing the analysis system, searching for certain information, and then doing nothing for hours or days. The correct trade-off, therefore, is highly dependent on the expected usage patterns. For example, frequently computing and saving a plurality of information (which is resource intensive, and therefore financially expensive) for the sake of snappy ad-hoc query execution might not be considered worthwhile for anything but premium customers.

III. Extending the Basic User-Service Graph

In some embodiments, there are several ways to extend the graph to hold more information beyond the basic user-resource connections, as well as to make it easier to query. A simple example of an extended permissions graph 2000 is conceptually illustrated in FIG. 20. In some embodiments, extending the permissions graph may include introducing new nodes to the graph and then connecting them to the entities they relate to (e.g., aggregates for both users and services). For example, node 2005 has been added, which is an aggregate of users, and is connected to user node 2010 to indicate membership in the aggregate. Node 2005 is also connected to resource node 2015 to indicate that at least one user in the aggregate 2005 has permission to access that resource.

In some such embodiments, transitive connections may be introduced. In some such embodiments, not only can users connect to services (and both to their aggregates), but transitive connections from users via aggregates to services may also be included. This allows easier querying for the graph. In other embodiments, additional type information about the connections may be included to be used while querying the graph. In some such embodiments, this information may include policy conditions. This is the most powerful approach, but it also embeds information to the graph that complicates querying the graph.

In some embodiments, data for the graph extensions may be received from additional import API calls made by the system. Particularly, embodiments in which additional type information is included in the connections highlights the most difficult challenge: if the graph size becomes a problem, and one wishes to use aggregates and connection types to reduce the graph size while maintaining the graph fidelity, policy conditions are often saved into connections and nodes in the graph. Consequently, these policy conditions are incomprehensible for the graph query language.

Figure 20:
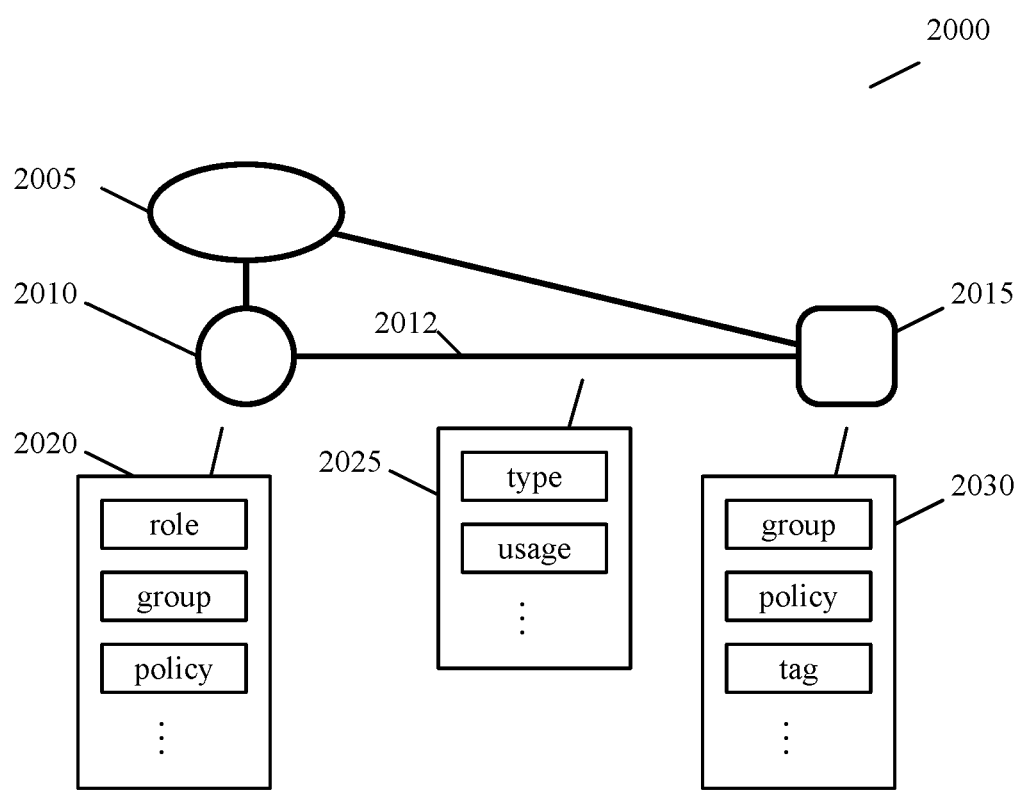
FIG. 20 conceptually illustrates an extended permissions graph, with object attributes for user nodes, service nodes, and connections.

Examples of embedding additional information into the permissions graph are further illustrated in FIG. 20. For example, user node 2010 can be extended in some embodiments with additional information fields 2020, including role, group (e.g. aggregate membership), and associated policy. The connection 2012 between user node 2020 and resource node 2015 also can be extended with fields for type of connection and usage information for how often that connection is utilized. Finally, the resource node 2015 can be extended with fields 2030 corresponding to resource group (e.g., aggregate membership), policy, and tags or metadata.

While the aggregates might be defined by policy semantics (e.g., roles) in some embodiments, other relevant aggregates might either require help from the user or data-mining. In some embodiments, for example, to know which tags in cloud platform resources correspond to PII data, assistance from a user is required as extracting that semantic information is difficult without additional clues. However, clustering users per their actual access patterns can be automated with clustering algorithms without further semantic information.

In some embodiments, clustering algorithms aggregate nodes of a specific type into potentially overlapping groups. In some embodiments, clustering algorithms for users may include partitioning users by number of permissions they have, partitioning by usage frequency, partitioning by distance from least-privilege, clustering by group membership similarity, clustering by geographic region, and clustering by accessed-resource similarity. Groups can be clustered by a closeness score of their memberships and the closeness of aggregated user permissions for users belonging to the group in some embodiments. In some other embodiments, services can be clustered by function or by similarity of users with access. In some such embodiments, resources can be clustered by: geographic region, fraction of users who can access them, metadata similarity, or accessed-by similarity.

IV. Querying the Graph

The permissions graph is a visual representation that provides visibility into the permissions of the system. As a result, querying the graph is also a visual process in some embodiments. It can be difficult to anticipate the exact needs of the visualization and analysis built on the graph. Therefore, instead of defining (i.e., hardcoding) the structure for graph per certain use cases, some embodiments allow flexible querying of the graph. This also prevents the need to retrieve large portions of the graph (i.e., for local running of the analysis).

There are several goals and features of the permission graph visualization. First, the graph presents the relationships (in some embodiments, as a response to the query) between users and the resources each user may invoke an API against, which were defined in the policies (e.g., the access rules and criteria specified in the policies). These relationships describe access of the users to the service generally and the resources specifically. Second, the visualization displays the user-to-resource relationships in a scalable way by adding aggregator nodes to aggregate many connections into a single transitive connection. Third, the graph highlights the most important information immediately using automated clustering algorithms to give a high-level overview of the permissions granted by a set of policies. Finally, the graph visualizes the permissions granted to users by policies across many systems in a common view.

Figure 21:
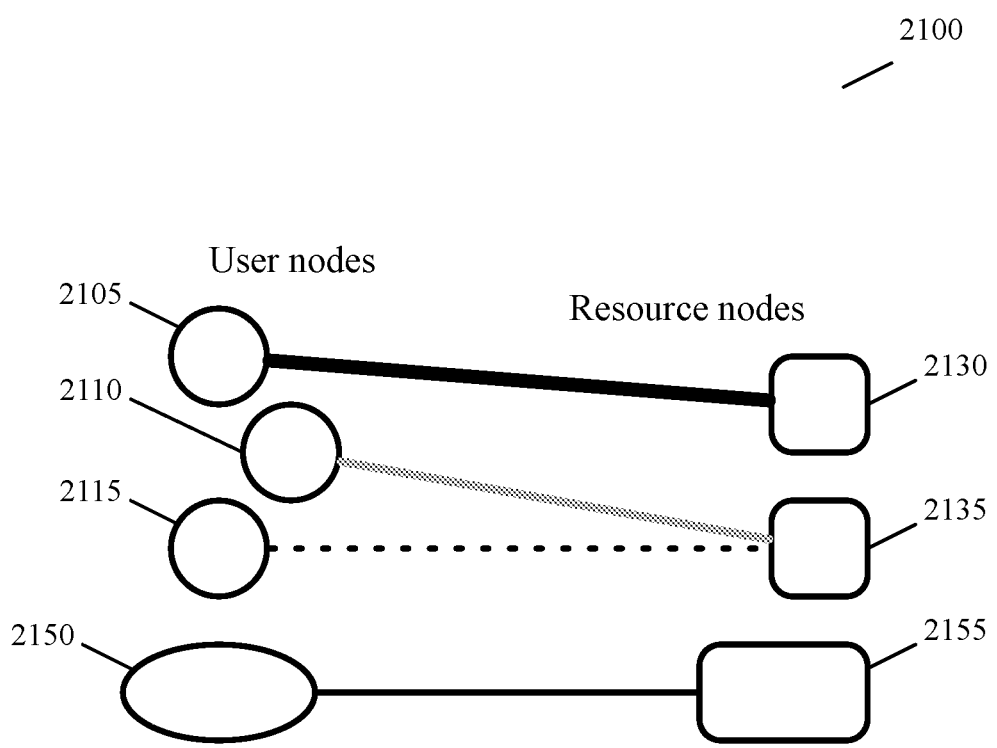
FIG. 21 conceptually illustrates a query of the extended permissions graph, visualizing the extended information in different ways.

The permissions graph can be extended in some embodiments to represent the basic user-resource relationships, as well as the extended information. An example is conceptually illustrated in FIG. 21, which demonstrates that usage information associated with connections can be represented as different line types between nodes. Connections that are heavily utilized, such as between user 2105 and resource 2130, are visualized as heavy lines. Connections that are underutilized, such as between user 2115 and resource 2135, can be represented as a dotted line, which provides a visual cue for potentially removing that permission entirely. In addition, connections between aggregates of users 2150 and aggregates of resources 2155 can also be displayed. Certain connections, such as that between user 2110 and resource 2135, may be represented in a different color, corresponding to extended information such as user attributes 2020, resource attributes 2030, and/or attributes 2025 of the connection 2012 itself. Alternatively, different colors and weights may also be used to represent different allowed actions of the user on the connected resource, e.g. representing different API calls. In some embodiments, different styles of connections may also represent lack of authorization to access a node or disallowed actions, e.g. a solid red line. Such a visual style could help verify that certain desired constraints exist on certain users accessing certain protected resources, or to verify the impact of changing a policy on the overall permissions graph.

A conventional graph visualization renders each and every of its nodes along with all of the connections (also referred to as edges) linking one node to another. At scale when there are many such interconnections, such literal visualizations become highly convoluted, intractable knots so dense as to be effectively meaningless. A typically large organization may have tens of thousands of users and millions of resources, so a conventional visualization of a permission graph will not scale.

In some embodiments, a query that is particularly relevant to visualizing the graph is to topologically sort the graph's nodes by type while aggregating transitive relationships between nodes from left-to-right columns. In some such embodiments, the user selects a sorted list of columns to appear in the output, where each column represents a set of nodes with the same type. Nodes in the same column do not have connections between them; instead, nodes are connected only to nodes in adjacent columns. In some such embodiments, a connection between two columns indicates that there is a transitive relationship between the connection's endpoints.

For example, a user may want to visualize the APIs that are allowed to be invoked on a particular resource by each group of users. This query may use a topological sorting, such as [user, group, resource], where user, group, and resource are node types. A conceptual example of such a topological sorting query is illustrated in the top half of FIG. 22. A connection from a user 2205 to a group 2210 indicates that the user is a member of the group. A connection from the group 2210 to a resource 2215 implies that at least one user in the group has access to the resource. In this way, the group to resources connections aggregate all permissions from left-to-right in the topological ordering.

This contrasts with a query that is given a topological ordering [group, resource]. A conceptual example of such a topological ordering query is illustrated in the bottom half of FIG. 22. In some such embodiments, a connection from a group 2220 to a resource 2225 implies that all members of the group have the access rights specified by the connection.

The topologically ordering query in some embodiments can be further refined in some embodiments by indicating a "selected" set of nodes. Selected nodes place constraints on the aggregation of transitive relationships such that only selected nodes are considered when computing the transitive connections between columns. For example, in some embodiments such as the one described above that uses a topological ordering of node types [user, group, resource], if a single resource is marked as selected, then only user and group nodes with a path to that resource will be returned (i.e., only the users and groups that can invoke an API against the resource will be in the computed graph). Likewise, in some embodiments, if a user node is marked as selected, only groups containing that user will be returned along with resources from that user (i.e., from its own rights or the rights of groups it belongs to).

In some embodiments, other constraints may be placed on graph nodes, connections, or both. Nodes and connections include properties, and queries may place constraints on those properties. In some embodiments, a node may include a "time created" property that indicates the time the asset represented by the node was created, and a query could add constraints so that only nodes with a time created property after a specific time are returned.

Query constraints may also be in the form of aggregates over the property data. In some embodiments, edges that represent allowed actions between a user and a resource may include a property that indicate the APIs that may be invoked by the user against the resource. In some embodiments, a query can place constraints of aggregates of those APIs by selecting read-only APIs. Such aggregate properties are added to the graph when it is constructed, and the aggregating function is built into the graph logic or can be supplied by the user in some embodiments.

Figure 22:
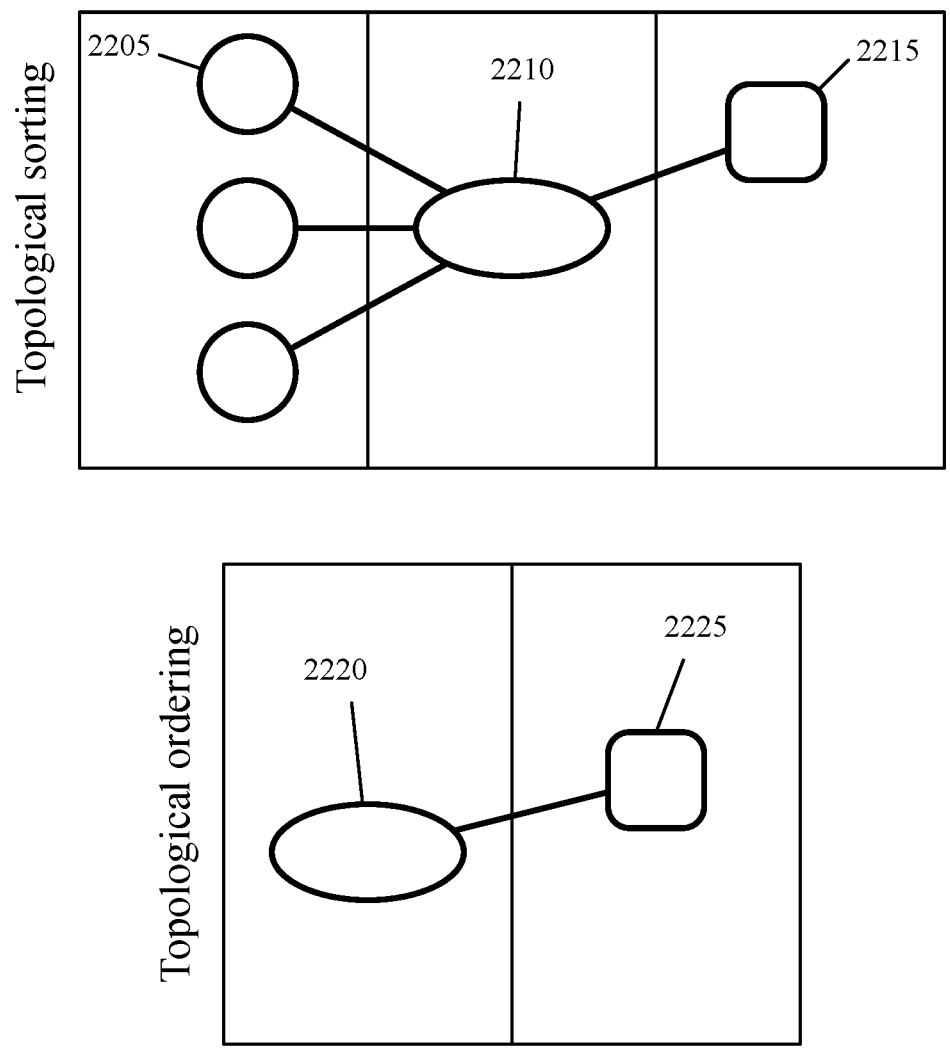
FIG. 22 conceptually illustrates two types of queries of the extended permissions graph, a topological sorting query (top) and a topological ordering query (bottom).

The example graphs in FIG. 22 also support a number of techniques that in some embodiments can be employed to visualize the permissions graph in a scalable, discoverable fashion. For example, the graph can employ middle-out progressive disclosure. The left-most and right-most columns of the topologically-ordered or topologically-sorted graph represents users and resources respectively. Correspondingly, the middle of the visualization is occupied by aggregator nodes. With idle-out progressive disclosure, the visualization initially reveals only the centermost hierarchy between its left-side entities and their right-side counterparts. End-users may explore both to the left and right of the graph's middle to incrementally reveal relationships between graph entities in finer detail.

Another technique in some embodiments is to employ automated clustering. Some collections within the visualization will be predefined (for example, teams of people within a business) while others must be programmatically inferred (for example, clusters based on volume of activity or shared geographical location). These latter collections appear centermost in the visualization (though they may also be utilized elsewhere) because they represent emergent insights (i.e., recommended starting points for end-user exploration) that might otherwise be masked by large or complex graph data.

Another technique in some embodiments is to use alignment. The graph hierarchy is visualized as a series of interconnected columns such that each level of hierarchy may be filtered, scrolled, sorted, and otherwise manipulated independently. The middle columns remain stable, so that the end-user's sense of location within the overall visualization is preserved as they explore outward to both the left and to the right.

Finally, the graph can explicitly articulate relationships in some embodiments. The series of nodes selected by an end-user from one side of a topologically-ordered or topologically-sorted graph visualization to the other is highlighted like a trail on a hiker's map, clearly articulating the set of relationships under consideration. Furthermore, the visualization is continuously updated to reflect routes that are either newly, or no longer, accessible along the selected path.

FIG. 23 illustrates an example of a permissions graph visualization 2300 in some embodiments. As illustrated in FIG. 23A, the nodes of a permissions graph are organized in some embodiments into columns 2305-2335. Categories for the columns are determined in some embodiments by analyzing the underlying graph data, such as clustering by volume of activity. Columns can be filtered, sorted, scrolled, and otherwise acted upon independently. The columns are divided into two sides, entities who perform actions on the left (e.g. users 2305, groups 2310, user clusters 2315) and actions performed and their targets on the right (e.g. actions 2335, assets 2330, services/resources 2325, and asset clusters 2320). In some embodiments the icons for the nodes are represented using different shapes (e.g. circles for entities and squares for assets), with different colors and decorations indicating different types of extended information pertaining to the node and its edges. The edges connect entities on the left side of the graph (e.g., the low-usage user cluster 2340) with associated targets on the right side of the graph (e.g., the global asset cluster 2345). In some embodiments the nodes and the edges are decorated with symbols, colors, patterns, and thicknesses to represent the various information. For example, in some embodiments, the edges can be represented as solid lines, dotted lines, dashed lines, and dot-dashed lines to indicate whether an action target is used or unused, whether the action is authorized or unauthorized, whether an access attempt has failed or was successful, etc. In other embodiments the same information may be conveyed using different color lines (e.g., red for failed access, blue for successful access, and gray for unused access) or as lines of different thicknesses. In some embodiments, edges or connections that indicate a failed access may have different styles to indicate why the access failed, e.g. because the action was not allowed but the user attempted to access anyway, or because the attempted access violated some other set of criteria defined by the policies.

In some embodiments, visualization of the permissions graph is interactive. The combination of selected nodes determine which parts of the graph are disclosed and how graph elements are decorated. For example, in FIG. 23B, selecting the moderate usage cluster 2350 instead of the low usage cluster 2340 changes the graph, so that the "none" group 2355 is withheld, and the developers' group 2360 is disclosed. Further, the S3 service 2365 is now also disclosed.

Figure 23A:
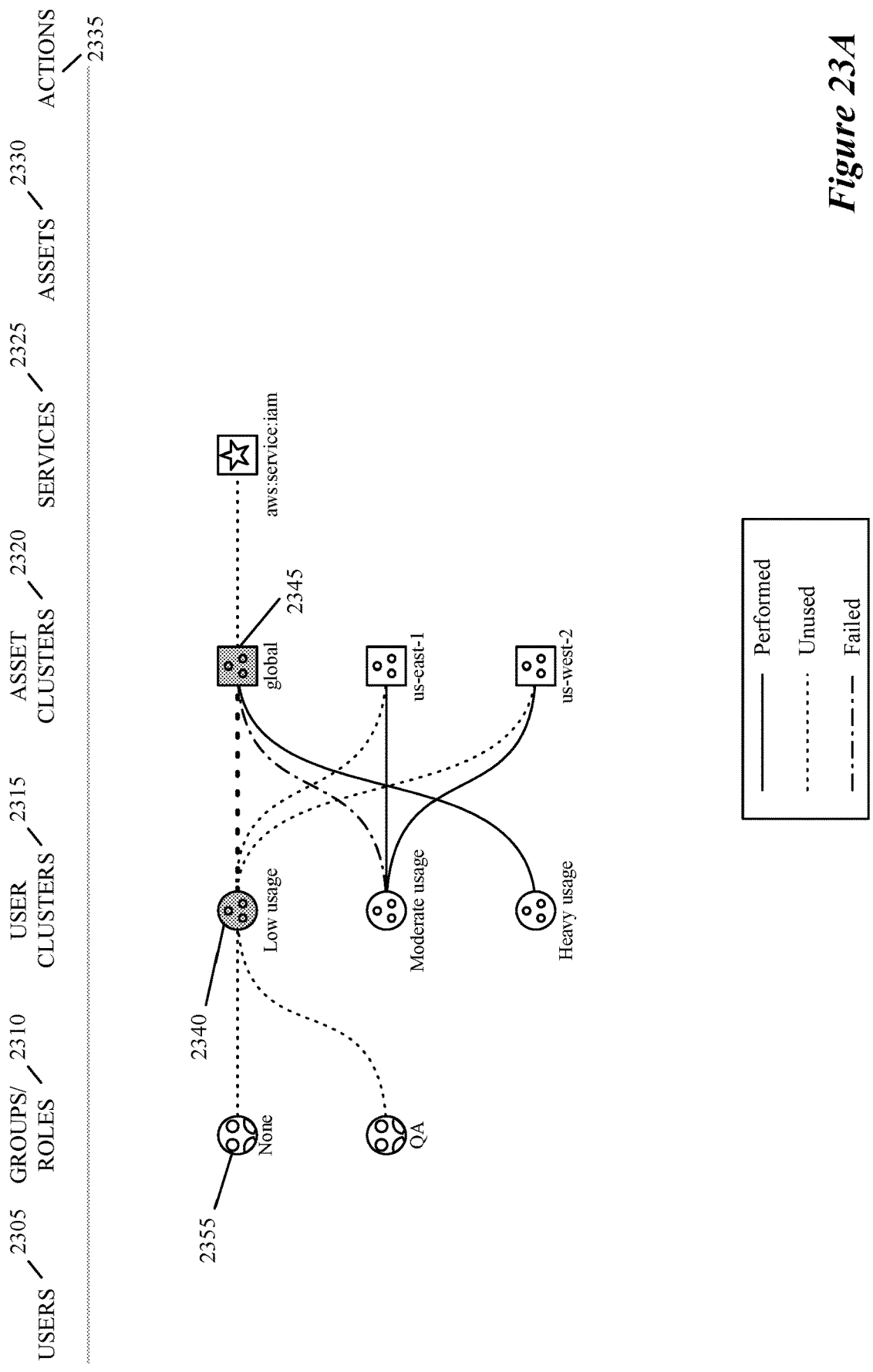
FIG. 23A-H illustrates an example of a topologically-ordered permissions graph visualization in some embodiments.
Figure 23B:
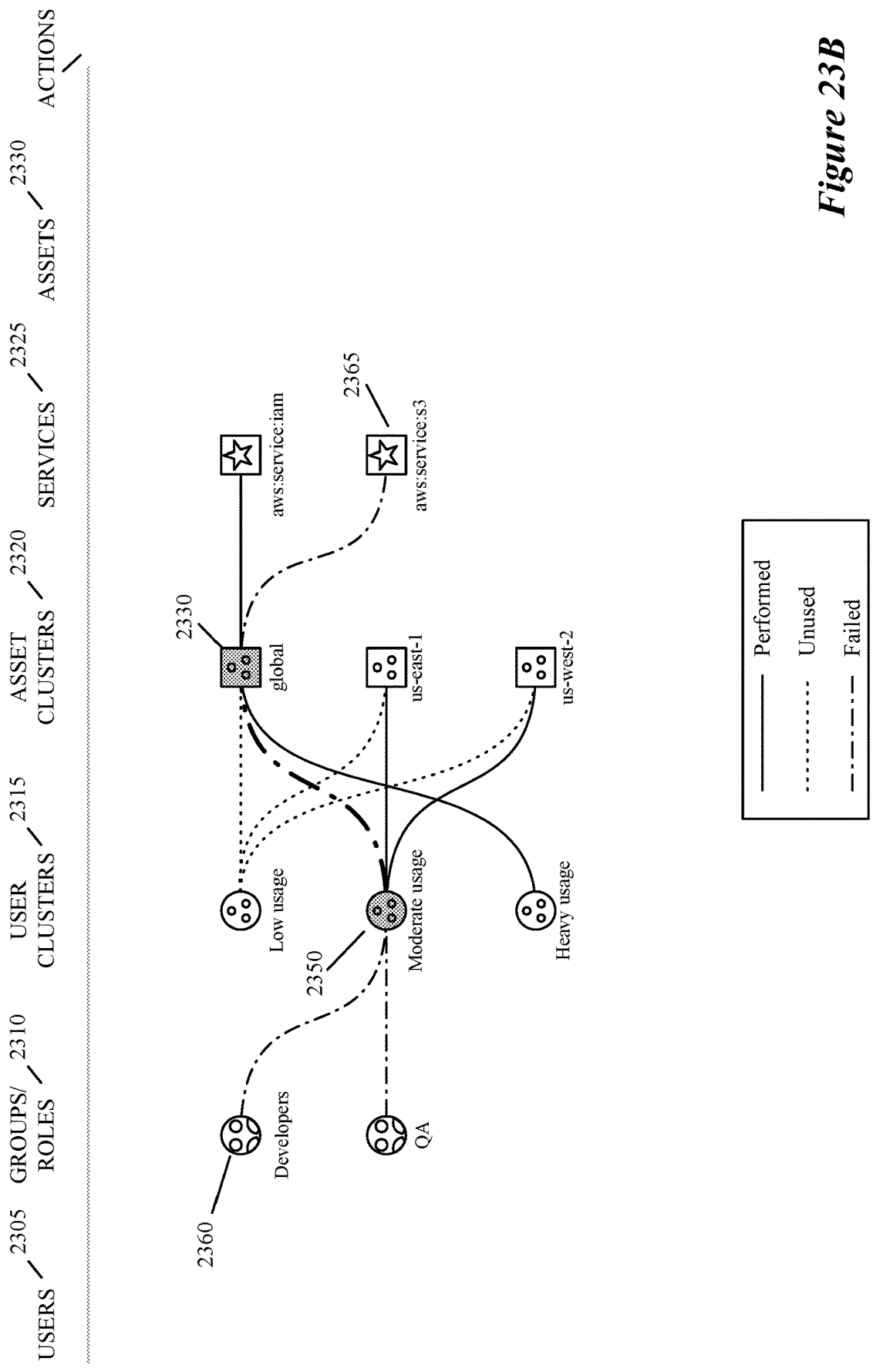
Figure 23C:
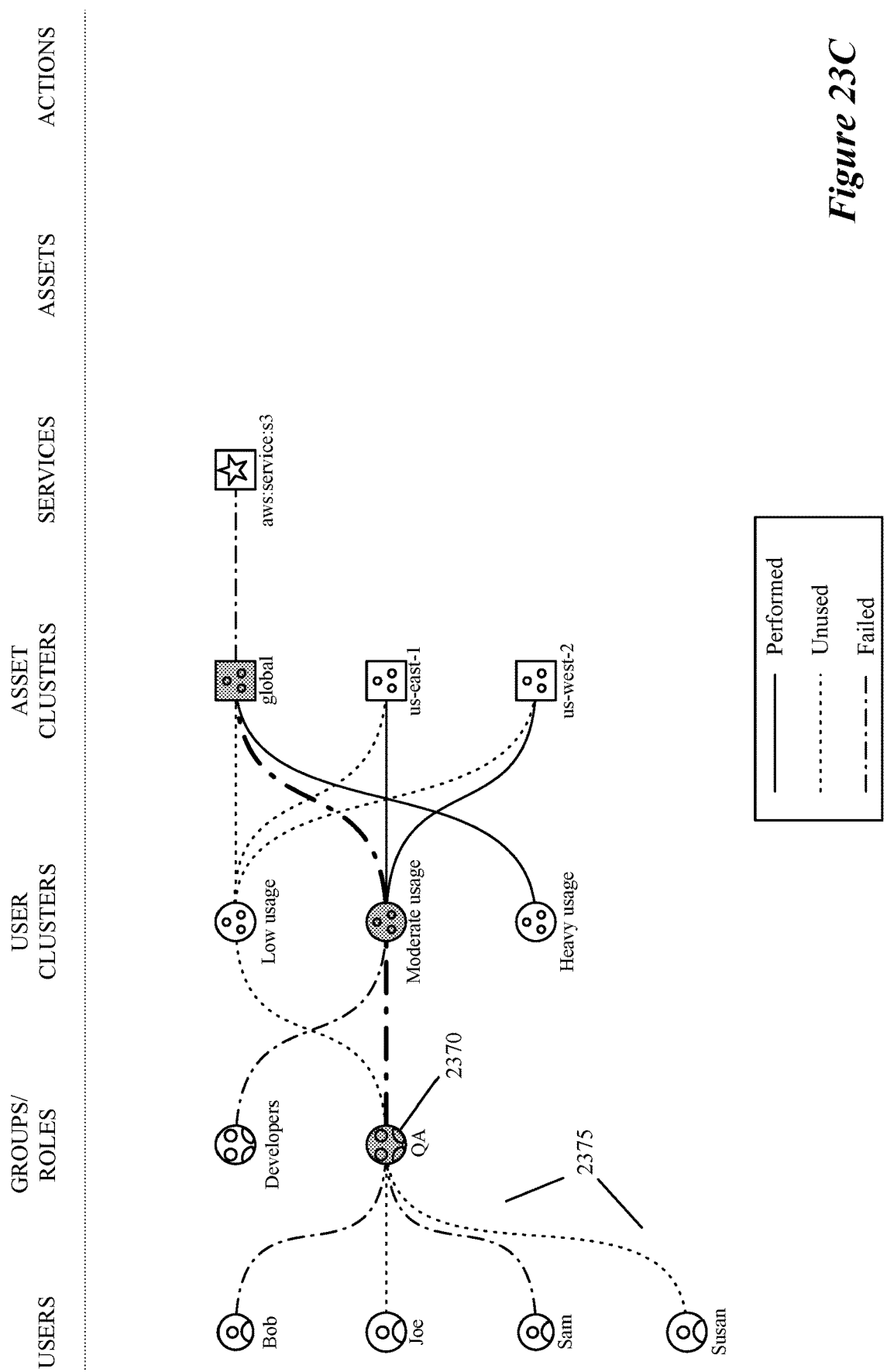
Figure 23D:
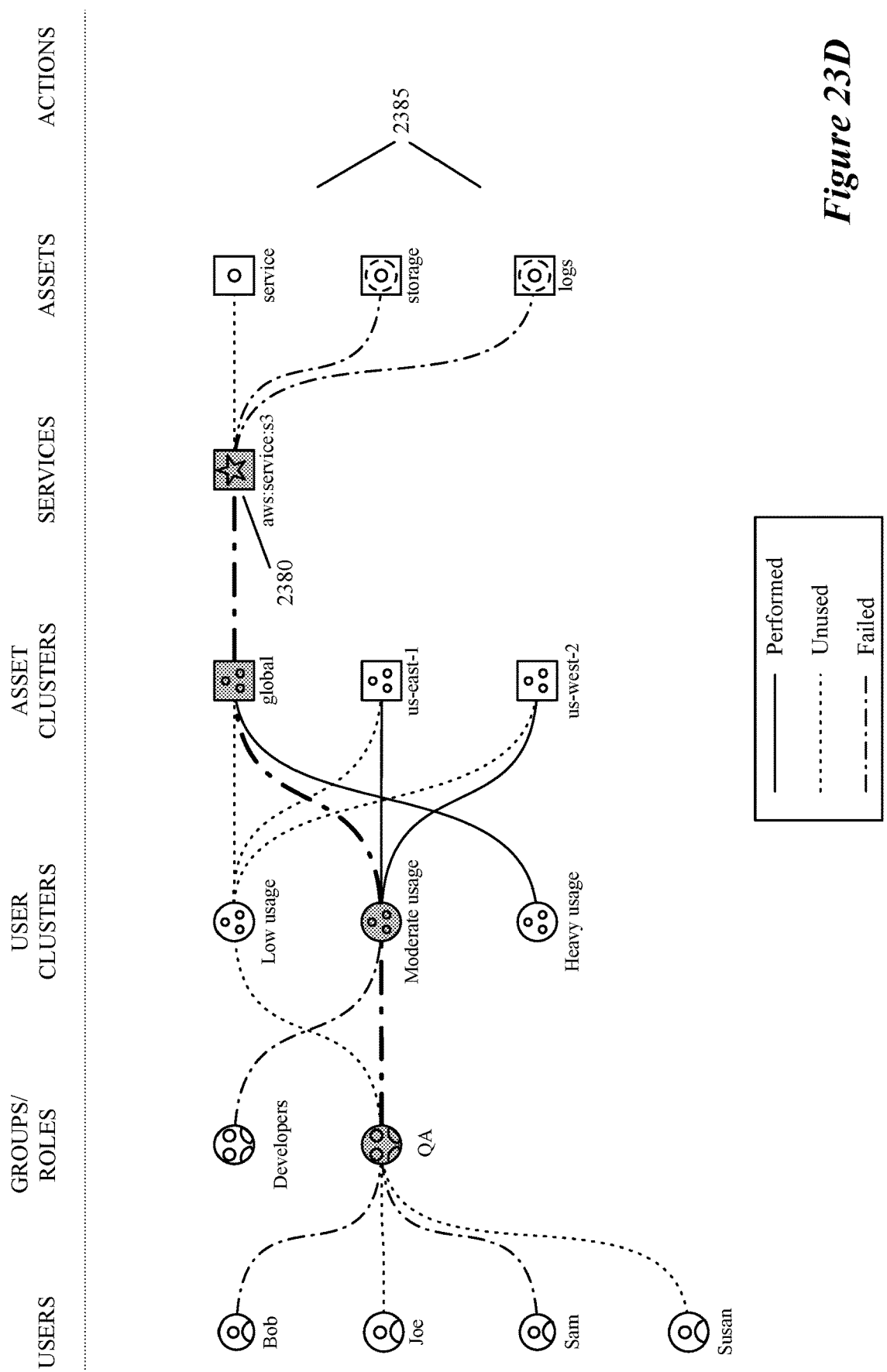
Figure 23E:
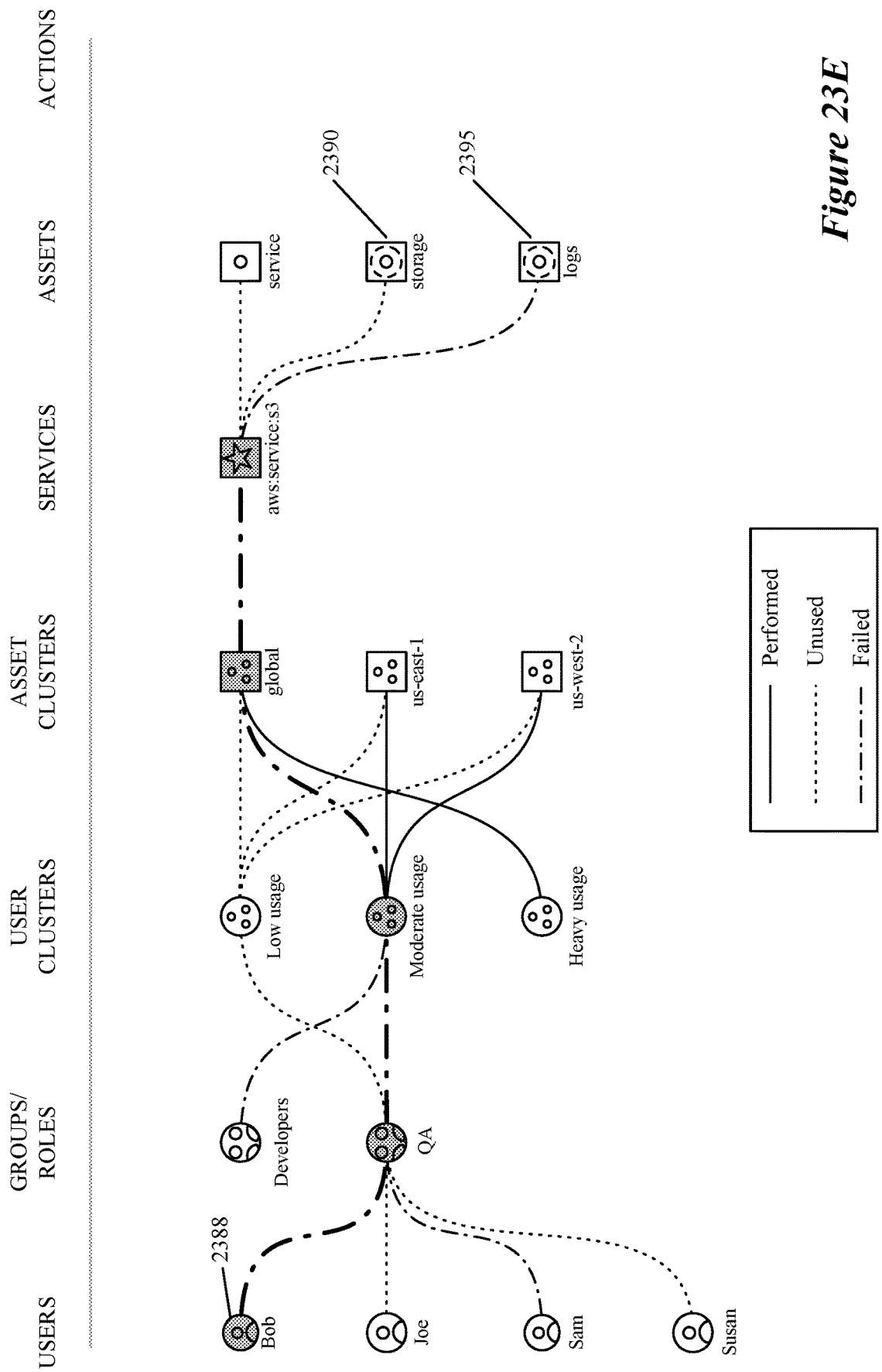

Data towards the edges of the visualization are finer-grained in some embodiments than data in the middle. As illustrated in FIG. 23C, selecting the QA node 2370 discloses members of the QA group 2375, e.g. Bob, Joe, Sam, and Susan. Likewise, as illustrated in FIG. 23D, selecting the S3 node 2380 discloses instances 2385 of the S3 service, e.g. service, storage, and logs.

Figure 23F:
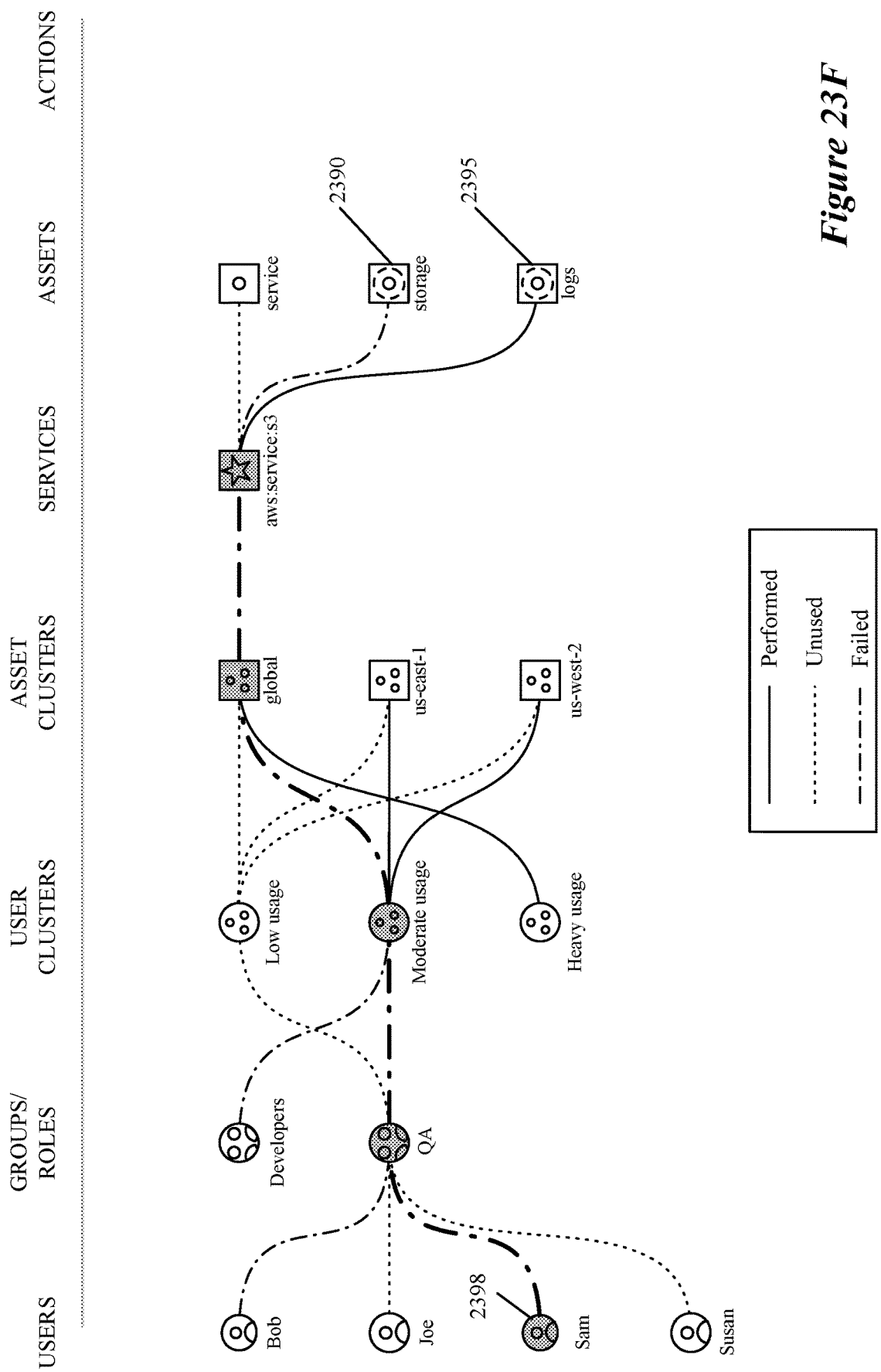

Further, left-side selection influences the right-side decoration, to reflect the rights and activity. In some embodiments, decorations reflect the granularity of the data in relation to the selection state. For example, in FIG. 23E, selection of user Bob 2388 from the QA group 2375 reflects Bob's rights and activity. The storage node 2390 and incoming edge is decorated (in this case, with a dotted line) to indicate unused action targets, while the logs node 2395 and its incoming edge are decorated (with a dot-dashed line) to indicate failed access attempts. In FIG. 23F, selection of user Sam 2398 from the QA group 2375 reflects Sam's rights and activity. The storage node 2390 and incoming edge are decorated to indicate a failed action attempt (dot-dashed line) while the logs node 2395 and its incoming edge are decorated to indicate a performed action (solid line).

Figure 23G:
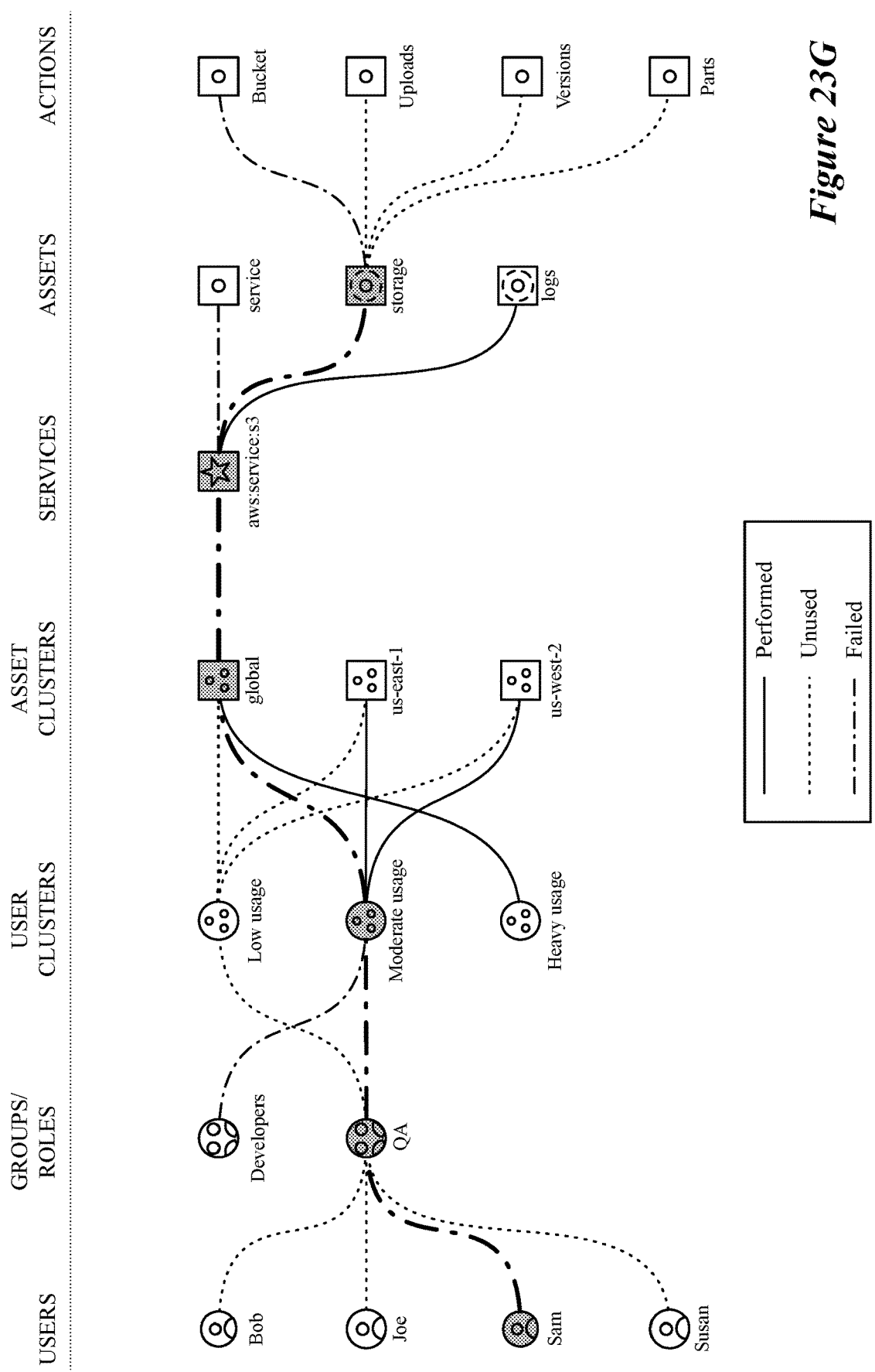
Figure 23H:
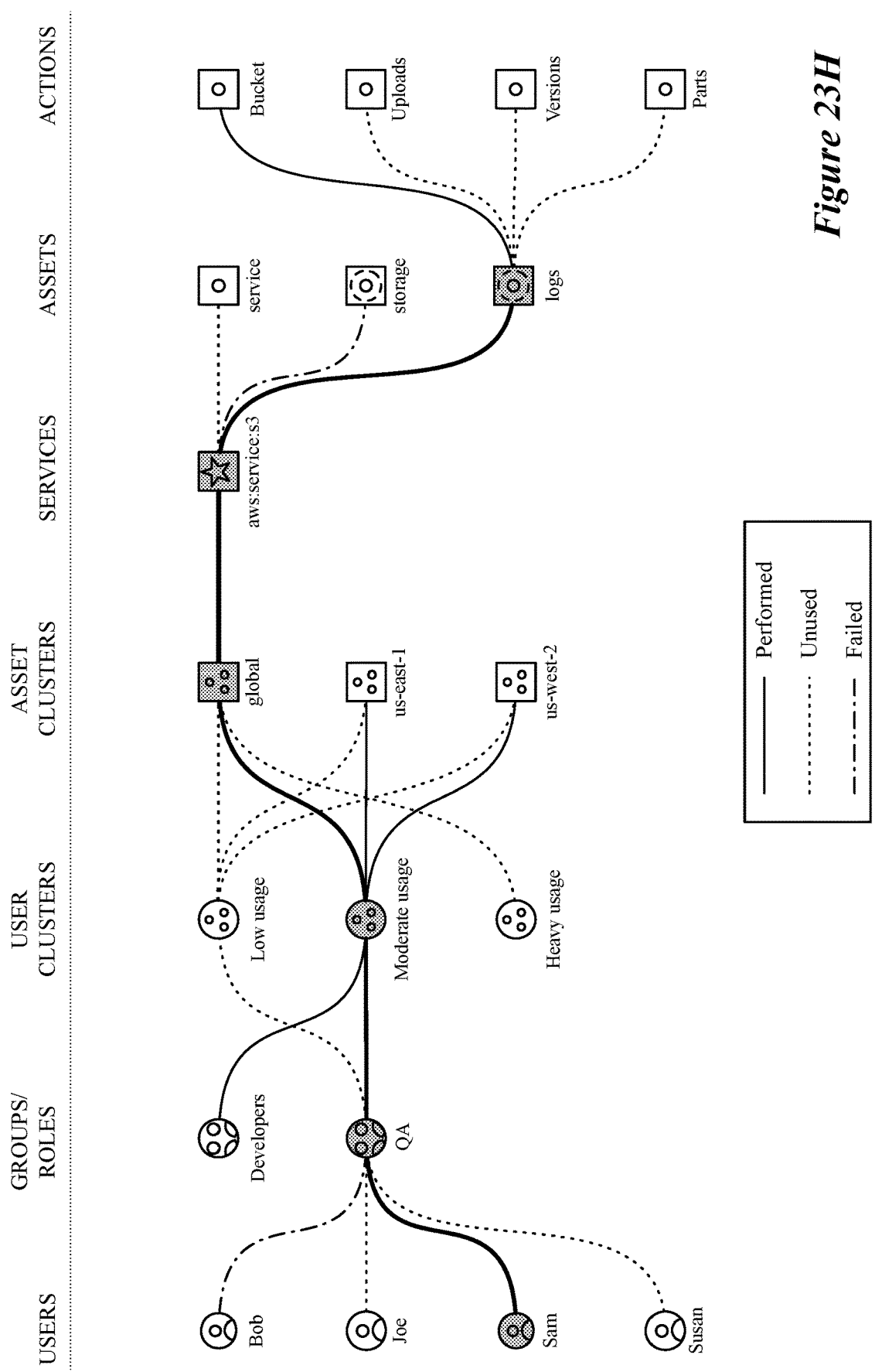

The selection state determined by the end-user results in a path through the data based on the relationship between left-side and right-side elements. In FIG. 23G, user Sam's actions on the storage asset are shown, revealing different types of activity (failed, performed, unused, etc.). In FIG. 23H, user Sam's actions with the logs asset are shown. Even though the actions are the same, the types of activity (failed, performed, unused, etc.) for each action are different depending on the asset. Each interaction redraws the entire visualization to reflect the underlying relationships in the data.

FIG. 24 illustrates another example of interacting with a permissions graph. This sample permissions graph has nodes for users, groups and roles, user clusters, asset (i.e., resource) clusters, services, assets, and actions. Each of these types of nodes are represented by a separate column in the graph. In this example, users are clustered by frequency of their usage of Amazon Web Services (AWS) APIs, e.g. low, moderate, and heavy. Assets are clustered by different AWS regions, e.g. global, U.S. east coast, and U.S. west coast.

Edges are displayed in some embodiments using different colors, weights, or styles to indicate usage as well as access. In the example of FIG. 24, dot-dashed lines indicate that some user contained by the selected path invoked an API on some resource contained by the selected path, and that API call returned an error. Solid lines indicate the same, except that the API call was successful. Dotted lines indicate that some user contained by the selected path has access to some resource contained by the selected path, but no users contained by the path have actually invoked any API on any resource contained by the path.

Figure 24A:
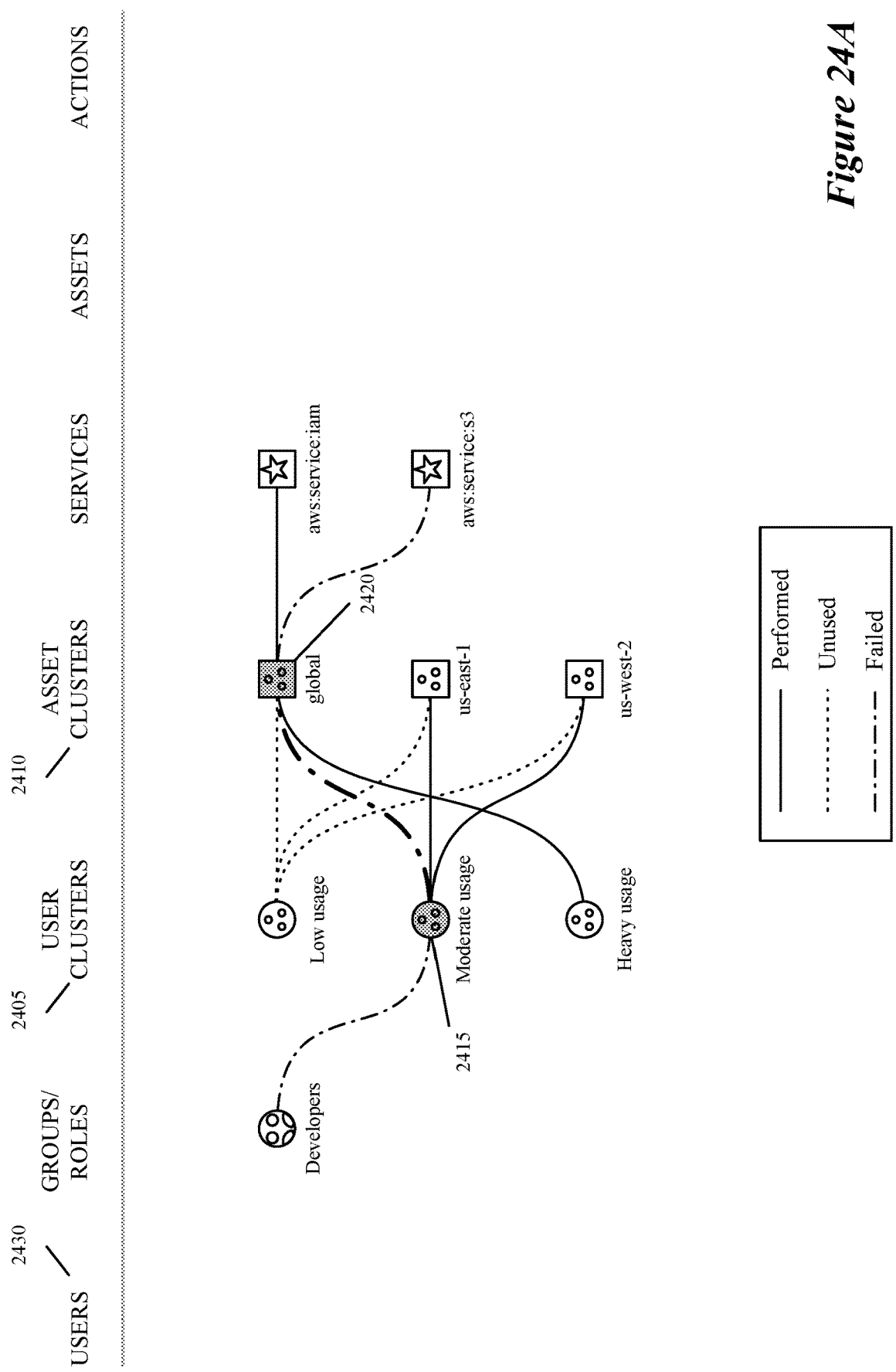
FIG. 24A-F conceptually illustrates an example of interacting with a permissions graph.

The initial view for this sample permissions graph is illustrated in FIG. 24A. In the initial view, the default innermost nodes are the clusters for users 2405 and assets 2410. The moderate usage cluster 2415 and the global asset cluster 2420 have been selected, and the edge between them is rendered as a thicker line to highlight the relationship between them. As the user explores the graph leftwards and rightwards, the corresponding edges will also be rendered as thicker lines to highlight the entire path of interest from left to right. This is equivalent in some embodiments to performing a query on the graph.

Figure 24B:
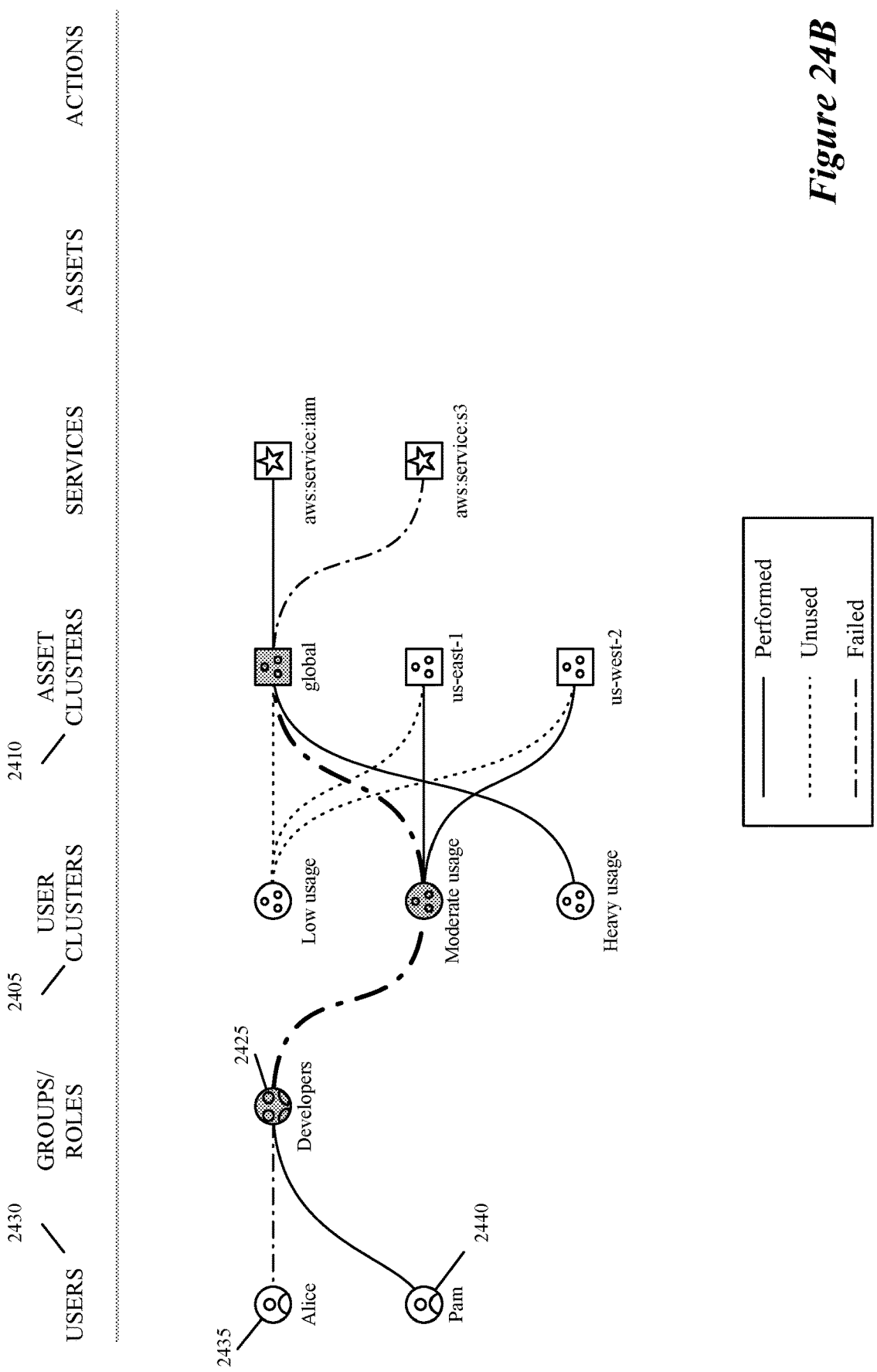

In FIG. 24B, the Developers group 2425 has been selected. In addition to expanding the path, the user column 2430 is now also disclosed. Only users Alice 2435 and Pam 2440 are shown in this column. Specifically, Alice and Pam are the users in the Developers group, who belong to the moderate usage cluster, and who have access to the resources in the global cluster. The graph reveals that Alice is the user who had a failed API attempt (due to the dot-dashed line), whereas Pam has had a successful API attempt (due to solid line).

Figure 24C:
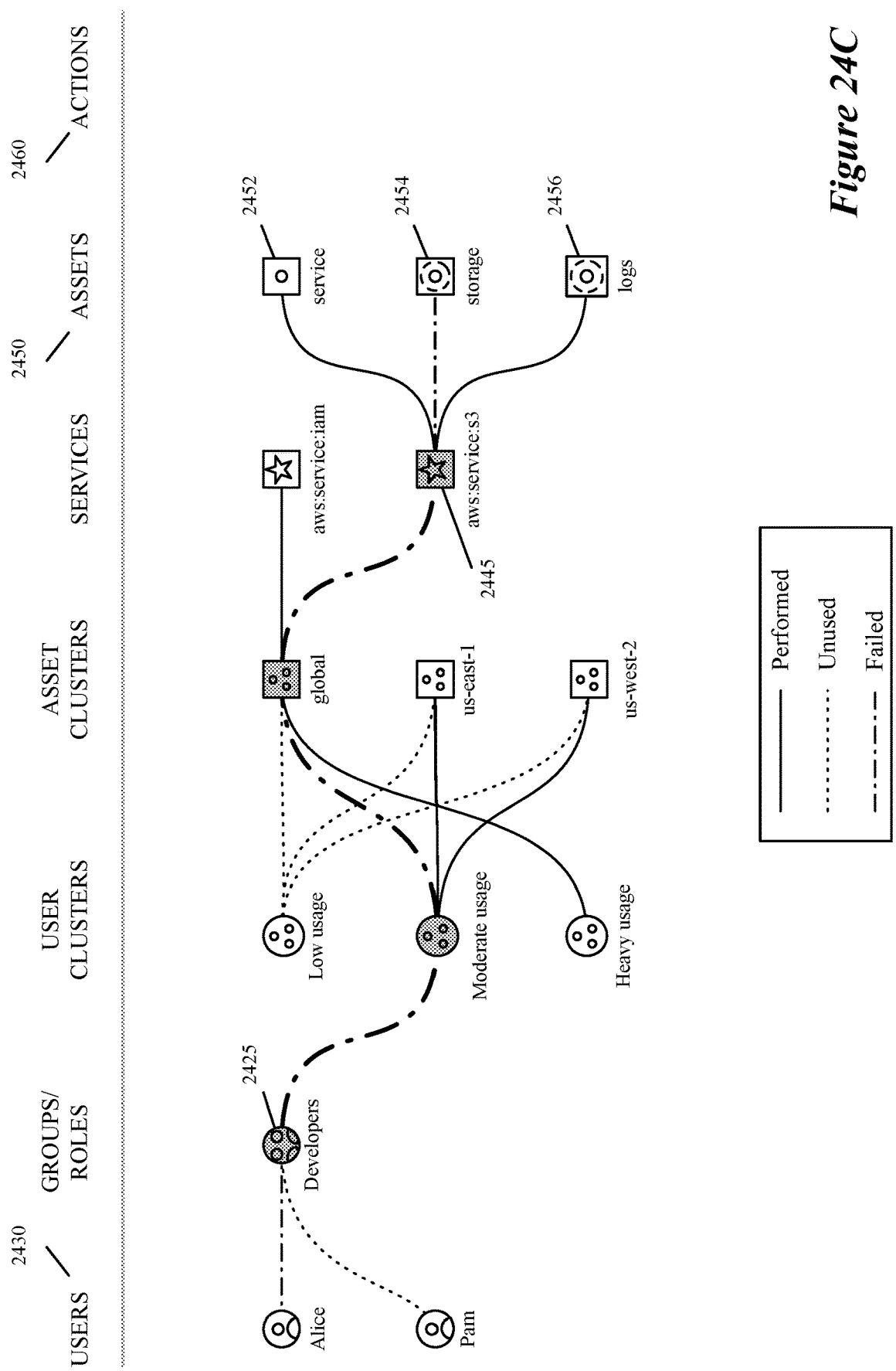

In FIG. 24C, the AWS S3 service 2445 has been selected. This causes the assets column 2450 to be disclosed, revealing a service asset 2452, a storage asset 2454, and a logs asset 2456. The users shown here are those who all have access to the S3 API that can be invoked on either the S3 service 2445 itself, or on one of the buckets 2452-2456 shown in the assets column. Only S3 buckets that are accessible to at least one member of the Developers group 2425 are shown.

Figure 24D:
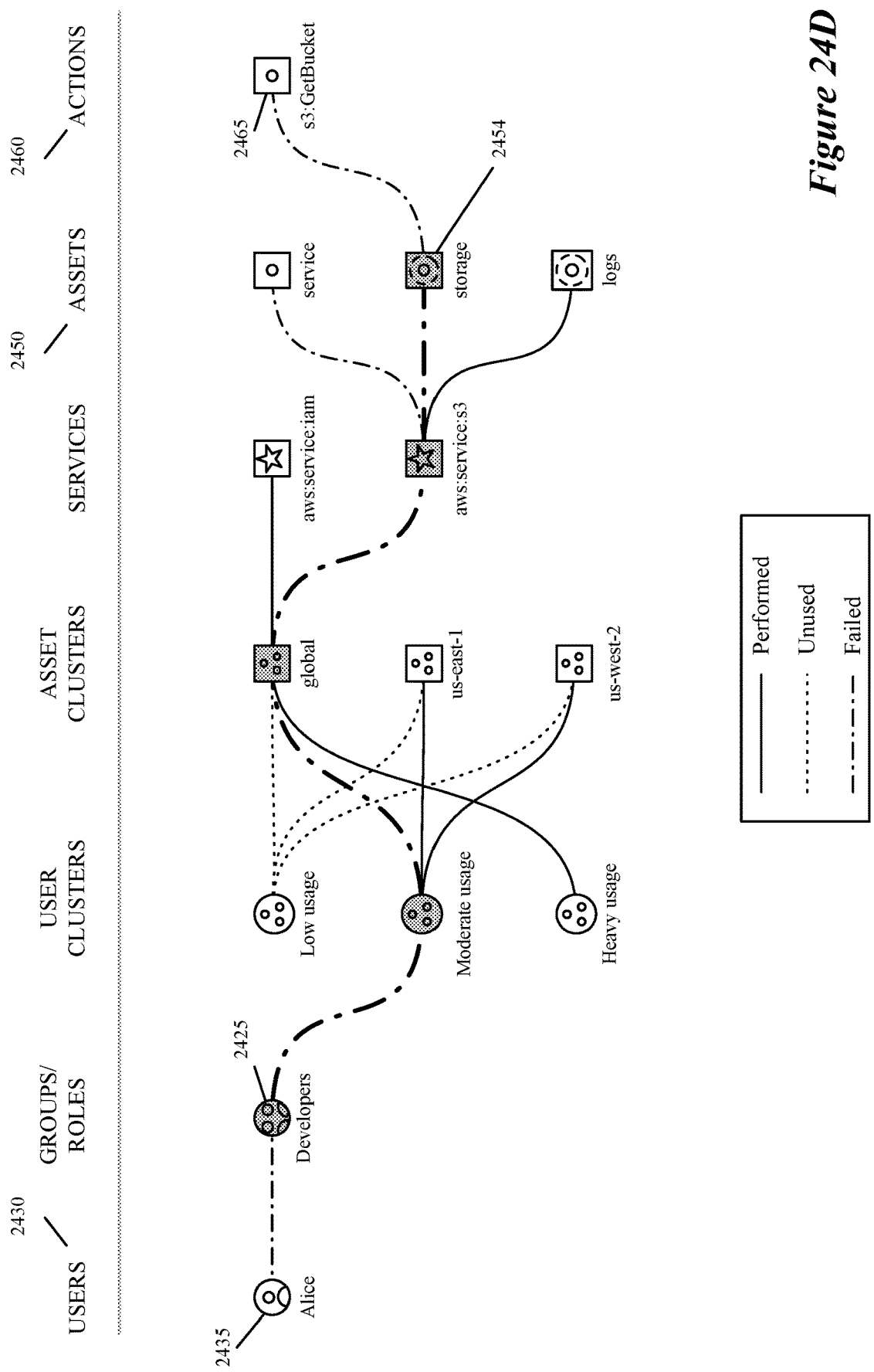

FIG. 24D illustrates selecting the storage asset 2454. The actions column 2460 is now disclosed, which indicates the APIs (i.e., GetBucket 2465) that may be invoked on the storage asset 2454 by at least one user in the Developers group 2425. Note the change in the Users column 2430, namely that only user Alice 2435 is shown. Pam 2440 is no longer shown because that user does not have access to the selected bucket.

Figure 24E:
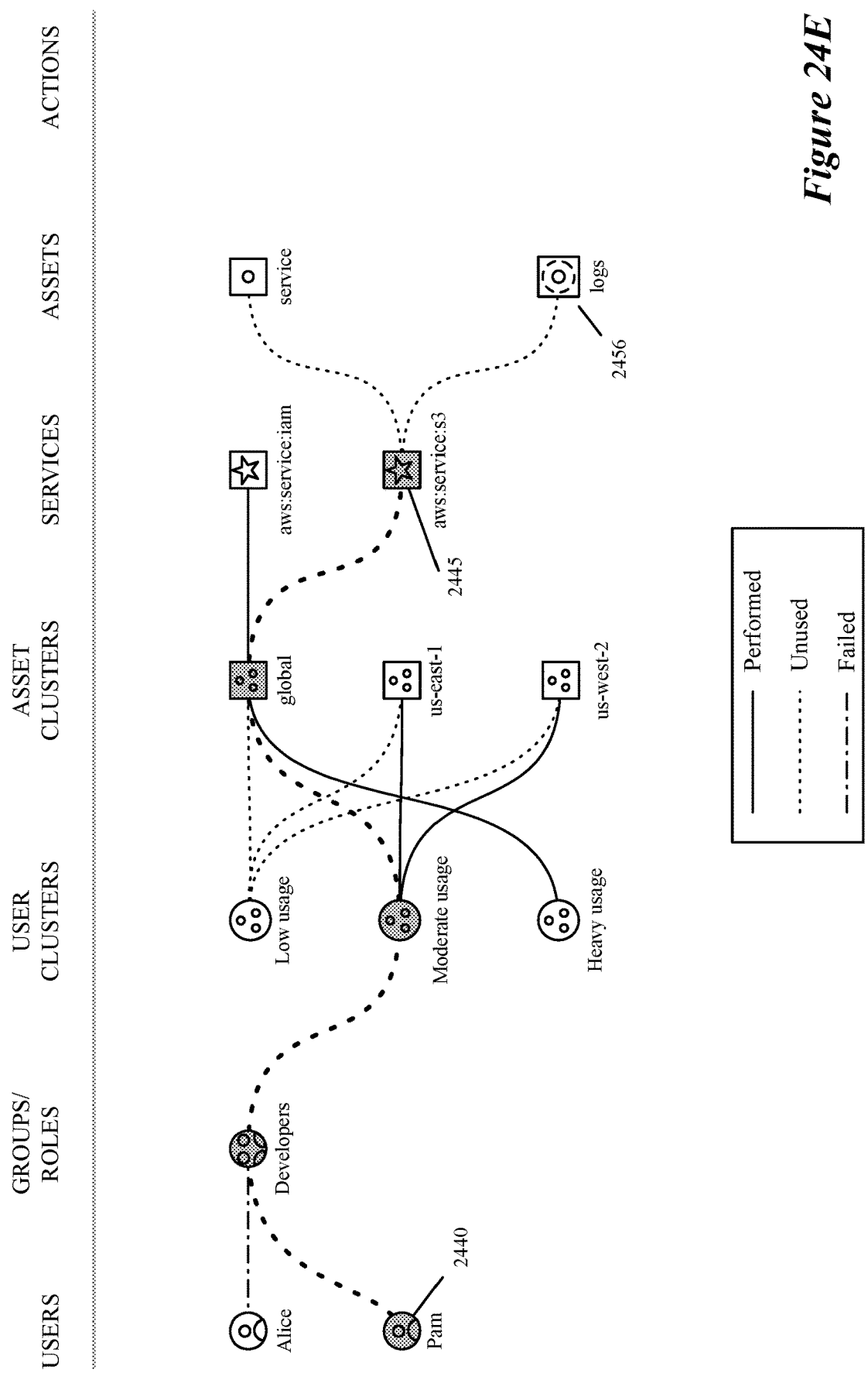

FIG. 24E illustrates selecting the user Pam 2440. Pam does not have access to the storage S3 bucket 2454, so that bucket is no longer shown. Further, the path type has changed. Pam has access to the S3 service 2445 and the S3 logs 2456, but has not invoked any APIs against those resources, so the entire path between Pam and the S3 logs is represented as dotted lines instead of dashed lines.

Figure 24F:
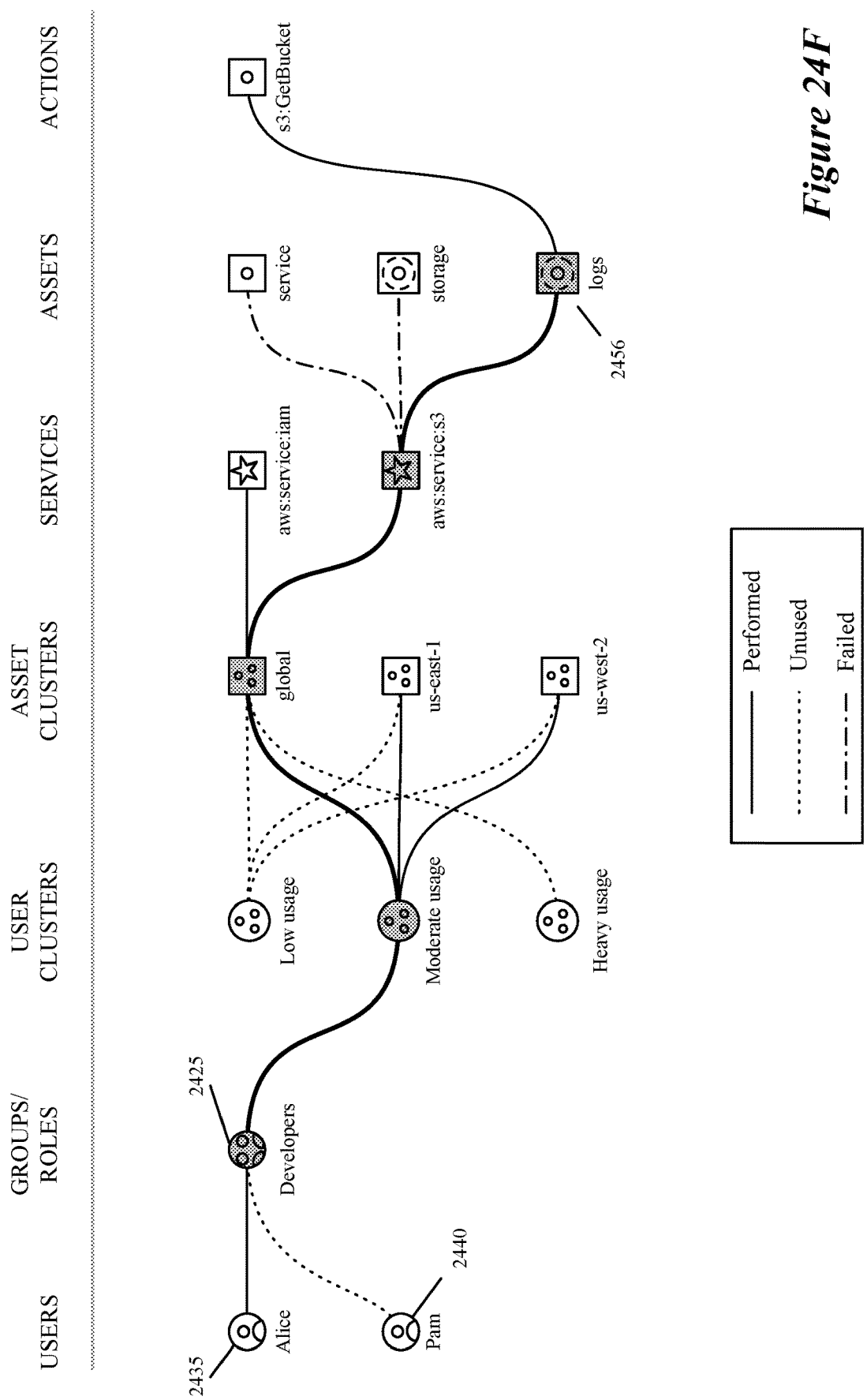

Finally, FIG. 24F illustrates selecting the logs asset 2456, but with no user selected. The path is the solid edge, because at least one member of the Developers group (in this case, Alice 2435) successfully invoked an API against the logs asset 2456. The edge from user Pam 2440 to the Developers group 2425 is dotted because Pam has access to the logs bucket but has not invoked any APIs against it.

Figure 25:
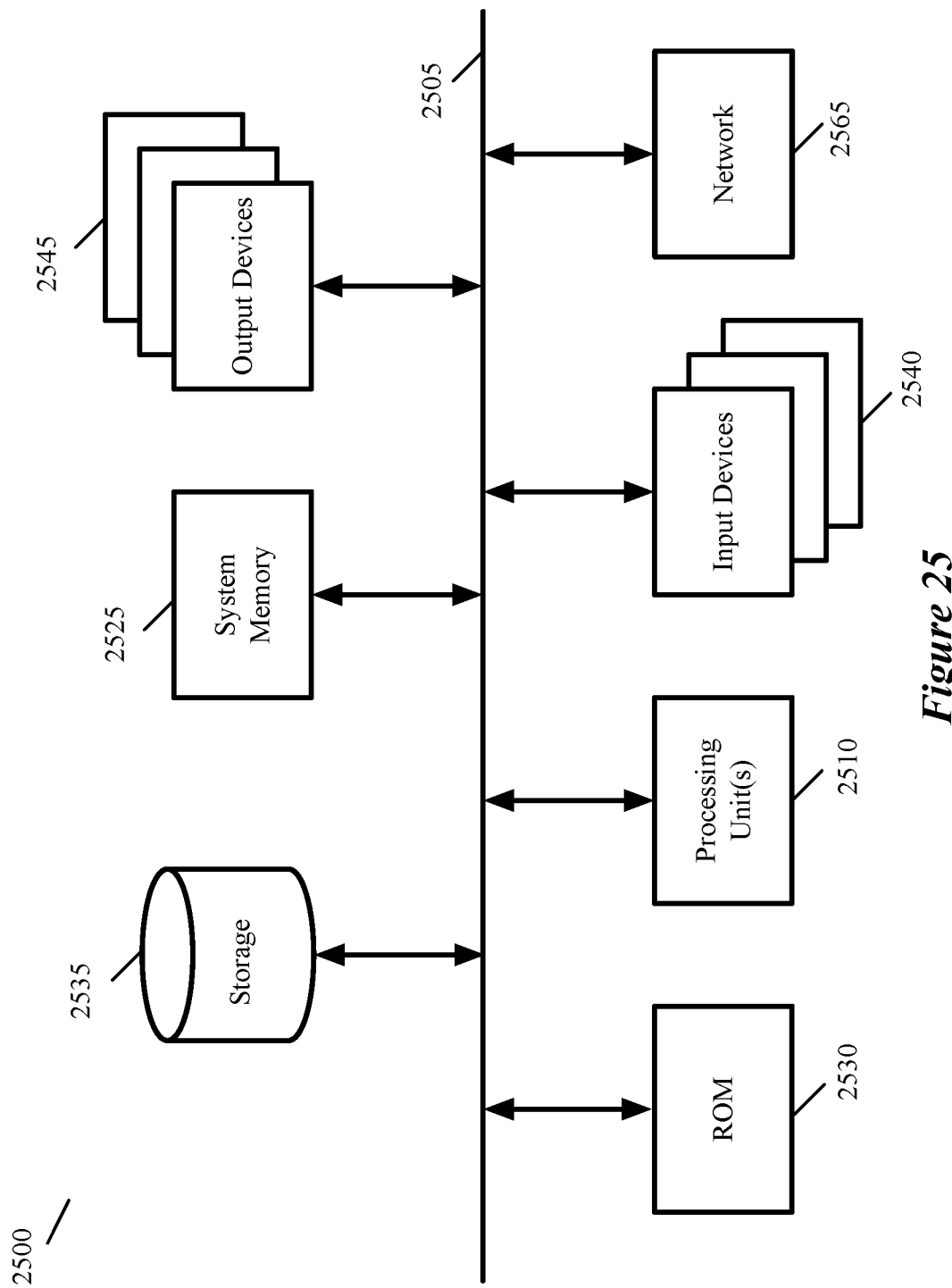
FIG. 25 conceptually illustrates an electronic system with which some embodiments of the invention are implemented.

FIG. 25 conceptually illustrates an electronic system 2500 with which some embodiments of the invention are implemented. The electronic system 2500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2500 includes a bus 2505, processing unit(s) 2510, a system memory 2525, a read-only memory (ROM) 2530, a permanent storage device 2535, input devices 2540, and output devices 2545.

The bus 2505 collectively represents all system, peripheral, and chipset buses that communicatively connect the numerous internal devices of the electronic system 2500. For instance, the bus 2505 communicatively connects the processing unit(s) 2510 with the read-only memory 2530, the system memory 2525, and the permanent storage device 2535.

From these various memory units, the processing unit(s) 2510 retrieve instructions to execute and data to process in order to execute the processes of the invention. The processing unit(s) may be a single processor or a multi-core processor in different embodiments.

The read-only-memory (ROM) 2530 stores static data and instructions that are needed by the processing unit(s) 2510 and other modules of the electronic system. The permanent storage device 2535, on the other hand, is a read-and-write memory device. This device is a non-volatile memory unit that stores instructions and data even when the electronic system 2500 is off. Some embodiments of the invention use a mass-storage device (such as a magnetic or optical disk and its corresponding disk drive) as the permanent storage device 2535.

Other embodiments use a removable storage device (such as a floppy disk, flash drive, etc.) as the permanent storage device. Like the permanent storage device 2535, the system memory 2525 is a read-and-write memory device. However, unlike storage device 2535, the system memory is a volatile read-and-write memory, such as random-access memory. The system memory stores some of the instructions and data that the processor needs at runtime. In some embodiments, the invention's processes are stored in the system memory 2525, the permanent storage device 2535, and/or the read-only memory 2530. From these various memory units, the processing unit(s) 2510 retrieve instructions to execute and data to process in order to execute the processes of some embodiments.

The bus 2505 also connects to the input and output devices 2540 and 2545. The input devices enable the user to communicate information and select commands to the electronic system. The input devices 2540 include alphanumeric keyboards and pointing devices (also called "cursor control devices"). The output devices 2545 display images generated by the electronic system. The output devices include printers and display devices, such as cathode ray tubes (CRT) or liquid crystal displays (LCD). Some embodiments include devices such as a touchscreen that function as both input and output devices.

Finally, bus 2505 also couples electronic system 2500 to a network 2565 through a network adapter (not shown). In this manner, the computer can be a part of a network of computers (such as a local area network ("LAN"), a wide area network ("WAN"), or an Intranet, or a network of networks, such as the Internet. Any or all components of electronic system 2500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals. While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for authorizing an application programming interface (API) call made for a particular user to access a particular service, the method comprising:
   receiving an authentication first policy that defines a set of one or more users of a system providing one or more services including the particular service, the set of one or more users comprising the particular user;
   receiving an authorization second policy that defines access to the particular service by the set of one or more users;
   generating an authorization third policy for defining access to the particular service by the set of one or more users by combining the first and second policies;
   receiving a query regarding access through an API to the particular service for the particular user; and
   using the third policy to provide a response to the query that describes whether the particular user is allowed to access the particular service through an API call.

2. The method of claim 1, wherein the response to the query describes access that the particular user had to the particular service through the API during a previous period of time.

3. The method of claim 2, wherein the described access to the particular service through the API comprises at least one of successful attempts to invoke an API call during the period of time, failed attempts to invoke an API call during the period of time, and a lack of any attempts to invoke an API call during the period of time.

4. The method of claim 1, wherein the response to the query describes access through the API that the particular user presently has to the particular service.

5. The method of claim 4, wherein the described access to the particular service through the API comprises at least one of an authorization to invoke the API call and a lack of authorization to invoke the API call.

6. The method of claim 1, wherein the set of one or more users comprise a set of one or more groups of users, wherein the authorization second policy further defines access to the particular service by at least one group of users.

7. The method of claim 1 further comprising receiving contextual data associated with the particular service, wherein generating the authorization third policy comprises combining the first and second policies with the contextual data.

8. The method of claim 7, wherein the contextual data is directory data that is used by (i) the authentication first policy to define one or more groups of users and (ii) the authorization second policy to restrict access to the particular service by at least one group of users.

9. The method of claim 1, wherein the generated authorization third policy restricts access to the particular service to authenticated users based on a set of criteria.

10. The method of claim 6, wherein the at least one group of users is a first group of users, the method further comprising receiving an authorization fourth policy that defines access to the particular service by a second group of users, wherein generating the authorization third policy further comprises combining the fourth policy with the first and second policies.

11. The method of claim 6, wherein at least one of the groups of users is one of an organization, a department, a team, and a role.

12. The method of claim 1, wherein generating the authorization third policy comprises:
expressing each policy as a policy code in a general policy language;
representing the expressed policies as a single unified policy code in the general policy language; and
generating the authorization third policy by executing the unified policy code.

13. The method of claim 1, wherein generating the authorization third policy comprises:
generating a plurality of aggregate policies from the first and second policies, the plurality of aggregate policies comprising the authorization third policy; and
filtering the plurality of aggregate policies to eliminate aggregate policies that will not be used to respond to any query regarding access through the API to the particular service for the particular user.

14. A non-transitory machine readable medium storing a program that when executed by at least one processing unit authorizes an application programming interface (API) call made for a particular user to access a particular service, the program comprising sets of instructions for:
receiving an authentication first policy that defines a set of one or more users of a system providing one or more services including the particular service, the set of one or more users comprising the particular user;
receiving an authorization second policy that defines access to the particular service by the set of one or more users;
generating an authorization third policy for defining access to the particular service by the set of one or more users by combining the first and second policies;
receiving a query regarding access through an API to the particular service for the particular user; and
using the third policy to provide a response to the query that describes whether the particular user is allowed to access the particular service through an API call.

15. The machine readable medium of claim 14, wherein the response to the query describes access that the particular user had to the particular service through the API during a previous period of time, wherein the described access to the particular service through the API comprises at least one of successful attempts to invoke an API call during the period of time, failed attempts to invoke an API call during the period of time, and a lack of any attempts to invoke an API call during the period of time.

16. The machine readable medium of claim 14, wherein the response to the query describes access through the API that the particular user presently has to the particular service, wherein the described access to the particular service through the API comprises at least one of an authorization to invoke the API call and a lack of authorization to invoke the API call.

17. The machine readable medium of claim 14, wherein the set of one or more users comprise a set of one or more groups of users, wherein the authorization second policy further defines access to the particular service by a first group of users, the program further comprising sets of instructions for receiving an authorization fourth policy that defines access to the particular service by a second group of users, wherein the set of instructions for generating the authorization third policy further comprises a set of instructions for combining the fourth policy with the first and second policies.

18. The machine readable medium of claim 14, the program further comprising a set of instructions for receiving contextual data associated with the particular service, wherein the set of instructions for generating the authorization third policy comprises a set of instructions for combining the first and second policies with the contextual data.

19. The machine readable medium of claim 14, wherein the set of instructions for generating the authorization third policy further comprises a set of instructions for:
generating a plurality of aggregate policies from the first and second policies, the plurality of aggregate policies comprising the authorization third policy; and
filtering the plurality of aggregate policies to eliminate aggregate policies that will not be used to respond to any query regarding access through the API to the particular service for the particular user.

* * * * *